United States Patent
Kakino et al.

(10) Patent No.: US 7,524,605 B2
(45) Date of Patent: Apr. 28, 2009

(54) LITHOGRAPHIC PRINTING PLATE PRECURSOR AND LITHOGRAPHIC PRINTING METHOD

(75) Inventors: Ryuki Kakino, Shizuoka (JP); Kazuto Kunita, Shizuoka (JP); Hidekazu Oohashi, Shizuoka (JP); Yasuhito Oshima, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/101,530

(22) Filed: Apr. 8, 2005

(65) Prior Publication Data

US 2005/0271976 A1 Dec. 8, 2005

(30) Foreign Application Priority Data

Apr. 9, 2004 (JP) ............ P. 2004-115121
Sep. 22, 2004 (JP) ............ P. 2004-275449

(51) Int. Cl.
*G03C 1/00* (2006.01)

(52) U.S. Cl. ............. 430/270.1; 430/281.1; 430/286.1; 430/288.1; 430/138; 430/944; 430/945; 430/302; 430/309; 430/434; 430/435

(58) Field of Classification Search ............. 430/270.1, 430/281.1, 286.1, 288.1, 302, 309, 434, 435, 430/494, 944, 945, 138
See application file for complete search history.

(56) References Cited

U.S. PATENT DOCUMENTS

| 3,785,820 | A | * | 1/1974 | Inoue et al. | ............ 430/19 |
| 3,825,427 | A | * | 7/1974 | Inoue et al. | ............ 430/338 |
| 2003/0068575 | A1 | | 4/2003 | Yanaka | |

FOREIGN PATENT DOCUMENTS

| EP | 1 036 654 A1 | 9/2000 |
| EP | 1 393 899 A1 | 3/2004 |
| JP | 2938397 B2 | 6/1999 |
| JP | 2001-277740 A | 10/2001 |
| JP | 2002-287334 A | 10/2002 |
| WO | WO-03/062924 A1 | 7/2003 |

* cited by examiner

*Primary Examiner*—Amanda C. Walke
(74) *Attorney, Agent, or Firm*—Birch, Stewart, Kolasch & Birch, LLP

(57) ABSTRACT

An image-recording materials containing (A) a compound having a specific partial structure and at least one group selected from an acid group having a pKa of 11 or less, the derivative of the acid group and a group capable of generating the acid group, a lithographic printing plate precursor having an image-recording layer containing the compound (A), and a lithographic printing method using the lithographic printing plate precursor, are provided.

20 Claims, No Drawings

LITHOGRAPHIC PRINTING PLATE PRECURSOR AND LITHOGRAPHIC PRINTING METHOD

BACKGROUND OF THE INVENTION

1. Field of the Invention

The present invention relates to an image-recording material capable of obtaining a printing out image having good visibility after image exposure, a lithographic printing plate precursor, and a lithographic printing method of printing by using the lithographic printing plate precursor.

2. Background Art

A lithographic printing plate generally comprises a lipophilic image area that receives ink during printing process and a hydrophilic non-image area that receives a fountain solution. Lithographic printing is a printing method of making difference in ink-adhering property on the surface of a lithographic printing plate with the lipophilic image area of the lithographic printing plate as the ink-receptive area and the hydrophilic non-image area as the fountain solution-receptive area (an ink-repellent area) by making use of the natures of water and oily ink of repelling to each other, adhering ink only on the image area, and transferring the ink to the material to be printed, e.g., paper.

For manufacturing this lithographic printing plate, a lithographic printing plate precursor (a PS plate) comprising a hydrophilic support having provided thereon a lipophilic photosensitive resin layer (an image-recording layer) has so far been widely used. A lithographic printing plate is generally obtained by a plate making method of exposing a lithographic printing plate precursor through an original image of a lith film and the like, and then, for leaving the image-recording layer of the image area, dissolving and removing the image-recording layer of the non-image area with an alkali developing solution or an organic solvent to whereby bare a hydrophilic support surface.

In a conventional plate making process of a lithographic printing plate precursor, a process of dissolving and removing a non-image area with a developing solution and the like corresponding to the image-record layer after exposure is necessary, but the exclusion or simplification of such an additional wet process is one of the objects in the industry. Since the discard of waste solutions discharged with wet processes is a particularly great interest in the industry at large in recent years from the consideration of the global environmental protection, the solution of the above problem is increasingly desired.

For coping with this problem, as a non-processing (non-development) type plate making process that does not necessitate a wet process, a lithographic printing plate precursor having an image-recording layer whose affinity with a fountain solution or ink changes on the surface by exposure and capable of printing without being accompanied by the removal of an image-recording layer is proposed.

As a simple plate-making method, a method that is called on-press development is proposed, which is a method of using an image-recording layer capable of removal of a non-image area of a lithographic printing plate precursor in an ordinary printing process, and removing a non-image area after exposure on a printing machine to whereby obtain a lithographic printing plate.

As the specific examples of on-press development, e.g., a method of using a lithographic printing plate precursor having an image-recording layer soluble or dispersible in, e.g., a fountain solution, an ink solvent or an emulsified product of a fountain solution and ink, a method of mechanically removing an image-recording layer by the contact with the rollers and the blanket of a printing machine, and a method of mechanically removing an image-recording layer by the contact with the rollers and the blanket after weakening the cohesive strength of an image-recording layer or the adhesive strength of an image-recording layer and a support by the permeation of a fountain solution, an ink solvent and the like are exemplified.

In the present invention, unless otherwise indicted, "development process" means a process of removing an unexposed portion with an infrared laser of a lithographic printing plate precursor by being brought into contact with a liquid (generally an alkali developing solution) to thereby bare the hydrophilic support surface by using an apparatus other than a printing machine (generally an automatic processor), and "on-press development" means a method and a process of removing an unexposed portion with an infrared laser of a lithographic printing plate precursor by being brought into contact with a liquid (generally printing ink and/or a fountain solution) to thereby bare the hydrophilic support surface by using a printing machine.

However, when a conventional image-recording layer of an image-recording system utilizing ultraviolet rays and visible rays is used, since the image-recording layer is not fixed after exposure, it is necessary to take a method requiring much labor, such that the exposed lithographic printing plate precursor must be stored under a completely light-shielding condition or a constant temperature condition until it is mounted on a printing machine.

On the other hand, in recent years, digitized techniques of electronically processing, accumulating and outputting image data by using a computer have prevailed, and various image output systems corresponding to these digitized techniques have been put to practical use. Under such circumstances, a computer-to-plate technique of directly making a printing plate without using a lith film is attracting public attention, which technique comprises scanning exposing a lithographic priming plate precursor with high convergent radiant rays such as laser beams carrying digitized image data. With such a tendency, it is an important technical subject to obtain a lithographic printing plate precursor well adapted to such a technique.

Accordingly, in recent years, the simplification of plate-making operation, and the realization of dry system and non-processing system have been more and more strongly required from both aspects of the above-described global environmental protection and the adaptation for digitization.

Since high output lasers such as semiconductor lasers and YAG lasers radiating infrared rays of the wavelength of from 760 to 1,200 nm are inexpensively available nowadays, methods of using these high output lasers as image recording means are now promising as the manufacturing method of a lithographic printing plate by scanning exposure that is easy to be included in digitized techniques.

In conventional plate-making methods, image recording is performed by imagewise exposing a photosensitive lithographic printing plate precursor by low to middle intensity of illumination to cause imagewise change of physical properties by photochemical reaction in the image-recording layer. While in the above method of using high output lasers, an exposure area is irradiated with a great quantity of light energy in an extremely short period of time, and the light energy is efficiently converted to beat energy, the heat energy causes thermal changes such as chemical changes, phase changes and morphological or structural changes in the image-recording layer, and these changes are utilized in image-recording. Accordingly, image data are inputted by light energy, e.g. laser beams, but image recording is performed in the state including the reaction by heat energy in addition to light energy. A recording system making use of heat generation by such high power density exposure is generally called heat mode recording, and converting light energy to heat energy is called light/heat conversion. Such an image-recording layer is also called a image-recording layer in the invention.

Great advantages of a plate-making method using heat mode recording are that image-recording layers are insensitive to the lights of ordinary levels of illuminance such as room illumination, and that the fixation of images recorded by high illuminance exposure is not necessary. That is, lithographic printing plate precursors for use in heat mode recording are free of sensitization by room illumination before exposure and fixation of images is not essential after exposure. Therefore, for example, when a plate-making process is performed by on-press development with an image-recording layer that is insolubilized or solubilized by exposure with high output laser beams, and the exposed image-recording layer is made an imagewise lithographic printing plate, a printing system that an image is not influenced even if exposed to room light after exposure becomes possible. Therefore, it is expected that a lithographic printing plate precursor preferably used for on-press development can be obtained if heat mode recording is used.

As one example, a lithographic printing plate precursor comprising a hydrophilic support having provided thereon an image-forming layer containing hydrophobic thermoplastic polymer particles dispersed in a hydrophilic binder is disclosed in Japanese Patent 2938397. Japanese Patent 2938397 discloses that it is possible to perform on-press development with a fountain solution and/or ink by subjecting the lithographic printing plate precursor to exposure with an infrared laser to coalesce the hydrophobic thermoplastic polymer particles by heat to thereby form an image, and then mounting the lithographic printing plate precursor on the cylinder of a printing machine.

However, it was found that a method of forming an image by coalescence of fine particles by mere heat fusion as above certainly shows a good on-press developing property, but image strength is weak and press life is insufficient.

Therefore, the improvement of press life by making use of polymerization reaction is propose& For example, a lithographic printing plate precursor comprising a hydrophilic support having thereon an image-recording layer (a heat-sensitive layer) containing microcapsules containing a polymerizable compound is disclosed JP-A-2001-277740 (The term "JP-A" as used herein refers to an "unexamined published Japanese patent application"). Further, JP-A-2002-287334 discloses a lithographic printing plate precursor comprising a support having provided thereon an image-recording layer (a photosensitive layer) containing an infrared absorber, a radical polymerization initiator and a polymerizable compound.

In general, as the preprocess of mounting a printing plate on a printing machine, the inspection and discrimination of images on a printing plate, i.e., works for ascertaining whether the images fitting for the purpose are recorded on the printing plate or not, and ascertaining for what a color of ink the plate is, are operated. In ordinary lithographic printing plate precursors including a development process, an image can be easily ascertained after plate-making (after development process), or before printing (before a printing plate is mounted on the printing machine) generally by coloring an image-recording layer in advance.

However, in a lithographic printing plate precursor of an on-press development type or a non-processing (non-development) type not accompanied by development process before printing, the discrimination of a plate cannot be done, since there is no image on the printing plate, which sometimes leads to the error in operation. In particular in multicolor printing, it is important for printing work to be capable of distinguishing whether register marks for register are clearly written so as to be distinguished or not. The invention aims at solving this problem.

SUMMARY OF THE INVENTION

That is, an object of the invention is to provide an image-recording material capable of obtaining a printing out image having good visibility with laser exposure. Another object is to provide an on-press development type or a non-processing (non-development) type lithographic printing plate precursor capable of obtaining a printing out image having great visibility capable of easily discriminating the plate at the stage of imagewise heating or light radiation with an infrared laser, and a further object of the invention is to provide a lithographic printing method using the lithographic printing plate precursor, As a result of eager investigation for achieving the above objects, the present inventors have found that a printing out image having good visibility can be obtained by using a spiro compound or an indolinooxazine compound having a specific group, thus the invention was attained.

That is, the invention is as follows.

1. A compound comprising: a partial structure represented by the following formula (I); and at least one group selected from the group consisting of an acid group having a pKa of 11 or less, the derivative of the acid group and a group capable of generating the acid group:

wherein X and Y each independently represents an atom selected from N, O and S; Q represents an atom selected from C, N, O and S.

2. An image-recording material comprising (A) a compound comprising: a partial structure represented by the following formula (I); and at least one group selected from the group consisting of an acid group having a pKa of 11 or less, the derivative of the acid group and a group capable of generating the acid group:

wherein X and Y each independently represents an atom selected from N, O and S; Q represents an atom selected from C, N, O and S.

3. The image-recording material as described in the item 2, which further comprises an infrared absorber.

4. A lithographic printing plate precursor comprising a support and an image-recording layer, wherein the image-recording layer comprises (A) a compound comprising: a partial structure represented by the following formula (I); and at least one group selected from the group consisting of an acid group having a pKa of 11 or less, the derivative of the acid group and a group capable of generating the acid group:

(I)

wherein X and Y each independently represents an atom selected from N, O and S; Q represents an atom selected from C, N, O and S.

5. The lithographic printing plate precursor as described in the item 4, wherein the image-recording layer further comprises an infrared absorber.

6. The lithographic printing plate precursor as described in the item 4 or 5, wherein the image-recording layer is capable of image recording by an infrared laser exposure, and the lithographic printing plate precursor is capable of performing a printing by being loaded on a printing machine without a development processing after image recording, or by image recording after being loaded on a printing machine.

7. A lithographic printing plate precursor comprising a support and an image-recording layer, wherein the image-recording layer comprises (1) an infrared absorber and (2) a photochromic compound.

8. The lithographic printing plate precursor as described in the item 7, wherein the image-recording layer is capable of image recording by an infrared laser exposure, and the lithographic printing plate precursor is capable of performing a printing by being loaded on a printing machine without a development processing after image recording, or by image recording after being loaded on a printing machine.

9. The lithographic printing plate precursor as described in the item 7 or 8, wherein the photochromic compound (2) is selected from the group consisting of a spiropyran compound, a naphthopyran compound, a spiroxazine compound, a fulgide compound, a chromene compound and a diarylethene compound.

10. The lithographic printing plate precursor as described in any one of the items 4 to 6, wherein the image-recording layer further comprises (3) a radical polymerizable compound and a radical polymerization initiator.

11. The lithographic printing plate precursor as described in any one of the items 7 to 9, wherein the image-recording layer further comprises (3) a radical polymerizable compound and a radical polymerization initiator.

12. The lithographic printing plate precursor as described in any one of the items 4 to 6 and 10, wherein the image-recording layer contains a microgel.

13. The lithographic printing plate precursor as described in the item 12, wherein the microgel is a microcapsule.

14. The lithographic printing plate precursor as described in any one of the items 7 to 9 and 11, wherein the image-recording layer contains a microgel.

15. The lithographic printing plate precursor as described in the item 14, wherein the microgel is a microcapsule.

16. A method of plate making a lithographic printing plate precursor, comprising:

loading the lithographic printing plate precursor as described in any one of the items 4 to 6, 10 and 12 on a printing machine and then imagewise exposing the lithographic printing plate precursor with an infrared laser, or imagewise exposing the lithographic printing plate precursor as described in any one of the items 4 to 6, 10 and 12 with an infrared laser and then loading the lithographic printing plate precursor on a printing machine; and feeding a printing ink and a fountain solution to the lithographic printing plate precursor to remove the unexposed portion with the infrared laser of the image-recording layer.

17. A method of plate making a lithographic printing plate precursor, comprising:

loading the lithographic printing plate precursor as described in any one of the items 7 to 9, 11 and 14 on a printing machine and then imagewise exposing the lithographic printing plate precursor with an infrared laser, or imagewise exposing the lithographic printing plate precursor as described in any one of the items 7 to 9, 11 and 14 with an infrared laser and then loading the lithographic printing plate precursor on a printing machine; and feeding a printing ink and a fountain solution to the lithographic printing plate precursor to remove the unexposed portion with the infrared laser of the image-recording layer.

18. A lithographic printing method comprising:

loading the lithographic printing plate precursor as described in any one of the items 4 to 6, 10 and 12 on a printing machine and then imagewise exposing the lithographic printing plate precursor with an infrared laser, or imagewise exposing the lithographic printing plate precursor as described in any one of the items 4 to 6, 10 and 12 with an infrared laser and then loading the lithographic printing plate precursor on a printing machine;

feeding a printing ink and a fountain solution to the lithographic printing plate precursor to remove the unexposed portion with the inbred laser of the image-recording layer; and performing a printing.

19. A lithographic printing method comprising:

loading the lithographic printing plate precursor as described in any one of the items 7 to 9, 11 and 14 on a printing machine and then imagewise exposing the lithographic printing plate precursor with an infrared laser, or imagewise exposing the lithographic printing plate precursor as described in any one of the items 7 to 9, 11 and 14 with an infrared laser and then loading the lithographic printing plate precursor on a printing machine;

feeding a printing ink and a fountain solution to the lithographic printing plate precursor to remove the unexposed portion with the infrared laser of the image-recording layer, and performing a printing.

In the invention, a printing out image having good visibility can be obtained by using a spiro compound or an indolinooxazine compound having an acid group having a pKa of 11 or less, the derivative of the acid group, or a group capable of generating the acid group. The mechanism of such a function of the invention is not clear known, but it is thought that an acid generated by the function of light or heat and a hetero atom bonded to a spiro carbon interact, whereby the cleavage of the spiro carbon occurs and the conjugation expands, as a result the compound causes absorption in the visible region, as shown in the following reaction scheme.

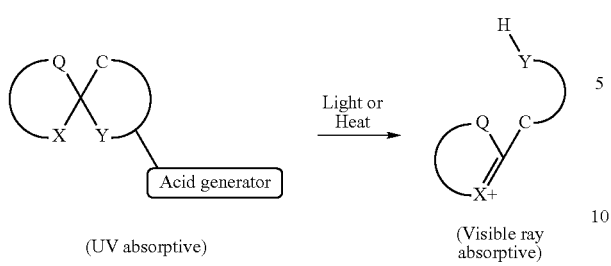

(UV absorptive)     Light or Heat     (Visible ray absorptive)

[Acid generator]

The invention can provide an image-recording material capable of obtaining a printing out image having good visibility with infrared laser exposure. Further, the invention can provide an on-press development type or a non-processing (non-development) type lithographic printing plate precursor capable of easily discriminating the plate at the stage of imagewise exposure with an infrared laser by a printing out image having great visibility, and can provide a lithographic printing method using an on-press development type lithographic printing plate precursor

DETAILED DESCRIPTION OF THE INVENTION

Image-recording Material:

The image-recording material according to the invention contains (A) a compound having a partial structure represented by the following formula (I) and at least one group selected from an acid group having a pKa of 11 or less, the derivative of the acid group and a group capable of generating the acid group (hereinafter the compound is sometimes referred to as "the compound of the invention").

(I)

wherein X and Y each independently represents an atom selected from N, O and S, and Q represents an atom selected from C, N, O and S.

As the compound having a partial structure represented by formula (I) of the invention, e.g., spiro compounds such as spiropyran and spirooxazine, and indolinooxazolidine compounds are exemplified.

As spiro compounds, a spiro compound represented by the following formula (IA) can be exemplified

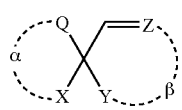

(IA)

wherein Q, X and Y have the same meanings as described in formula (I), Z represents CH or N, α represents an atomic group for constituting a ring formed by bonding to Q and X, and β represents an atomic group for constituting a ring formed by bonding to Y and Z.

In formula (IA), the specific examples of atomic groups represented by α or β include an alkyl group, a substituted alkyl group, an alkenyl group, a substituted alkenyl group, an alkynyl group, a substituted alkynyl group, an aryl group, a substituted aryl group, and a divalent linking group obtained by eliminating one hydrogen from a heteroaryl group; linking groups having a partial structure having a hetero atom such as shown below; and groups obtained by combining two or more of these linking groups.

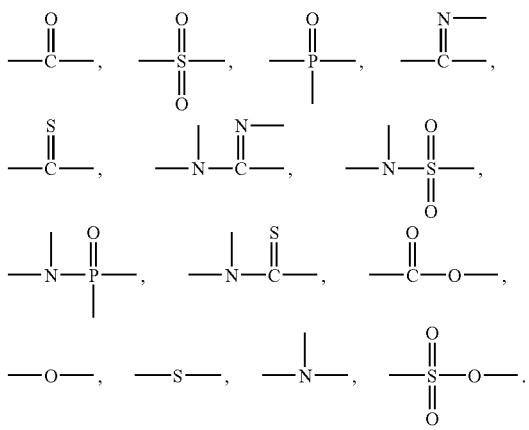

As the specific examples of the above alkyl group, substituted alkyl group, alkenyl group, substituted alkenyl group, alkynyl group, substituted alkynyl group, aryl group and substituted aryl group, the following groups are exemplified.

As the alkyl group, a Straight chain, branched or cyclic alkyl group having from 1 to 20 carbon atoms can be exemplified, and the specific examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a hexadecyl group, an octadecyl group, an eicosyl group, an isopropyl group, an isobutyl group, an s-butyl group, a t-butyl group, an isopentyl group, a neopentyl group, a 1-methylbutyl group, an isohexyl group, a 2-ethylhexyl group, a 2-methylhexyl group, a cyclohexyl group, a cyclopentyl group, and a 2-norbornyl group. Of these alkyl groups, a straight chain alkyl group having from 1 to 12 carbon atoms, a branched alkyl group having from 3 to 12 carbon atoms, and a cyclic alkyl group having from 5 to 10 carbon atoms are more preferred.

The substituted alkyl group consists of bonding of a substituent and an alkylene group, and monovalent non-metallic atomic groups exclusive of a hydrogen atom are used as the substituents. The examples of preferred substituents include a halogen atom (—F, —Br, —Cl, —I), a hydroxyl group, an alkoxyl group, an aryloxy group, a mercapto group, an alkylthio group, an arylthio group, an alkyldithio group, an aryldithio group, an amino group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diaryl-carbamoyloxy group, an N-alkyl-N-arylcarbamoyloxy group, an alkylsulfoxy group, an arylsulfoxy group, an acylthio group, an acylamino group, an N-alkylacylamino group, an N-aryl-acylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-aryl-ureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxy-carbonylamino group, an N-aryl-N-alkoxycarbonylamino group, an N-aryl-N-aryloxycarbonylamino group, a formyl group, an acyl group, a carboxyl group, and a conjugate base group thereof (hereinafter referred to as a carboxylato group), an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group (—SO$_3$H), and a conjugate base group thereof (hereinafter referred to as a sulfonato group), an alkoxy-sulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group, and a conjugate base group thereof, an N-alkylsulfonylsulfamoyl group (—SO$_2$NHSO$_2$(alkyl)), and a conjugate base group thereof, an N-arylsulfonylsulfamoyl group (—SO$_2$NHSO$_2$(allyl)), and a conjugate base group thereof an N-alkylsulfonylcarbamoyl group (—CONHSO$_2$(alkyl)), and a conjugate base group thereof, an N-arylsulfonylcarbamoyl group (—CONHSO$_2$(allyl)), and a conjugate base group thereof an alkoxysilyl group (—Si(Oalkyl)$_3$), an aryloxysilyl group (—Si)Oallyl)$_3$), a hydroxysilyl group (—Si(OH)$_3$), and a conjugate base group thereof, a phosphono group (—PO$_3$H$_2$), and a conjugate base group thereof (hereinafter referred to as a phosphonato group), a dialkylphosphono group (—PO$_3$(alkyl)$_2$), a diarylphosphono group (—PO$_3$(aryl)$_2$), an alkylarylphosphono group (—PO$_3$(alkyl)-(aryl)), a monoalkylphosphono group (—PO$_3$H(alkyl)), and a conjugate base group thereof (hereinafter referred to as an alkylphosphonato group), a monoarylphosphono group (—PO$_3$H-(aryl)), and a conjugate base group thereof (hereinafter referred to as an arylphosphonato group), a phosphonoxy group (—OPO$_3$H$_2$), and a conjugate base group thereof (hereinafter referred to as a phosphonatoxy group), a dialkylphosphonoxy group (—OPO$_3$(alkyl)$_2$), a diarylphosphonoxy group (—OPO$_3$-(aryl)$_2$), an alkylarylphosphonoxy group (—OPO$_3$(alkyl)(aryl)), a monoalkylphosphonoxy group (—OPO$_3$H(alkyl)), and a conjugate base group thereof (hereinafter referred to as an alkyl-phosphonatoxy group), a monoarylphosphonoxy group (—OPO$_3$H-(aryl)), and a conjugate base group thereof (hereinafter referred to as an arylphosphonatoxy group), a cyano group, a nitro group, a hydroxyl group, an aryl group, an alkenyl group, and an alkynyl group.

As the specific examples of the alkyl groups in these substituents, the above alkyl groups can be exemplified, and the specific examples of the aryl groups include a phenyl group, a biphenyl group, a naphthyl group, a tolyl group, a xylyl group, a mesityl group, a cumenyl group, a fluorophenyl group, a chlorophenyl group, a bromophenyl group, a chloromethylphenyl group, a hydroxyphenyl group, a methoxyphenyl group, an ethoxyphenyl Soup, a phenoxyphenyl group, an acetoxyphenyl group, a benzoyloxyphenyl group, a methylthiophenyl group, a phenylthiophenyl group, a methylaminophenyl group, a dimethylaminophenyl group, an acetylaminophenyl group, a carboxyphenyl group, a methoxycarbonylphenyl group, an ethoxycarbonylphenyl group, a phenoxycarbonylphenyl group, an N-phenylcarbamoylphenyl group, a phenyl group, a nitrophenyl group, a cyanophenyl group, a sulfophenyl group, a sulfonatophenyl group, a phosphonophenyl group, and a phosphonatophenyl group. As the examples of the alkenyl groups, a vinyl group, a 1-propenyl group, a 1-butenyl group, a cinnamyl group, and a 2-chloro-1-ethenyl group can be exemplified, and as the examples of the alkynyl groups, an ethynyl group, a 1-propynyl group, a 1-butynyl group, a trimethylsilylethynyl group, and a phenylethynyl group can be exemplified.

The specific examples of preferred substituted alkyl groups include a chloromethyl group, a bromomethyl group, a 2-chloroethyl group, a trifluoromethyl group, a methoxymethyl group, a methoxyethoxyethyl group, an allyloxymethyl group, a phenoxymethyl group, a methylthiomethyl group, a tolylthio-methyl group, an ethylaminoethyl group, a diethylaminopropyl group, a morpholinopropyl group, an acetyloxymethyl group, a benzoyloxymethyl group, an N-cyclohexylcarbamoyloxyethyl group, an N-phenylcarbamoyloxyethyl group, an acetylamino-ethyl group, an N-methylbenzoylaminopropyl group, a 2-oxoethyl group, a 2-oxopropyl group, a carboxypropyl group, a methoxycarbonylethyl group, a methoxycarbonylmethyl group, a methoxycarbonylbutyl group, an ethoxycarbonylmethyl group, a butoxycarbonylmethyl group, an allyloxycarbonylmethyl group, a benzyloxycarbonylmethyl group, a methoxycarbonylphenyl-methyl group, a trichloromethylcarbonylmethyl group, an allyloxycarbonylbutyl group, a chlorophenoxycarbonylmethyl group, a carbamoylmethyl group, an N-methylcarbamoylethyl group, an N,N-dipropylcarbamoylmethyl group, an N-(methoxy-phenyl)carbamoylethyl group, an N-methyl-N-(sulfophenyl)-carbamoylmethyl group, a sulfopropyl group, a sulfobutyl group, a sulfonatobutyl group, a sulfamoylbutyl group, an N-ethyl-sulfamoylmethyl group, an N,N-dipropylsulfamoylpropyl group, an N-tolylsulfamoylpropyl group, an N-methyl-N(phosphonophenyl)sulfamoyloctyl group, a phosphonobutyl group, a phosphonatohexyl group, a diethylphosphonobutyl group, a diphenylphosphonopropyl group, a methylphosphonobutyl group, a methylphosphonatobutyl group, a tolylphosphonohexyl group, a tolylphosphonatohexyl group, a phosphonoxypropyl group, a phosphonatoxybutyl group, a benzyl group, a phenethyl group, an α-methylbenzyl group, a 1-methyl-1-phenylethyl group, a p-methylbenzyl group, a cinnamyl group, an allyl group, a 1-propenylmethyl group, a 2-butenyl group, a 2-methylallyl group, a 2-methylpropenyl-methyl group, a 2-propynyl group, a 2-butynyl group, a 3-butynyl group, and the following shown groups.

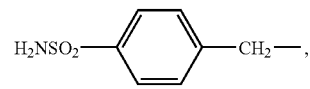

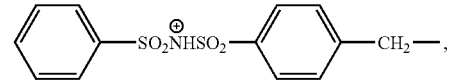

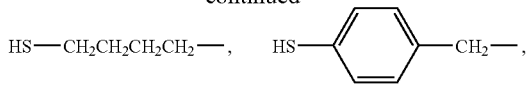

As the aryl groups, a condensed ring formed by 1 to 3 benzene rings and a condensed ring formed by a benzene ring and a 5-membered unsaturated ring can be exemplified. The specific examples include a phenyl group, a naphthyl group, an anthryl group, a phenanthryl group, an indenyl group, an acenaphthenyl group, and a fluorenyl group. Of these groups, a phenyl group and a naphthyl group are more preferred.

The substituted aryl group is that which is obtained by bonding a substituent to an aryl group, and those having a monovalent non-metallic atomic group exclusive of a hydrogen atom as a substituent on the ring-forming carbon atoms of the above aryl groups are used as the substituted aryl groups. As the preferred examples of the substituents, the above alkyl groups, substituted alkyl groups, and those described above as the examples of the substituents in the substituted alkyl groups can be exemplified.

The preferred specific examples of these substituted aryl groups include a biphenyl group, a tolyl group, a xylyl group, a mesityl group, a cumenyl group, a chlorophenyl group, a bromophenyl group, a fluorophenyl group, a chloromethylphenyl group, a trifluoromethylphenyl group, a hydroxyphenyl group, a methoxyphenyl group, a methoxyethoxyphenyl group, an allyloxyphenyl group, a phenoxyphenyl group, a methylthio-phenyl group, a tolylthiophenyl group, a phenylthiophenyl group, an ethylaminophenyl group, a diethylaminophenyl group, a morpholinophenyl group, an acetyloxyphenyl group, a benzoyl-oxyphenyl group, an N-cyclohexylcarbamoyloxyphenyl group, an N-phenylcarbamoyloxyphenyl group, an acetylaminophenyl group, an N-methylbenzoylaminophenyl group, a carboxyphenyl group, a methoxycarbonylphenyl group, an allyloxycarbonylphenyl group, a chlorophenoxycarbonylphenyl group, a carbamoylphenyl group, an N-methylcarbamoylphenyl group, an N,N-dipropyl-carbamoylphenyl group, an N-(methoxyphenyl)carbamoylphenyl group, an N-methyl-N-(sulfophenyl)carbamoylphenyl group, a sulfophenyl group, a sulfonatophenyl group, a sulfamoylphenyl group, an N-ethylsulfamoylphenyl group, an N,N-dipropyl-sulfamoylphenyl group, an N-tolylsulfamoylphenyl group, an N-methyl-N-(phosphonophenyl)sulfamoylphenyl group, a phosphonophenyl group, a phosphonatophenyl group, a diethyl-phosphonophenyl group, a diphenylphosphonophenyl group, a methylphosphonophenyl group, a methylphosphonatophenyl group, a tolylphosphonophenyl group, a tolylphosphonatophenyl group, an allyl group, a 1-propenylmethyl group, a 2-butenyl group, a 2-methylallylphenyl group, a 2-methylpropenylphenyl group, a 2-propynylphenyl group, a 2-butynylphenyl group, and a 3-butynylphenyl group.

As the preferred examples of the heteroaryl group, a pyrrole ring group, a furan ring group, a thiophene fin group, a benzopyrrole ring group, a benzofuran ring group, a benzothiophene ring group, a pyrazole ring group, an isoxazole ring group, an isothiazole ring group, an indazole ring group, a benzisoxazole ring group, a benzisothiazole ring group, an imidazole ring group, an oxazole ring group, a thiazole ring group, a benzimidazole ring group, a benzoxazole ring group, a benzothiazole ring group, a pyridine ring group, a quinoline ring group, an isoquinoline ring group, a pyridazine ring group, a pyrimidine ring group, a pyrazine ring group, a phthalazine ring group, a quinazoline ring group, a quinoxaline ring group, an aziridine ring group, a phenanthridine ring group, a carbazole ring group, a purine ring group, a pyran ring group, a piperidine ring group, a piperazine ring group, a morpholine ring group, an indole ring group, an indolizine ring group, a chromene ring group, a cinnoline ring group, an acridine ring group, a phenothiazine ring group, a tetrazole ring group, and a triazine ring group are exemplified.

The heterocyclic ring groups may have a substituent, and monovalent non-metallic atomic groups exclusive of a hydrogen atom can be used as the substituents. As the examples of such substituents, the above-described alkyl groups, substituted alkyl groups, and the substituents in the substituted alkyl groups described above are exemplified.

As the examples of the alkenyl groups, a vinyl group, a 1-propenyl group, a 1-butenyl group, a cinnamyl group, and a 2-chloro-1-ethenyl group are exemplified, and as the examples of the alkynyl groups, an ethynyl group, a 1-propynyl group, a 1-butynyl group and a trimethylsilylethynyl group are exemplified.

The substituted alkenyl group is an alkenyl group having a substituent bonded to the alkenyl group by replacing with the hydrogen atom in the alkenyl group, and as the substituents of the substituted alkenyl group, the above substituents in the substituted alkyl group can be used. As the alkenyl group, the above alkenyl groups can be used. As the preferred examples of the substituted alkenyl groups, the following groups can be exemplified.

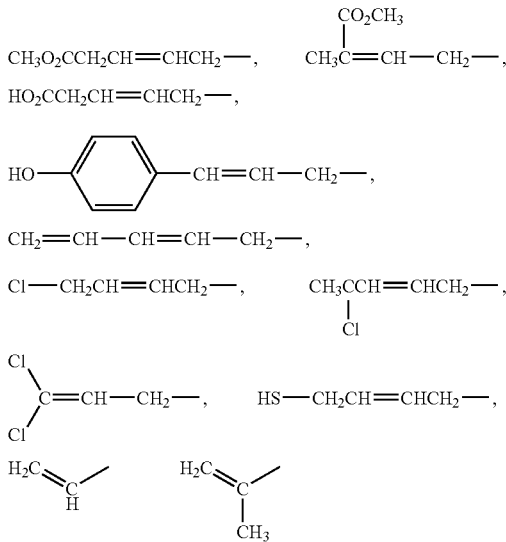

The substituted alkynyl group is an alkynyl group having a substituent bonded to the alkynyl group by replacing with the hydrogen atom in the alkynyl group, and as the substituents of the substituted alkynyl group, the above substituents in the substituted alkyl group can be used. As the alkynyl group, the above alkynyl groups can be used.

The spiro compound represented by formula (IA) is particularly preferably represented by the following formula (IB):

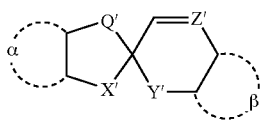

(IB)

wherein X' represents NR¹, O or s; R¹ represents an alkyl group having from 1 to 20 carbon atoms which may be substituted, an alkenyl group having from 2 to 20 carbon atoms which may be substituted, an alkynyl group having from 2 to 20 carbon atoms which may be substituted, an aralkyl group having from 7 to 20 carbon atoms which may be substituted, or an aryl group having from 6 to 19 carbon atoms which may be substituted, α and β each represents an atomic group for constituting a ring formed with the carbon atom to which α or β is bonded, and the specific examples of atomic groups represented by α or β include the above alkyl group, substituted alkyl group, alkenyl group, substituted alkenyl group, alkynyl group, substituted alkynyl group, aryl group, substituted aryl group, and a divalent linking group obtained by eliminating one hydrogen from a heteroaryl group; linking groups having a partial structure having a hetero atom such as shown below; and groups obtained by combining two or more of these linking groups.

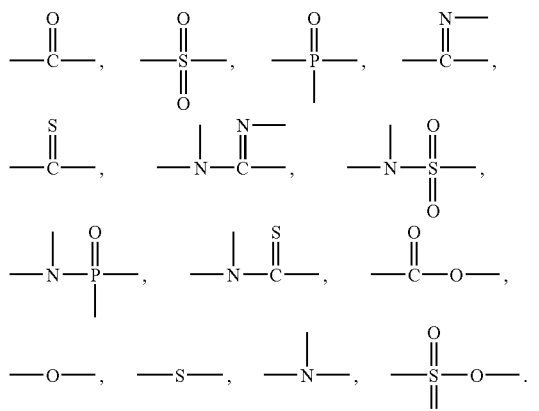

In formula (IB), Q' represents O, S or CR²R³. In the case where Q' represents CR²R³ and R² and R³ are independent, each of them represents a substituent selected from an alkyl group having from 1 to 20 carbon atoms, an alkenyl group having from 2 to 20 carbon atoms, an alkynyl group having from 2 to 20 carbon atoms, an aralkyl group having from 7 to 20 carbon atoms, and an aryl group having from 6 to 19 carbon atoms; and when R² and R³ are not independent, they may have carbon atoms jointly and form ring having from 3to 20carbon atoms. Y' represents N, O or S, and Z' represents CH or N.

The specific examples of spiropyran compounds preferably used in the invention include benzospiropyran compounds, e.g., 1,3,3-trimethylindolino-8'-methoxybenzopyrylospiran, 1,3,3-trimethylindolino-6'-nitrobenzopyrylospiran, 1,3,3-trimethylindolino-6'-nitro-8'-methoxybenzopyrylospiran, 1,3,3-trimethylindolino-5-methoxy-6'-nitrobenzopyrylospiran, 1,3,3-trimethylindolino-6'-bromo-8'-nitrobenzopyrylospiran and 1,3,3-trimethylindolinobenzopyrylospiran, naphthospiropyran compounds, e.g., 1,3,3-trimethylindolino-7'-nitronaphthopyrylospiran, 1,3,3-trimethylindolino-8'-nitronaphthopyrylospiran, and 1,3,3-trimethylindolino-naphthospiropyran, and 1,3,3-trimethylindolinobenzospiro-thiopyran.

The specific examples of spirooxazine preferably used in the invention include 1,3,3-trimethylspiro[2H-indole-2,3-[3H]pyrido[4,3-f][1,4]benzoxazine], 4-fluoro-1,3,3-trimethylspiro[2H-indole-2,3'-[3H]pyrido[4,3-f][1,4]-benzoxazine], 5-fluoro-1,3,3-trimethylspiro[2H-indole-2,3+-[3H]pyrido[4,3-f][1,4]benzoxazine], 6-fluoro-1,3,3-trimethylspiro[2H-indole-2,3'-[3H]pyrido[4,3-f][1,4]-benzoxazine], 5-chloro-1,3,3-trimethylspiro[2H-indole-2,3'-[3H]pyrido[4,3-f][1,4]benzoxazine], 5-bromo-1,3,3-trimethylspiro[2H-indole-2,3'-[3H]pyrido[4,3-f][1,4]-benzoxazine], 1'-methyldispiro[cyclohexan-1,3'-[3H]indole-2'(1'H),3''-[3H]pyrido[4,3-f][1,4]benzoxazine], 4-fluoro-1'-methyldispiro[cyclohexane-1,3'-[3H]indole-2'(1'H),3''-[3H]pyrido[4,3-f][1,4]benzoxazine], 5-fluoro-1'-methyldispiro[cyclohexane-1,3'-[3H]indole-2'(1'H),3''-[3H]pyrido[4,3-f][1,4]benzoxazine], 6-fluoro-1'-methyldispiro[cyclohexane-1,3'-[3H]indole-2'(1'H),3''-[3H]-pyrido[4,3-f][1,4]benzoxazine], 5-chloro-1'-methyldispiro-[cyclohexane-1,3'-[3H]indole-2'(1'H),3''-[3H]pyrido[4,3-f]-[1,4]benzoxazine], 5-bromo-1'-methyldispiro[cyclohexane-1,3'-[3H]indole-2'(1'),3''-[3H]pyrido[4,3-f][1,4]-benzoxazine], and the compounds exemplified below.

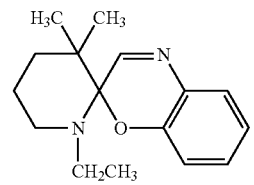

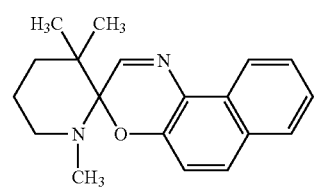

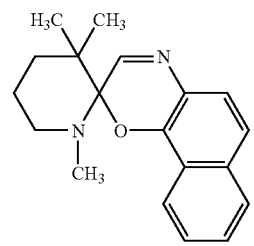

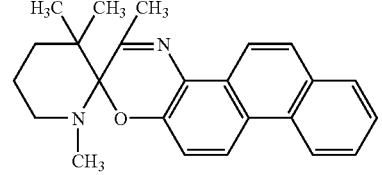

-continued
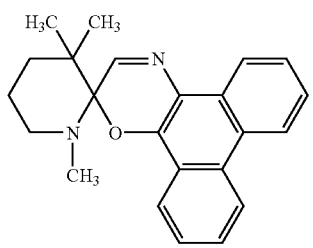
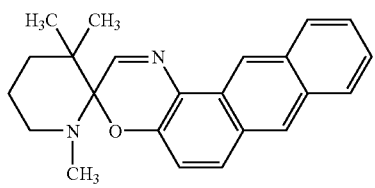
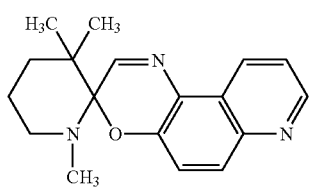
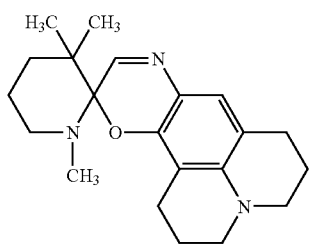
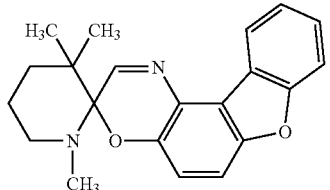
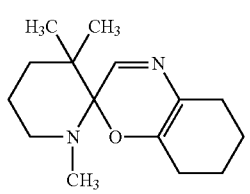
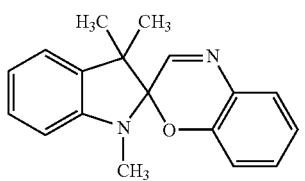
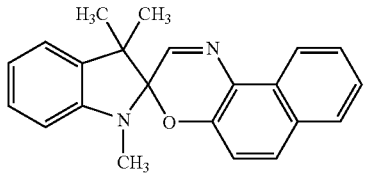
-continued
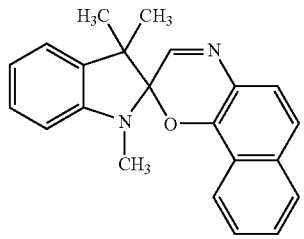
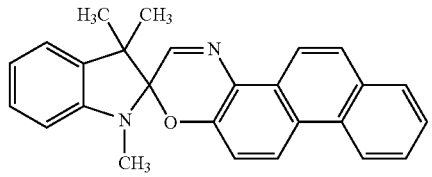
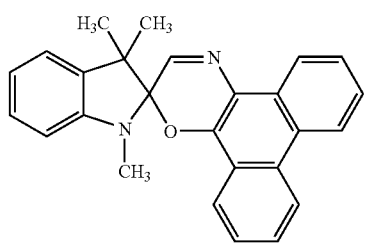
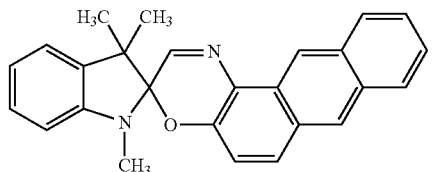
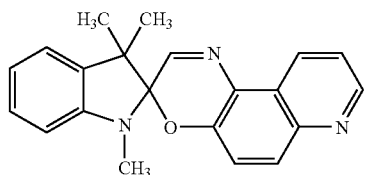
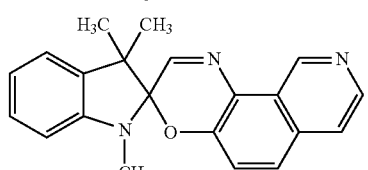
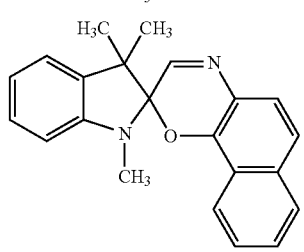
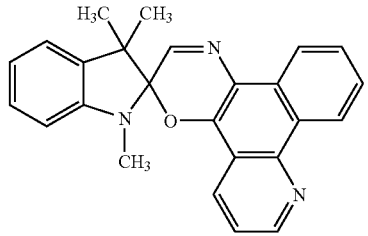

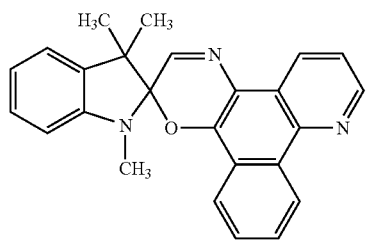
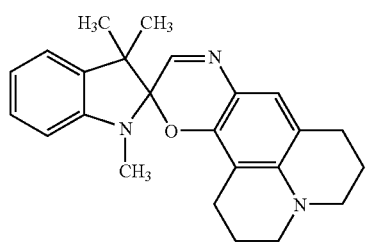
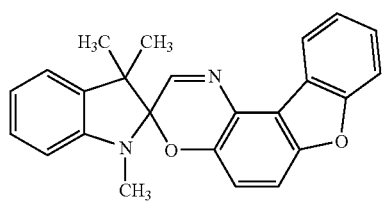
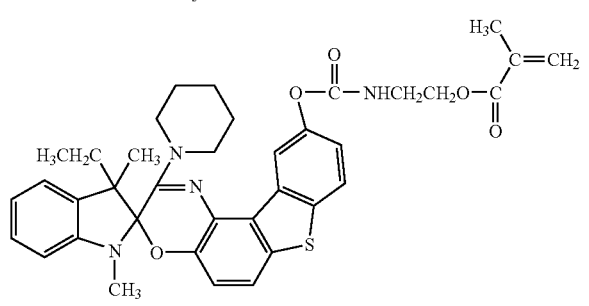
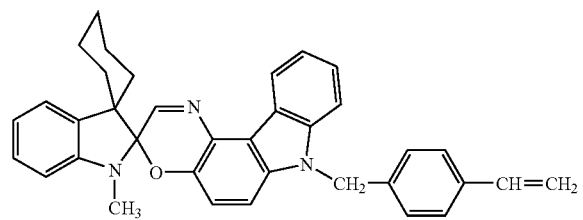
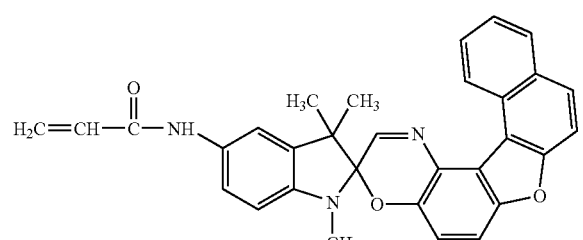
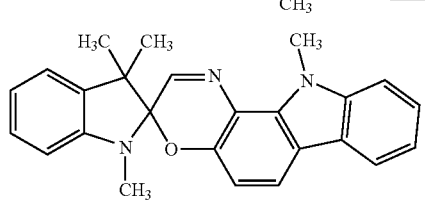
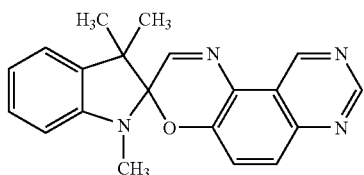
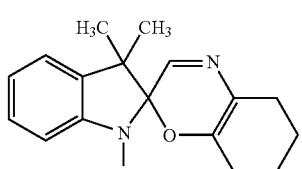
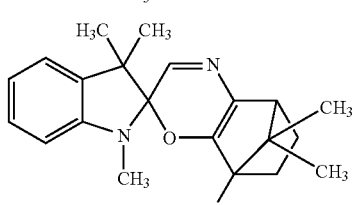
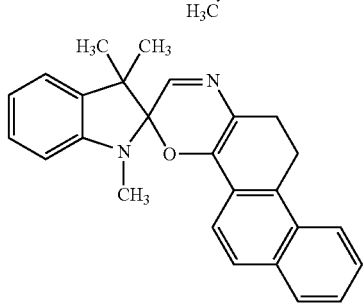
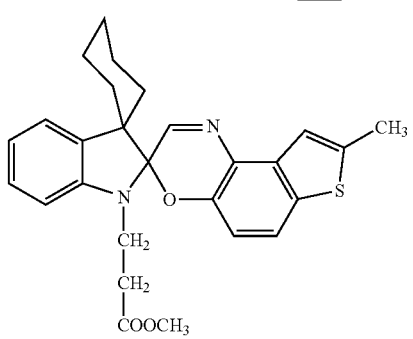
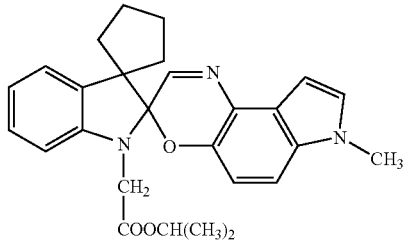
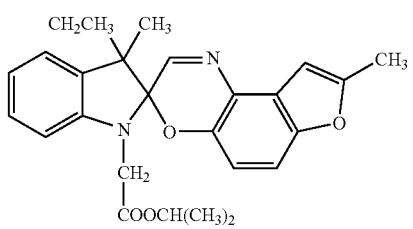

-continued
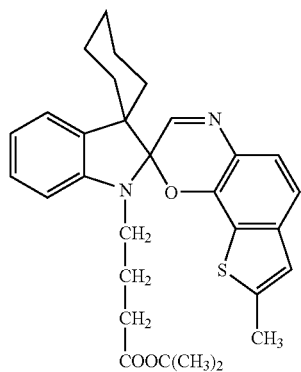
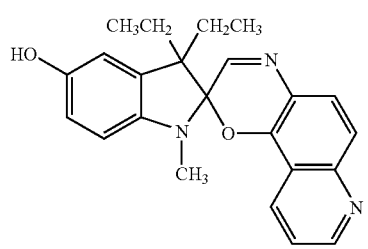
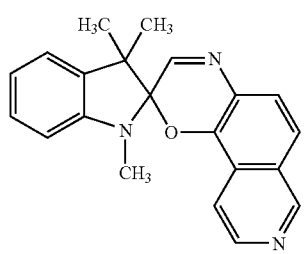
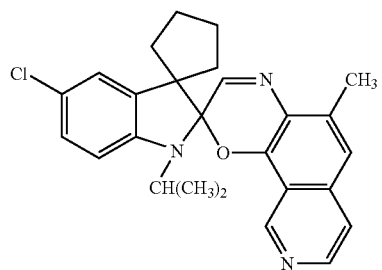
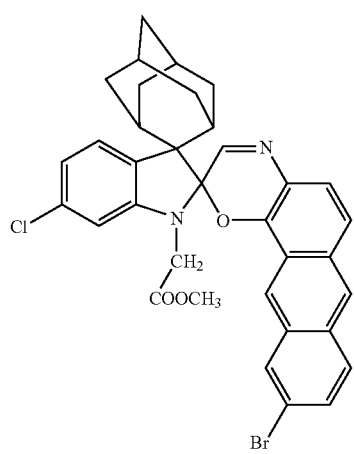
-continued
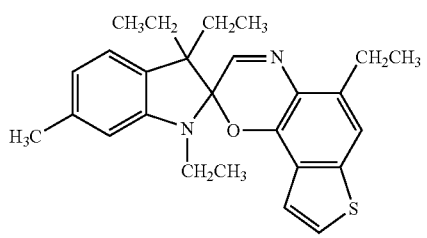
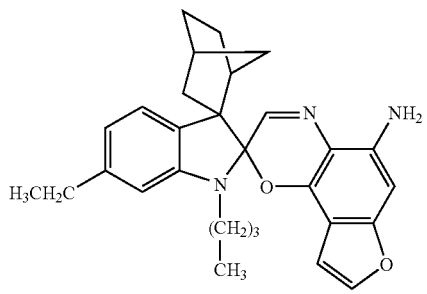
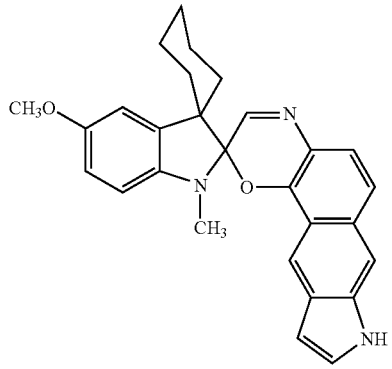
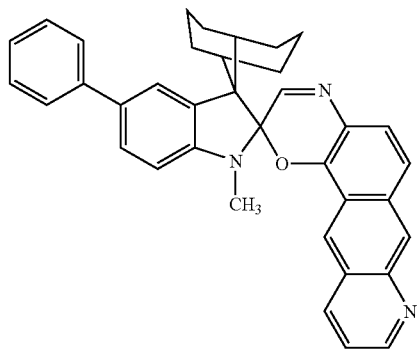
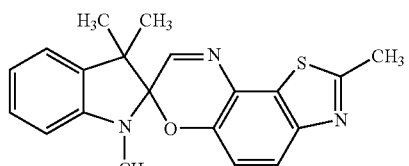
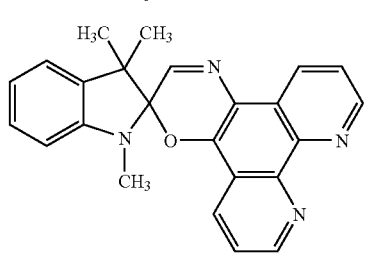

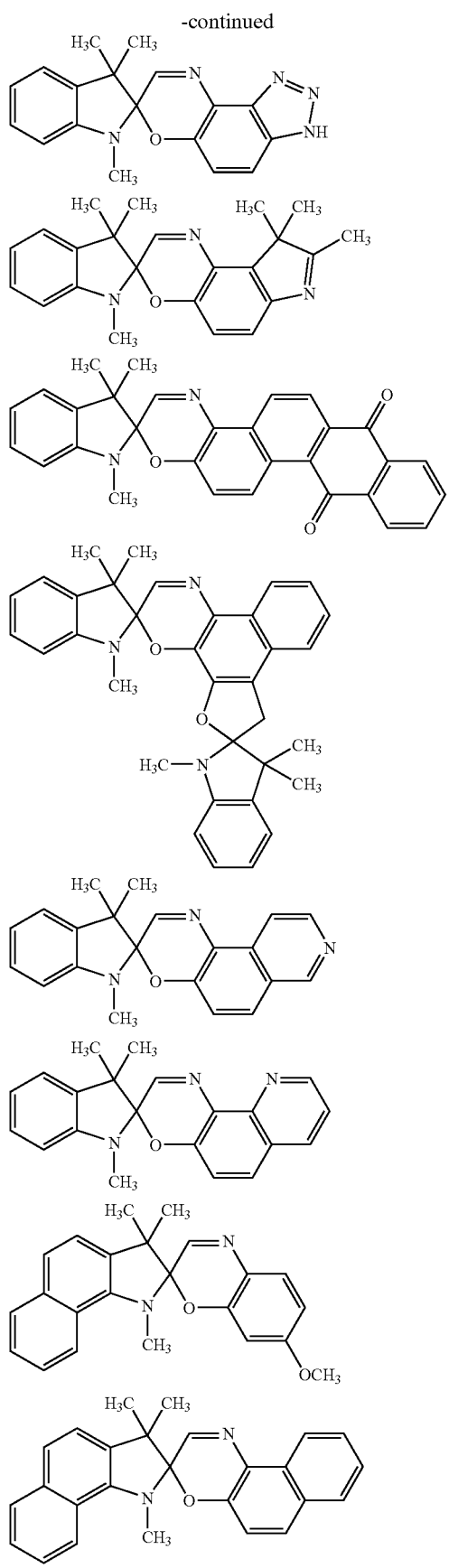
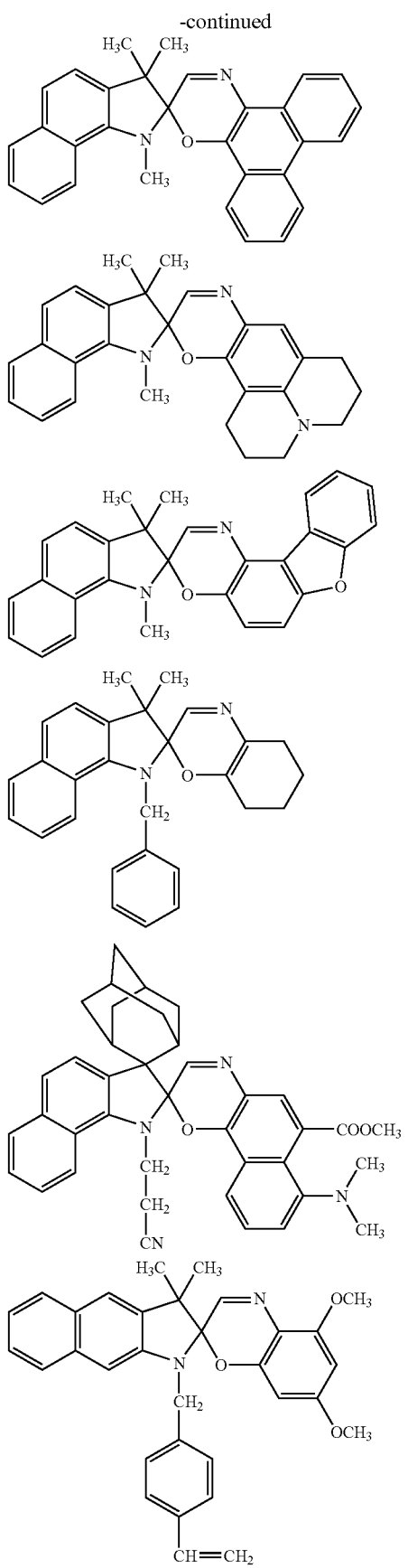

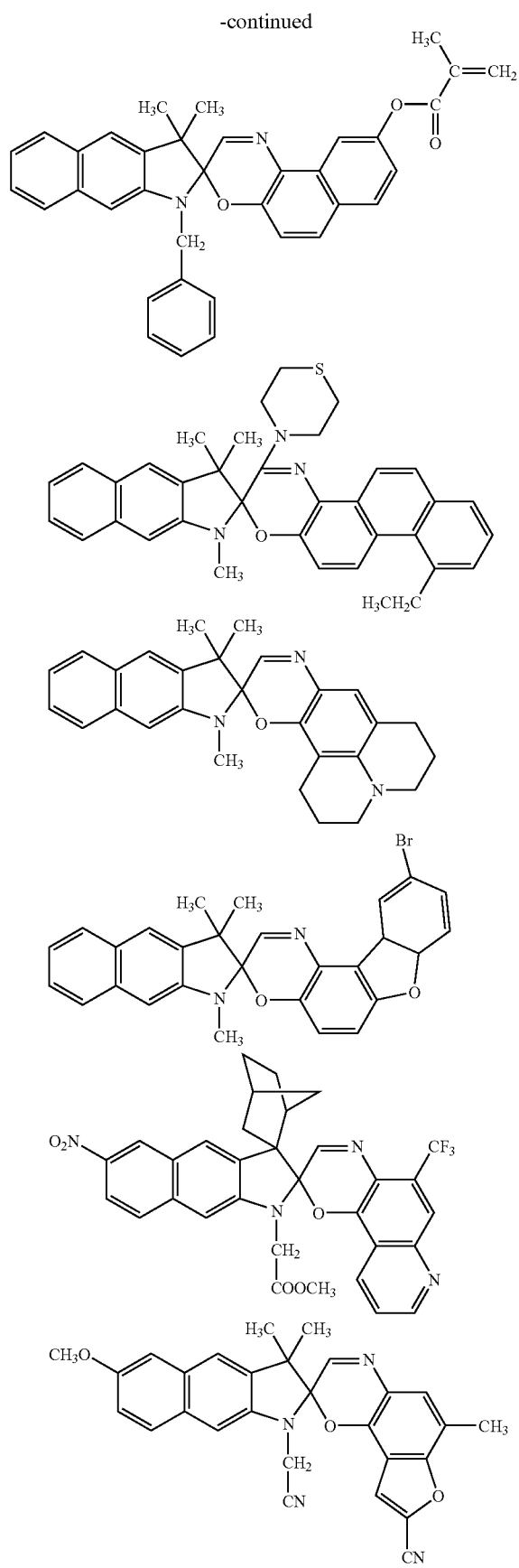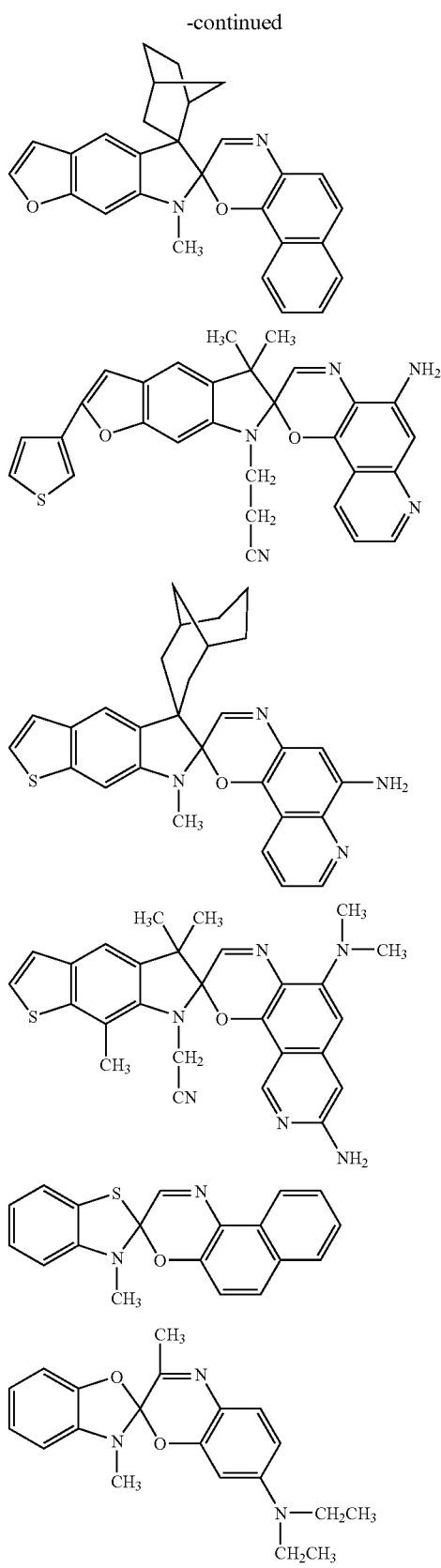

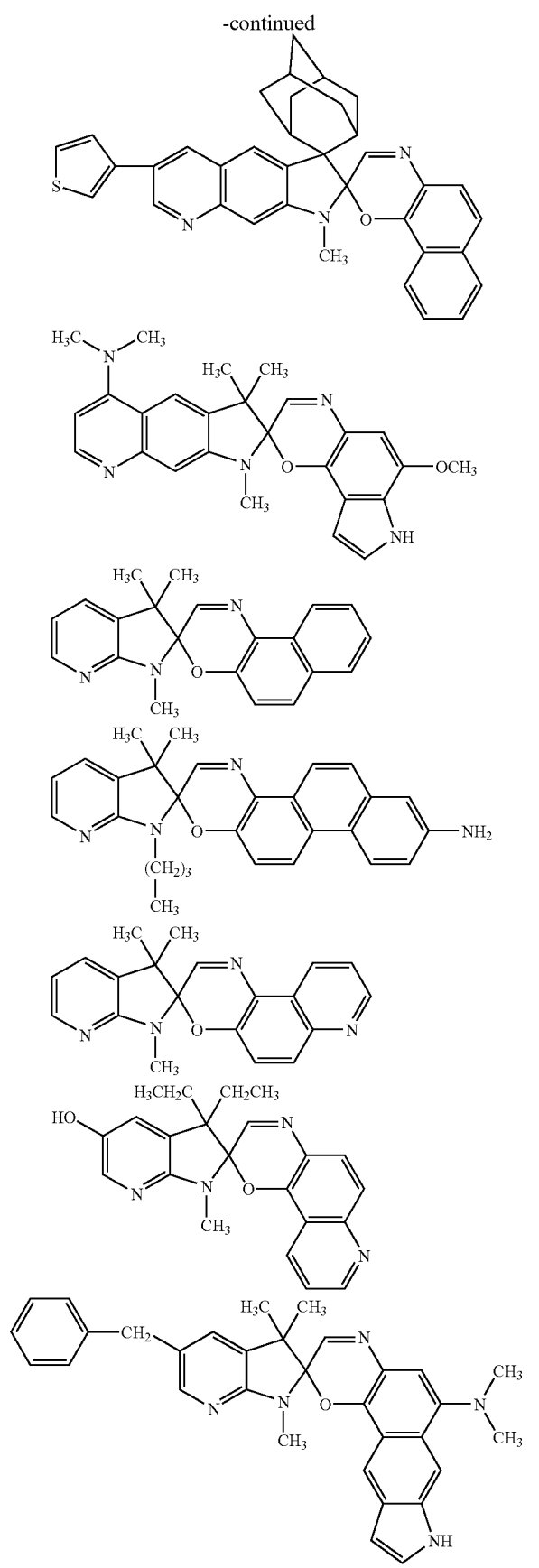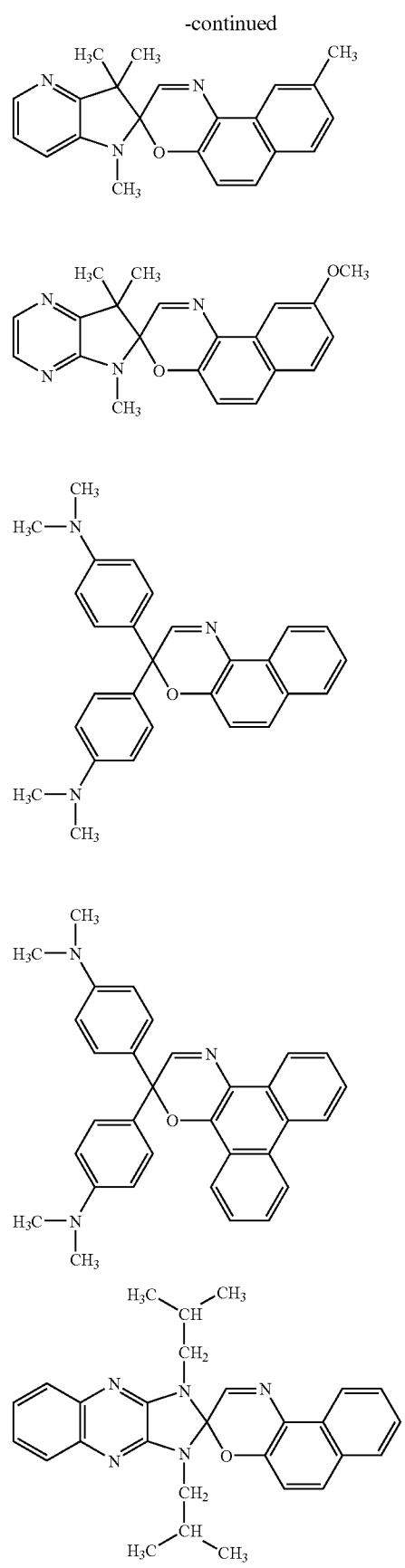

-continued

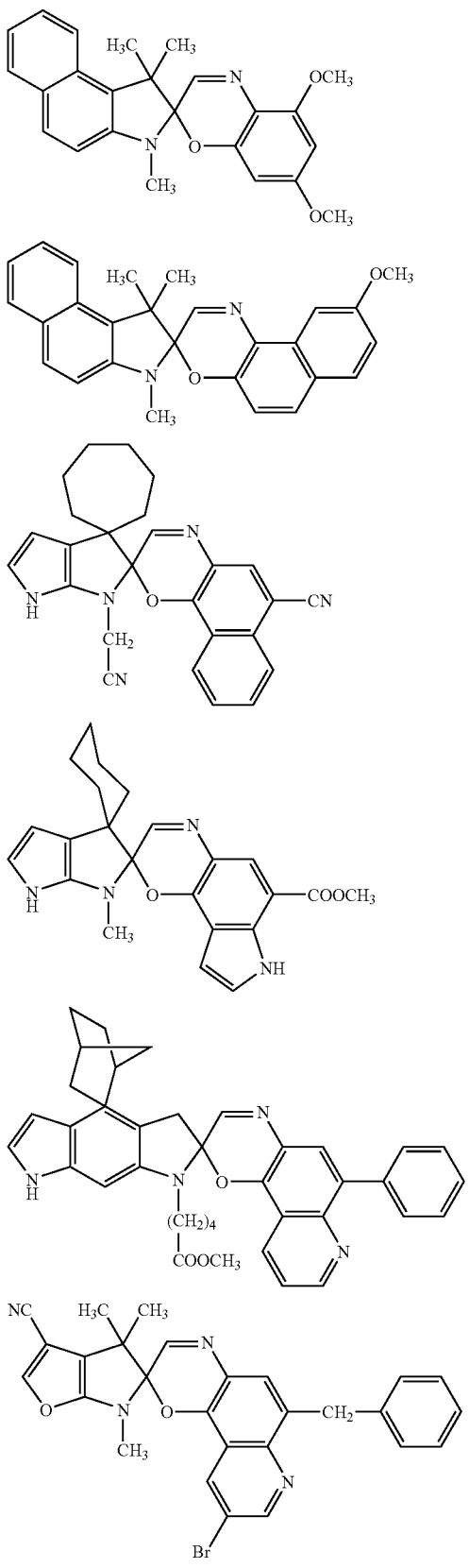
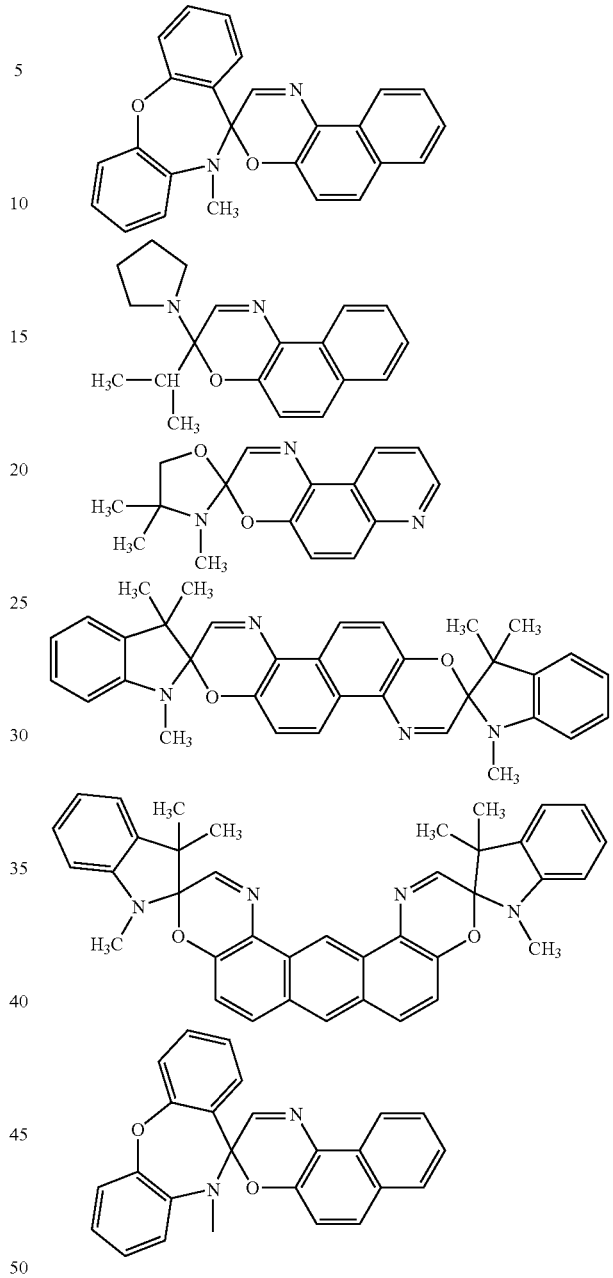

The specific examples of indolinooxazolidine compounds preferably used in the invention include 2-{2-[4-(dimethylamino)phenyl]ethenyl}-3,3-dimethylindolino[2,1-b]-oxazolidine, 2-{4-[4-(dimethylamino)phenyl]-1,3-butadienyl}-3,3-dimethylindolino[2,1-b]oxazolidine, and 3,3-dimethyl-2-{2-[9ethyl-3-carbazolyl]ethenyl}indolino-[2,1-b]oxazolidine.

Of the above compounds, compounds having spiropyran or spirooxazine as the mother nucleus are most preferred for ensuring sufficient visibility.

As the above acid groups having a pKa of 11 or less, the acid groups shown in the following (1) to (6) are preferred.
(1) A phenolic hydroxyl group (—Ar—OH)
(2) A sulfonamido group (—SO$_2$NH—R)
(3) A substituted sulfonamido-based acid group (—SO$_2$NHCOR, —SO$_2$NHSO$_2$R, —CONHSO$_2$R)

(4) A carboxylic acid group (—CO$_2$H)
(5) A sulfonic acid group (—SO$_3$H)
(6) A phosphoric acid group (—OPO$_3$H$_2$)

In the above (1) to (6), Ar represents a divalent aryl linking group which may have a substituent, and R represents a hydrocarbon group which may have a substituent. Of the acid groups selected from (1) to (6), it is preferred to have (3) a substituted sulfonamido-based acid group, (4) a carboxylic acid group or (5) a sulfonic acid group, and (5) a sulfonic acid group is most preferred for ensuring sufficient visibility.

As the derivatives of the acid group having a pKa of 11 or less, the esters, amides and acetals of the acid groups having a pKa of 11 or less are exemplified. Of these compounds, esters and acetals are preferred for high sensitivity, and esters are particularly preferred.

The specific examples of groups capable of generating acid groups having a pKa of 11 or less include, e.g., onium groups such as a sulfonium group, an iodonium group and a diazonium group. The onium groups preferably used in the invention are onium groups represented by the following formulae (R-I) to (R-III).

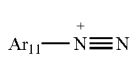
(R-I)

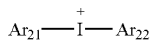
(R-II)

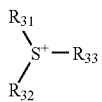
(R-III)

In formula (RI-I), Ar$_{11}$ represents an aryl group having 20 or less carbon atoms, which may have from 1 to 6 substituents, and as the preferred substituents, an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxyl group having from 1 to 12 carbon atoms, an aryloxy group having from 1 to 12 carbon atoms, a halogen atom, an alkylamino group having from 1 to 12 carbon atoms, a dialkylamino group having from 1 to 12 carbon atoms, an alkylamido group or arylamido group having from 1 to 12 carbon atoms, a carbonyl group, a carboxyl group, a cyano group, a sulfonyl group, a thioalkyl group having from 1 to 12 carbon atoms, and a thioaryl group having from 1 to 12 carbon atoms are exemplified. Z$_{11}$$^-$ represents a monovalent anion, and specifically a halogen ion, a perchlorate ion, a hexafluoro-phosphate ion, a tetrafluoroborate ion, a sulfonate ion, a sulfinate ion, a thiosulfonate ion and a sulfite ion are exemplified. In particular, in view of stability, a perchlorate ion, a hexafluorophosphate ion, a tetrafluoroborate ion, a sulfonate ion and a sulfinate ion are preferred.

In formula (RI-II), Ar$_{21}$ and Ar$_{22}$ each represents an aryl group having 20 or less carbon atoms, which may have from 1 to 6 substituents, and as the preferred substituents, an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxyl group having from 1 to 12 carbon atoms, an aryloxy group having from 1 to 12 carbon atoms, a halogen atom, an alkylamino group having from 1 to 12 carbon atoms, a dialkylamino group having from 1 to 12 carbon atoms, an alkylamido group or arylamido group having from 1 to 12 carbon atoms, a carbonyl group, a carboxyl group, a cyano group, a sulfonyl group, a thioalkyl group having from 1 to 12 carbon atoms, and a thioaryl group having from 1 to 12 carbon atoms are exemplified. Z$_{21}$$^-$ represents a monovalent anion, and specifically a halogen ion, a perchlorate ion, a hexafluoro-phosphate ion, a tetrafluoroborate ion, a sulfonate ion, a sulinate ion, a thiosulfonate ion and a sulfate ion are exemplified. In view of stability and reactivity, a perchlorate ion, a hexafluorophosphate ion, a tetrafluoroborate ion, a sulfonate ion, a sulfinate ion and a carboxylate ion are preferred.

In formula (RI-III), R$_{31}$, R$_{32}$ and R$_{33}$ each represents an aryl, alkyl alkenyl or alkynyl group having 20 or less carbon atoms, which may have from 1 to 6 substituents. Above all, in view of stability and reactivity, an aryl group is preferred. As the substituents, an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxyl group having from 1 to 12 carbon atoms, an aryloxy group having from 1 to 12 carbon atoms, a halogen atom, an alkylamino group having from 1 to 12 carbon atoms, a dialkylamino group having from 1 to 12 carbon atoms, an alkylamido group or arylamido group having from 1 to 12 carbon atoms, a carbonyl group, a carboxyl group, a cyano group, a sulfonyl group, a thioalkyl group having from 1 to 12 carbon atoms, and a thioaryl group having from 1 to 12 carbon atoms are exemplified. Z$_{31}$$^-$ represents a monovalent anion, and specifically a halogen ion, a perchlorate ion, a hexafluoro-phosphate ion, a tetrafluoroborate ion, a sulfonate ion, a sulfinate ion, a thiosulfonate ion, and a sulfate ion are exemplified. In particular, in view of stability and reactivity, a perchlorate ion, a hexafluorophosphate ion, a tetrafluoroborate ion, a sulfonate ion, a sulfinate ion and a carboxylate ion are preferred. As more preferred carboxylate ions, the carboxylate ions disclosed in JP-A-2001-343742 are exemplified, and the carboxylate ions disclosed in JP-A-2002-148790 are particularly preferred.

Of these onium groups, sulfonium groups and iodonium groups arc preferred, and sulfonium groups are most preferred for high sensitivity.

The compound of the invention can be used alone, but two kinds or more may be used in combination. The addition amount is preferably from 1 μmol to 10 mmol/m$^2$, and more preferably from 10 μmol to 1 mmol/cm$^2$.

The specific examples of the compounds of the invention are exemplified below but the invention is by no means limited thereto.

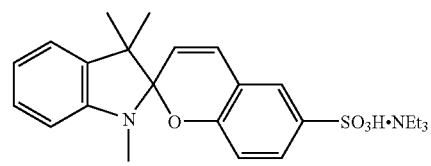
(1)

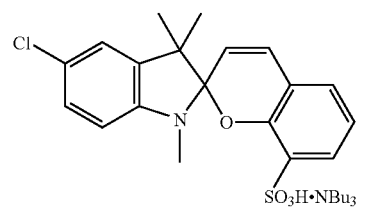
(2)

-continued
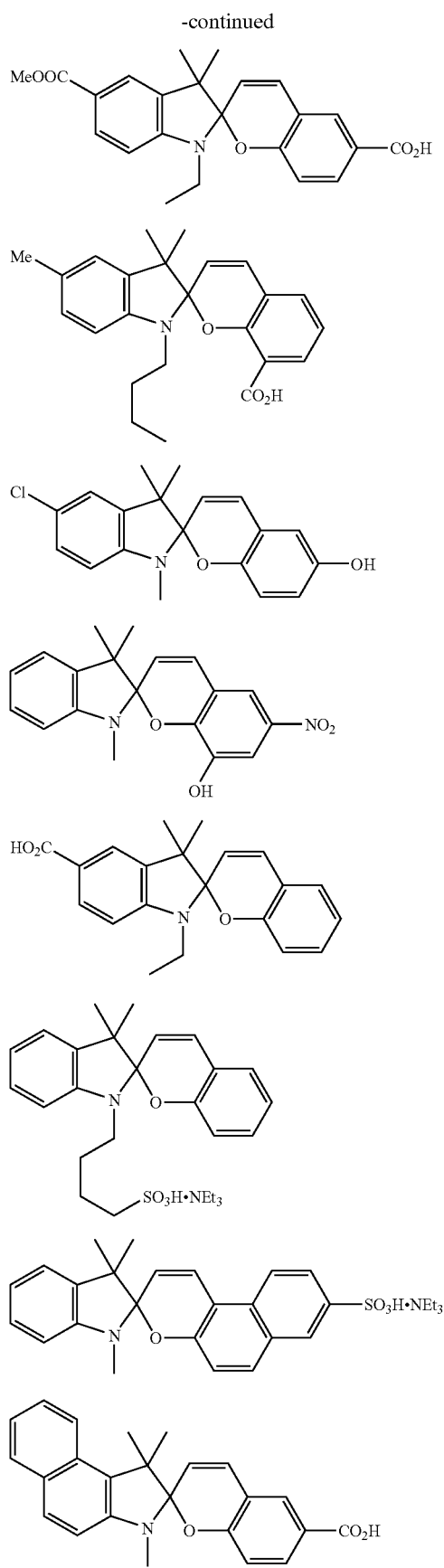
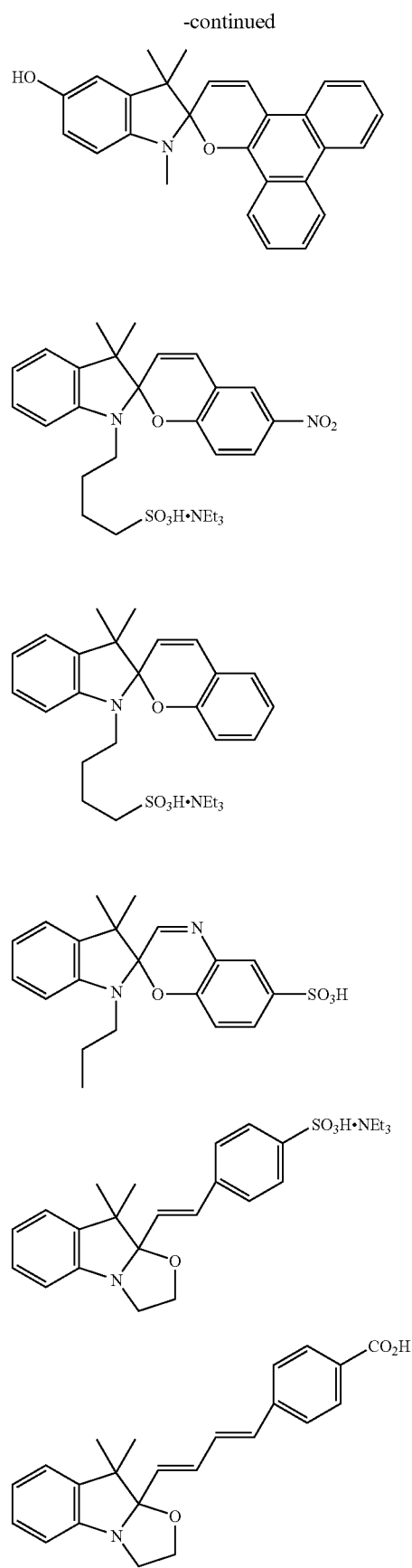

-continued
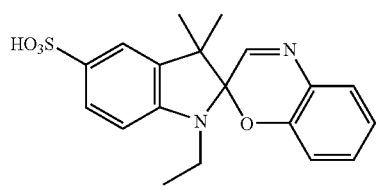
(17)
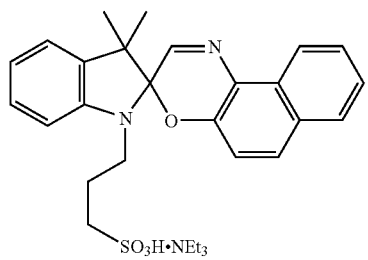
(18)
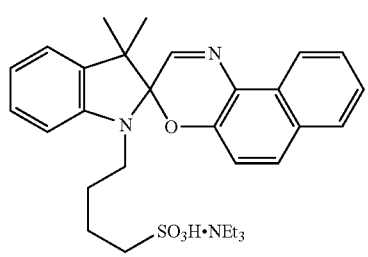
(19)
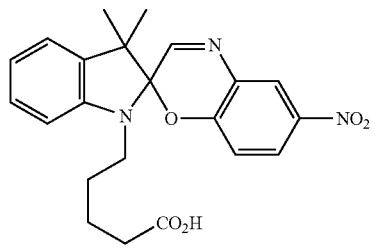
(20)
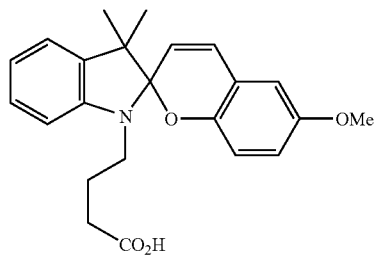
(21)
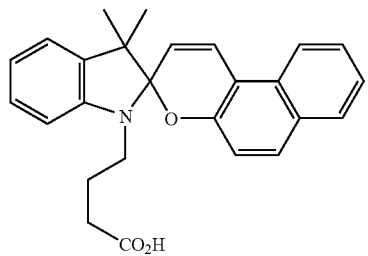
(22)
-continued
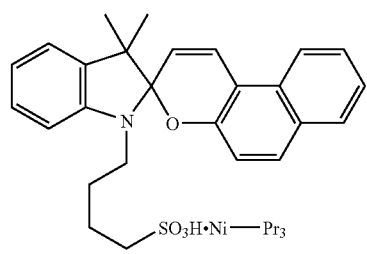
(23)
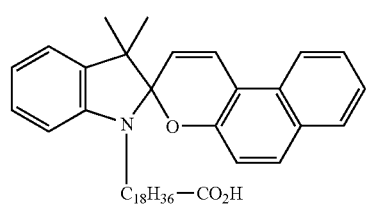
(24)
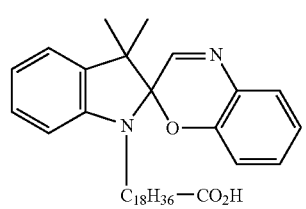
(25)
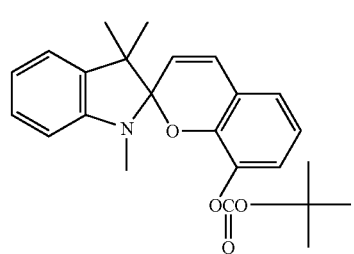
(26)
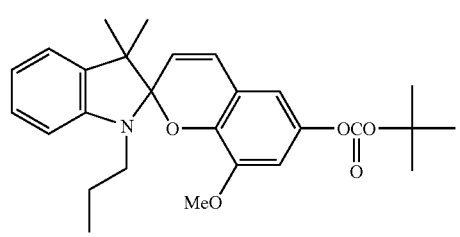
(27)
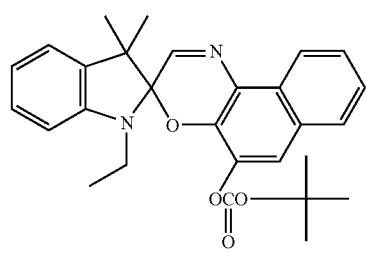
(28)

(29)
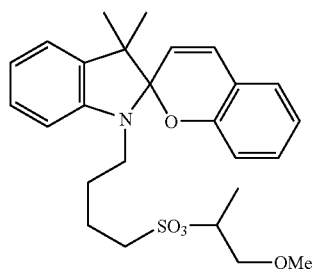
(30)
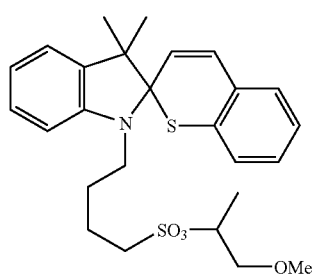
(31)
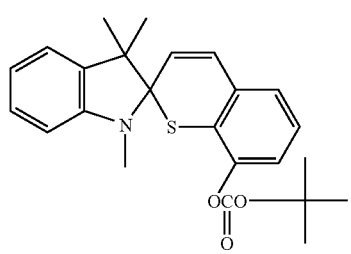
(32)
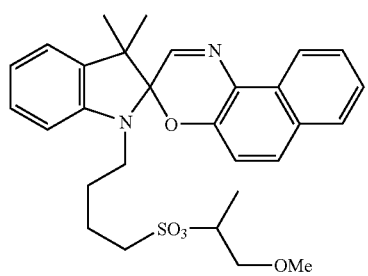
(33)
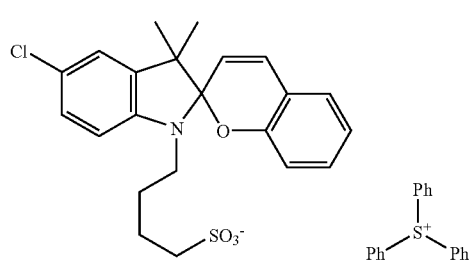
(34)
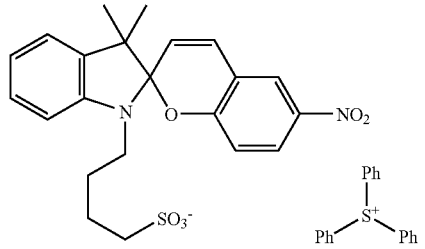
(35)
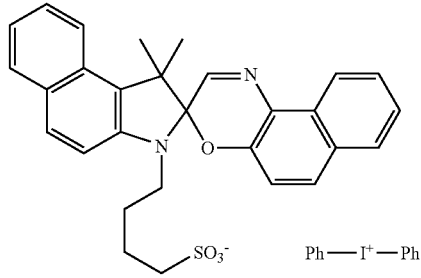
(36)
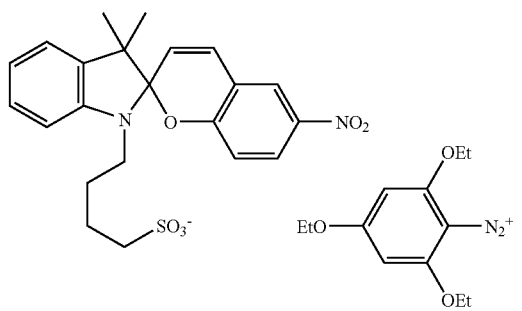
(37)
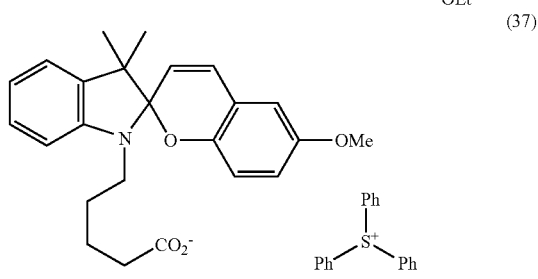
(38)
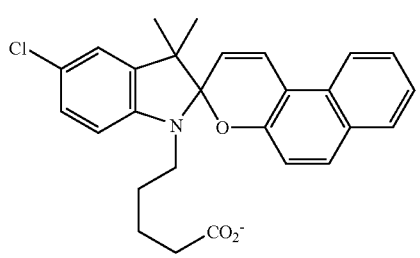
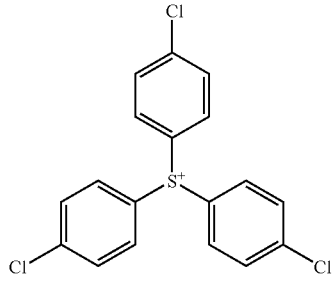
(39)
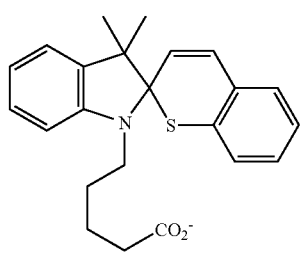

-continued

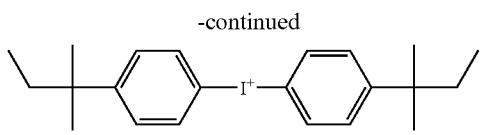

(40)
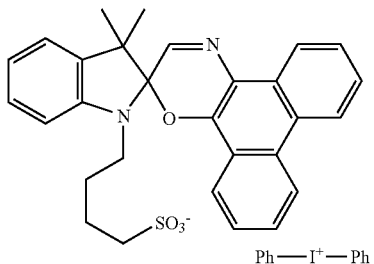

(41)
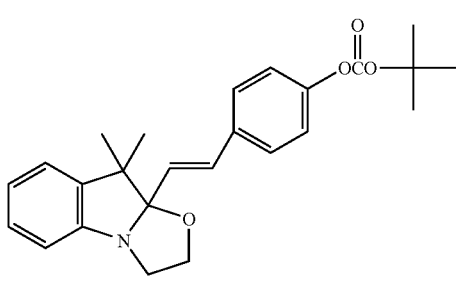

(42)
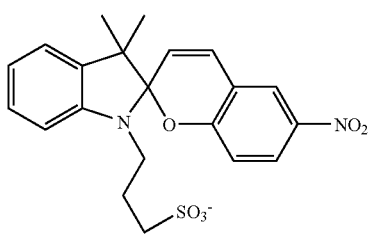

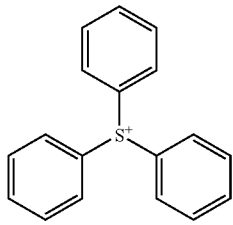

(43)
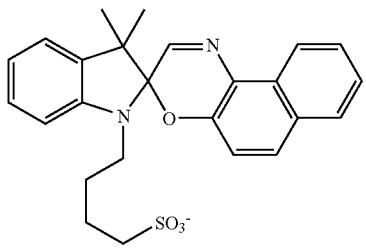

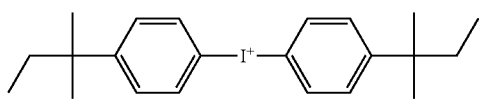

-continued

(42)
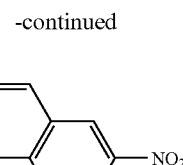

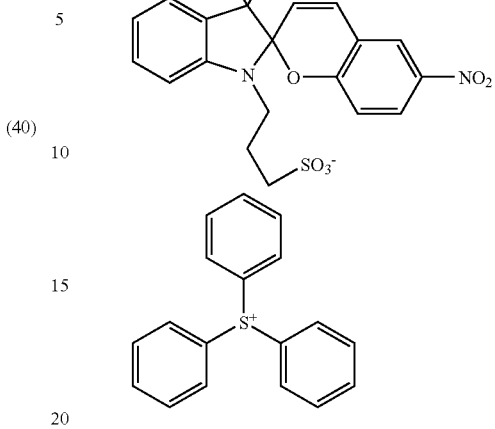

(43)
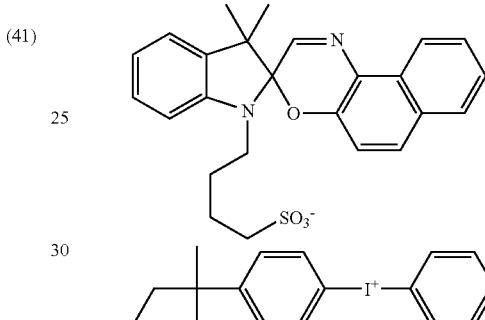

Infrared Absorber:

It is preferred for the image-recording material in the invention to contain infrared absorbers for increasing sensitivity to infrared lasers. Infrared absorbers have a function to convert absorbed infrared rays to heat. Infrared absorbers fore use in the invention are dyes or pigments having an absorption maximum in the wavelength of front 760 to 1,200 nm.

As dyes for this purpose, commercially available dyes and well-known dyes described in literatures, e.g., *Senryo Binran* (*Dye Handbook*), compiled by Yuki Gosei Kagaku Kyokai (1970) can be used. Specifically, azo dyes, metal complex azo dyes, pyrazolone azo dyes, naphthoquinone dyes, anthraquinone dyes, phthalocyanine dyes, carbonium dyes, quinoneimine dyes, methine dyes, cyanine dyes, squarylium dyes, pyrylium salts and metal thiolate complexes are exemplified.

As preferred dyes, e.g., the cyanine dyes disclosed in JP-A-58-125246, JP-A-59-84356 and JP-A-60-78787, the methine dyes disclosed in JP-A-58-173696, JP-A-58-181690 and JP-A-58-194595, the naphthoquinone dyes disclosed in JP-A-58-112793, JP-A-58-224793, JP-A-59-48187, JP-A-59-73996, JP-A-60-52940 and JP-A-60-63744, the squarylium dyes disclosed in JP-A-58-112792, and the cyanine dyes disclosed in British Patent 434,875 are exemplified.

Further, the near infrared absorbing sensitizers disclosed in U.S. Pat. No. 5,156,938 are also preferably used, in addition, the substituted arylbenzo(thio)pyrylium salts disclosed in U.S. Pat. No. 3,881,924, the trimethine thiapyrylium salts disclosed in JP-A-57-142645 (corresponding to U.S. Pat. No. 4,327,169), the pyrylium-based compounds disclosed in JP-A-58-181051, JP-A-58-220143, JP-A-59-41363, JP-A-59-84248, JP-A-59-84249, JP-A-59-146063 and JP-A-59-

146061, the cyanine dyes disclosed in JP-A-59-216146, the pentamethine thiopyrylium salts disclosed in U.S. Pat. No. 4,283,475, and the pyrylium compounds disclosed in JP-B-5-13514 (the term "JP-B" as used herein refers to an "examined Japanese patent publication") and JP-B-5-19702 are also preferably used in the invention. As other examples of preferred dyes, the near infrared absorbing dyes disclosed in U.S. Pat. No. 4,756,993 as the compounds represented by formulae (I) and (II) can be exemplified.

As other preferred examples of infrared absorbing dyes in the invention, the specific indolenine cyanine dyes disclosed in JP-A-2002-278057 as shown below can be exemplified.

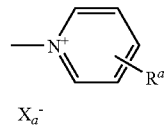

wherein $X^2$ represents an oxygen atom, a nitrogen atom or a sulfur atom; $L^1$ represents a hydrocarbon group having from 1 to 12 carbon atoms, an aromatic ring having a hetero atom,

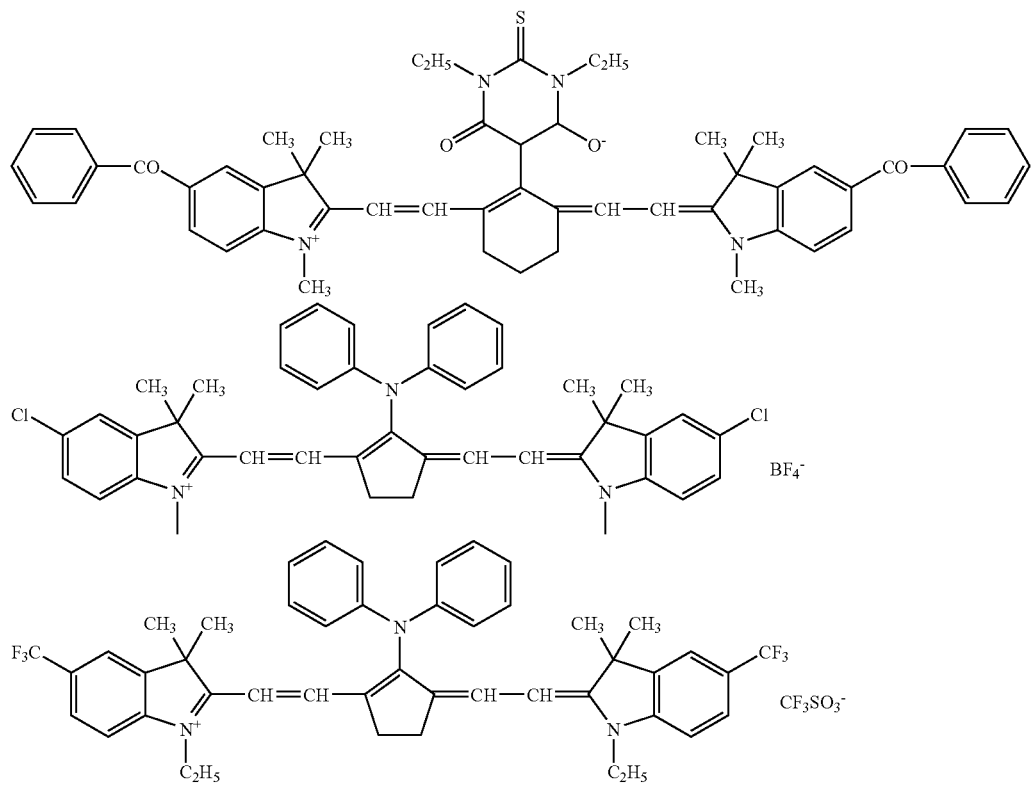

Of these dyes, cyanine dyes, squarylium dyes, pyrylium salts, nickel thiolate complexes and indolenine cyanine dyes are exemplified as particularly preferred dyes. Cyanine dyes and indolenine cyanine dyes are more preferred, and as one particularly preferred example, a cyanine dye represented by the following formula (II) is exemplified.

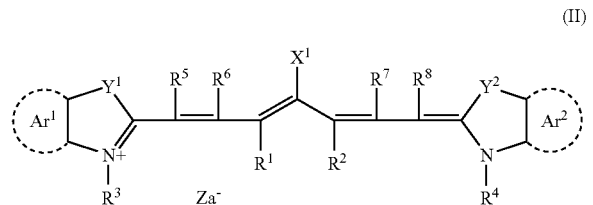

wherein $X^1$ represents a hydrogen atom, a halogen atom, —$NPh_2$, $X^2$-$L^1$, or a group shown below.

or a hydrocarbon group containing a hetero atom having from 1 to 12 carbon atoms. The hetero atoms here mean N, S, O, a halogen atom and Se. $X_a^-$ is defined as the same with the later-described $Z_a^-$, and $R^a$ represents a substituent selected from a hydrogen atom, an alkyl group, an aryl group, a substituted or unsubstituted amino group and a halogen atom.

In formula (II), $R^1$ and $R^2$ each represents a hydrocarbon group having from 1 to 12 carbon atoms. In view of the storage stability of a recording layer coating solution, $R^1$ and $R^2$ each preferably represents a hydrocarbon group having 2 or more carbon atoms, and particularly preferably $R^1$ and $R^2$ are bonded to each other to form a 5- or 6-membered ring.

$Ar^1$ and $Ar^2$, which may be the same or different, each represents an aromatic hydrocarbon group which may have a substituent. The examples of preferred aromatic hydrocarbon groups include a benzene ring and a naphthalene ring. The preferred examples of the substituents include a hydrocarbon group having 12 or less carbon atoms, a halogen atom, and an alkoxyl group having 12 or less carbon atoms. $Y^1$ and $Y^2$, which may be the same or different, each represents a sulfur atom or a dialkylmethylene group having 12 or less carbon atoms. $R^3$ and $R^4$, which may be the same or different, each represents a hydrocarbon group having 20 or less carbon atoms which may have a substituent. The preferred examples of the substituents include an alkoxyl group having 12 or less carbon atoms, a carboxyl group and a sulfo group. $R^5$, $R^6$, $R^7$ and $R^8$, which may be the same or different, each represents a hydrogen atom or a hydrocarbon group having 12 or less carbon atoms, preferably a hydrogen atom because of easy availability of the material. $Z_a^-$ represents a counter anion, provided that when a cyanine dye represented by formula (II) has an anionic substituent within the structure and the neutralization of the electric charge is not necessary, $Z_a^-$ is not necessary. $Z_a^-$ preferably represents a halogen ion, a perchlorate ion, a tetrafluoroborate ion, a hexafluorophosphate ion or a sulfonate ion for the storage stability of the recording layer coating solution, and particularly preferably $Z_a^-$ represents a perchlorate ion, a hexafluorophosphate ion or an arylsulfonate ion.

As the specific examples of cyanine dyes represented by formula (II) that can be preferably used in the invention, those disclosed in JP-A-2001-133969, paragraphs [0017] to [0019] are exemplified.

Further, as particularly preferred other examples of infrared absorbers, the specific indolenine cyanine dyes disclosed in JP-A-2002-278057 are exemplified.

As the pigments for use in the present invention, commercially available pigments and the pigments described in *Color Index (C.I.) Binran (Color Index Bulletin)*, *Shaishin Ganryo Binran (The Latest Pigment Handbook)*, compiled by Nippon Ganryo Gijutsu Kyokai (1977), *Shaishin Ganryo Oyo Gijutsu (The Latest Pigment Applied Techniques)*, CMC Publishing Co. Ltd. (1986), *Insatsu Ink Gijutsu (Printing Ink Techniques)*. CMC Publishing Co. Ltd. (1984) can be used.

Various kinds of pigments can be used in the invention, e.g., black pigments, yellow pigments, orange pigments, brown pigments, red pigments, purple pigments, blue pigments, green pigments, fluorescent pigments, metallic powder pigments, and polymer-bond pigments can be exemplified. Specifically, insoluble azo pigments, azo lake pigments, condensation azo pigments, chelate azo pigments, phthalocyanine pigments, anthraquinone pigments, perylene and perinone pigments, thioindigo pigments, quinacridone pigments, dioxazine pigments, isoindolinone pigments, quinophthalone pigments, in-mold lake pigments, azine pigments, nitroso pigments, nitro pigments, natural pigments, fluorescent pigments, inorganic pigments, and carbon black can be used. Of these pigments, carbon black is preferably used.

These pigments can be used without surface treatment or the surfaces may be treated. As the methods of surface treatments, a method of coating the surface of pigments with resins and waxes, a method of adhering surfactants, and a method of bonding reactive substances (e.g., silane coupling agents, epoxy compounds, or polyisocyanate) on the surfaces of pigments can be exemplified. These surface treatment methods are described in *Kinzoku Sekken no Seishitsu to Oyo (Natures and Applications of Metal Soaps)*, Saiwai Shobo, *Insatsu Ink Gijutsu (Printing Ink Techniques)*, CMC Publishing Co., Ltd. (1984), and *Shaishin Ganryo Oyo Gijutsu (The Latest Pigment Applied Techniques)*, CMC Publishing Co., Ltd. (1986).

The particle size of pigments is preferably from 0.01 to 10 µm, more preferably from 0.05 to 1 µm, and particularly preferably from 0.1 to 1 µm. When the particle size of pigments is in this range, stability of the pigment dispersion in an image-recording layer coating solution and uniformity of an image-recording layer can be obtained.

Well-know dispersing techniques used in the manufacture of inks and toners can be used as the dispersing method of pigments in the invention. The examples of dispersing apparatus include an ultrasonic disperser, a sand mill, an attritor, a pearl mill, a super-mill a ball mill, an impeller, a disperser, a KD mill, a colloid mill, a dynatron, a three-roll mill and a pressure kneader, and details are described in *Shaishin Ganryo Oyo Gijutsu (The Latest Pigment Application Techniques)*, CMC Publishing Co., Ltd. (1986).

These infrared absorbers may be added to the same layer with other components, or a separate layer may be provided and added thereto. Alternatively, infrared absorbers may be added as the form of being encapsulated in microcapsules.

When a negative lithographic printing plate precursor is prepared, it is preferred that infrared absorbers are added so that the absorbance of an image-recording layer at the maximum absorption wavelength in the wavelength range of from 760 to 1,200 nm is from 0.3 to 1.2 by reflection measuring method, more preferably from 0.4 to 1.1. In this range of the addition amount, the polymerization reaction proceeds uniformly in the depth direction of the image-recording layer and good layer strength of the image area and sufficient adhesion to the support can be obtained.

The absorbance of an image-recording layer can be adjusted by the addition amount of an infrared absorber to the image-recording layer and the thickness of the image-recording layer. Absorbance can be measured by ordinary methods, e.g., a method of forming an image-recording layer having an arbitrarily determined thickness in a dry coating weight necessary as the lithographic painting plate on a reflective support, such as an aluminum support, and measuring the reflection density with an optical densitometer, and a method of measuring the absorbance by a reflection method with a spectrophotometer using an integrating sphere are exemplified.

Lithographic Printing Plate Precursor:

As a preferred embodiment of the image-recording material in the invention, a lithographic printing plate precursor is exemplified.

As the image-recording layer of the lithographic printing plate precursor in the invention, (i) an embodiment that contains (1) an infrared absorber and (2) the compound (A), and (ii) an embodiment that contains (1) an infrared absorber and (2) a photochromic compound, are preferably exemplified.

A photochromic compound is a compound having the properties that when it absorbs light, a reversible isomerization reaction occurs in the molecule, and absorption wavelength changes with the structural change, and is disclosed in JP-B-6-9968 1 (the term "JP-B" as used herein refers to an "examined Japanese patent publication"), and JP-A-7-278444 (the term "JP-A" as used herein refers to an "unexamined published Japanese patent application").

As tho photochromic compounds in the invention, specifically, e.g., spiropyran compounds such as spiropyran, naphthopyran and spiroxazine, fulgide compounds as disclosed in U.S. Pat. Nos. 4,882,438, 4,960,678, 5,130,058 and 5,106, 998, chromene compounds and diarylethene compounds are exemplified.

The specific examples of spiropyran and naphthopyran compounds preferably used in the invention include benzospiropyran compounds, e.g., 1,3,3-trimethylindolino-8'-methoxybenzopyrylospiran, 1,3,3-trimethylindolino-6'-nitrobenzopyrylospiran, 1,3,3-trimethylindolino-6'-nitro-8'-methoxybenzopyrylospiran, 1,3,3-trimethylindolino-5-methoxy-6'-nitrobenzopyrylospiran, 1,3,3- trimethylindolino-6'-bromo-8'-nitrobenzopyrylospiran, 1,3,3-trimethylindolinobenzopyrylospiran, 1,3,3-trimethylindolino-8'-hydroxybenzopyrylospiran, 1,3,3-trimethylindolino-7'-hydroxybenzopyrylospiran, 1,3,3-trimethylindolino-6'-hydroxybenzopyrylospiran, 1,3,3-trimethylindolino-8'-carboxybenzopyrylospiran, 1-(4-carboxybenzyl)-3,3-dimethylindolinobenzopyrylospiran, and 1-(2-carboxyethyl)-3,3-dimethylindolinobenzopyrylospiran, naphthospiropyran compounds, e.g., 1,3,3-trimethylindolino-7'-nitronaphthopyrylospiran and 1,3,3-methylindolino-8'-nitronaphthopyrylospiran, and the compound having the following structure.

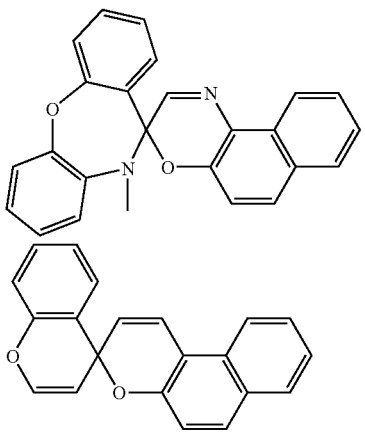

The specific examples of the spirooxazine compounds preferably used in the invention include 1,3,3-trimethyl-spiro[2H-indole-2,3'-[3H]pyrido[4,3-f][1,4]benzoxazine], 4-fluoro-1,3,3-trimethylspiro[2H-indole-2,3'-[3H]pyrido-[4,3-f][1,4]benzoxazine], 5-fluoro-1,3,3-trimethylspiro-[2H-indole-2,3'-[3H]pyrido[4,3-f][1,4]benzoxazine], 6-fluoro-1,3,3-trimethylspiro[2H-indole-2,3'-[3H]pyrido-[4,3-f][1,4]benzoxazine], 5-chloro-1,3,3-trimethylspiro-[H-indole-2,3'-[3H]pyrido[4,3-f][1,4]benzoxazine], 5-bromo-1,3,3-trimethylspiro[2H-indole-2,3'-[3H]pyrido-[4,3-f][1,4]benzoxazine], 1'-methyldispiro[cyclohexane-1,3'-[3H]indole-2'(1'H),3"-[3H]pyrido[4,3-f][1,4]-benzoxazine], 4-fluoro-1'-methyldispiro[cyclohexane-1,3'-[3H]indole-2'(1'H),3"-[3H]pyrido[4,3-f][1,4]benzoxazine], 5-fluoro-1'-methyldispiro[cyclohexane-1,3'-[3H]indole-2'(1'H),3"-[3H]pyrido[4,3-f][1,4]benzoxazine], 6-fluoro-1'-methyldispiro[cyclohexane-1,3'-[3H]indole-2'(1'H),3"-[3H]-pyrido[4,3-f][1,4]benzoxazine], 5-chloro-1'-methyldispiro-[cyclohexane-1,3'-[3H]indole-2'(1'H),3"-[3H]pyrido[4,3-f]-[1,4]benzoxazine], and 5-bromo-1'-methyldispiro-[cyclohexane-1,3'-[3H]indole-2'(1'H),3"-[3H]pyrido-[4,3-f][1,4]benzoxazine].

The specific examples of the fulgide compounds preferably used in the invention include N-cyanomethyl-6,7-dihydro-4-methyl-2-phenylspiro(5,6-benzo[b]thiophene dicarboxyimido-7,2-tricyclo[3,3,1,1]decane), N-cyanomethyl-6,7-dihydro-2-(p-methoxyphenyl)-4-methylspiro(5,6benzo[b]thiophenedicarboxyimido-7,2-tricyclo[3,3,1,1]decane), N-cyanomethyl-6,7-dihydro-4-methylspiro(5,6-benzo[b]thiophenedicarboxyimido-7,2-tricyclo[3,3,1,1]decane), 6,7-dihydro-N-methoxycarbonylmethyl-4methyl-2-phenylspiro(5,6-benzo[b]thiophene-dicarboxyimido-7,2-tricyclo[3,3,1,1]decane), 6,7-dihydro-4-methyl-2-(p-methylphenyl)-N-nitromethylspiro(5,6-benzo[b]thiophenedicarboxyimido-7,2-tricyclo[3,3,1,1]-decane), N-cyanomethyl-6,7-dihydro-4-cyclopropyl-3-methylspiro(5,6-benzo[b]thiophenedicarboxyimido-7,2-tricyclo-[3,3,1,1]decane), and N-cyanomethyl-6,7-dihydro4-cyclopropyl-spiro(5,6-benzo[b]thiophenedicaboxyimido-7,2-tricyclo-[3,3,1,1]decane).

The specific examples of the chromene compounds preferably used in the invention include spiro[norbornane-2,2'-[2H]benzo[h]chromene], spiro[bicyclo[3,3,1]nonane-9,2'-[2H]benzo[f]chromene], 7'-methoxyspiro[bicyclo-[3,3,1]nonane-9,2'-[2H]benzo[f]chromene], 7'-methoxyspiro-[norbornane-2,2'-[2H]benzo[f]chromene], 2,2-dimethyl-7-octoxy[2H]benzo[h]chromene-6)spiro[2-bicyclo(3,3,1)-nonene-9,2'-(2H)benzo(h)chromene], and spiro[2-bicyclo-(3,3,1)nonene-9,2'-(2H)benzo(f)chromene].

The specific examples of the diarylethene compounds preferably used in the invention include the following compounds.

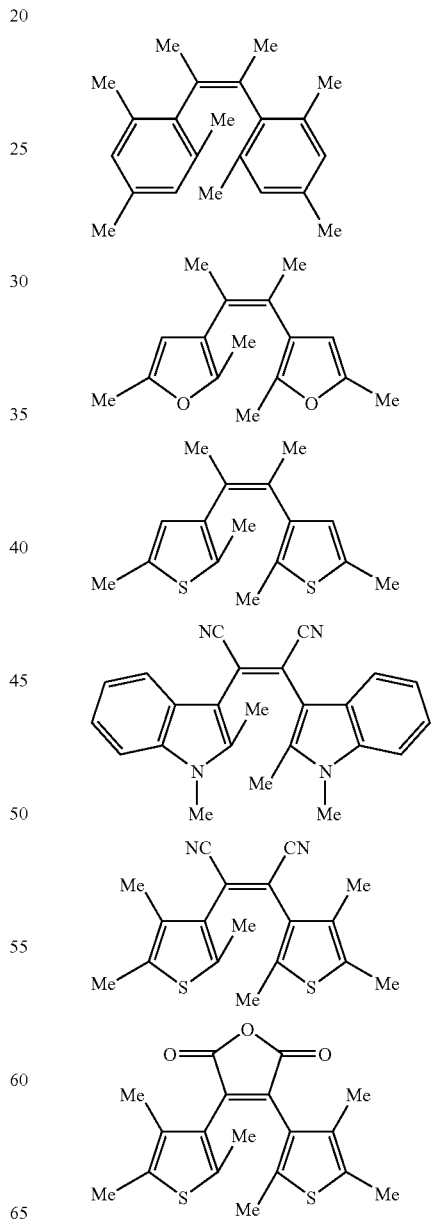

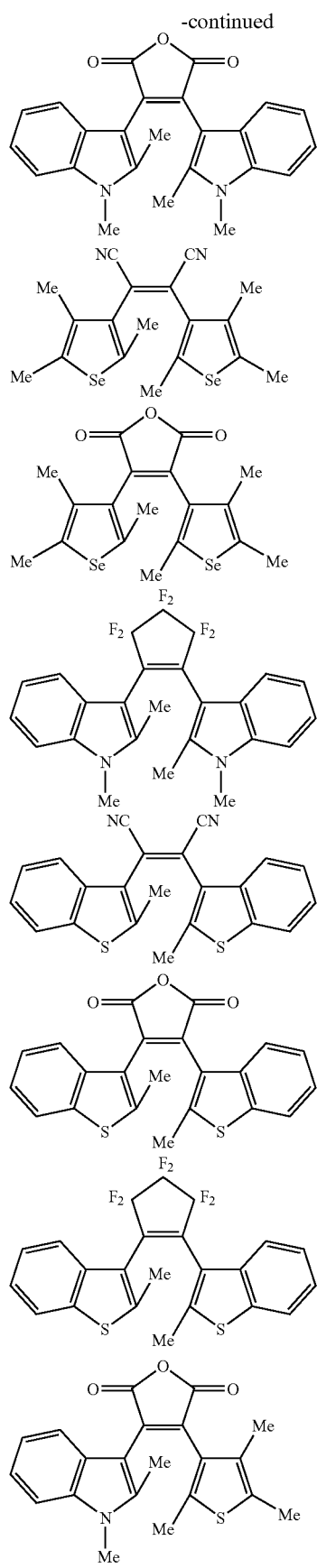
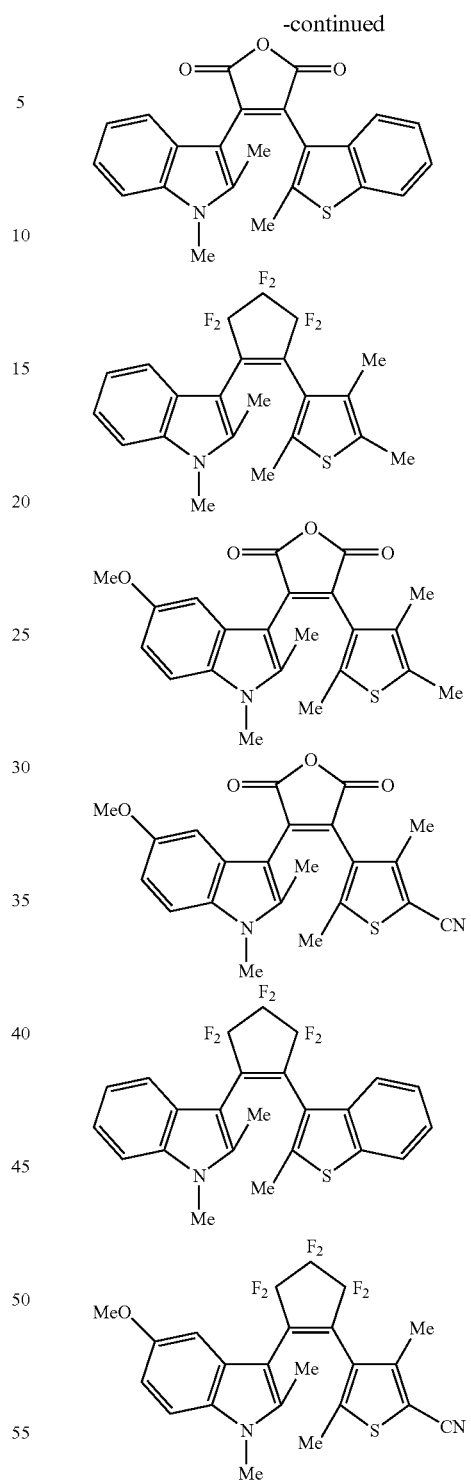

Of the above compounds, spiropyran, naphthopyran, spiroxazine compounds, and the compound (A) as abovementioned are preferred, and spiropyran compounds are particularly preferred.

The photochromic compounds in the invention can be used alone but two or more compounds may be used in combination.

The photochromic compounds are preferably used in an amount of from 1 μmol/m² to 10 mmol/m², more preferably from 10 μmol/m² to 1 mmol/m². When the photochromic compounds are used in this range, good visibility can be obtained.

Further, as a preferred embodiment of the lithographic printing plate precursor of the invention, (1) an on-press development type lithographic printing plate precursor, and (2) a non-processing (non-development),type lithographic printing plate precursor as described below are exemplified.

(1) On-press Development Type Lithographic Printing Plate Precursor:

A lithographic printing plate precursor having an image-recording layer whose solubility or dispersibility in a fountain solution and/or ink changes by exposure, or an image-recording layer whose adhering property to the adjoining layer having different affinity to a fountain solution or ink changes by exposure, and capable of development on a printing machine by feeding a fountain solution and/or ink to the plate after image exposure.

(2) Non-processing (Non-development) Type Lithographic Printing Plate Precursor:

A lithographic printing plate precursor having an image-recording layer whose affinity with a fountain solution or ink changes on the surface by exposure and capable of printing without being accompanied by the removal of an image-recording layer after image exposure.

Specifically, the plate materials as disclosed in Japanese Patent No. 2938397, JP-A-2001-277740, JP-A-2001-277742, JP-A-2002-287334, JP-A-2001-96936, JP-A-2001-96938, JP-A-2001-180141, JP-A-2001-162960, WO 00/16987, WO 01/39985, EP-A-990517, EP-A-1225041, U.S. Pat. No. 6,465,152, JP-A-6-317899, WO 96/35143, EP-A-652483, JP-A-10-10737, JP-A-11-309952, U.S. Pat. Nos. 6,017,677 and 6,413,694 are exemplified.

The lithographic printing plate precursor in the invention and a printing method using the lithographic printing plate precursor are described in detail below.

Image-recording Layer:

As an image-forming component in the on-press development type and non-processing (non-development) type lithographic printing plate precursors, the image-recording layer in the invention can further contain either of (A) an image-forming component using radical polymerization or (B) an image-forming component utilizing thermal fusion and thermal reaction of a hydrophobitizing precursor can be used.

(A) Image-forming Component using Radical Polymerization:

An image-forming component making use of radical polymerization contains a radical polymerizable compound and a radical generator. Since radical polymerization components are high in image-forming sensitivity, exposure energy can be effectively shared for the formation of a printing out image, so that radical polymerization components are more preferred for obtaining a printing out image having a great difference in brightness of colors.

<Radical Polymerizable Compound>

For efficiently perform a hardening reaction, it is preferred for the image-recording layer in the invention to contain radical polymerizable compounds (hereinafter also referred to as merely polymerizable compounds). The radical polymerizable compounds usable in the invention are addition polymerizable compounds having at least one ethylenic unsaturated double bond, and they are selected from the compounds having at least one, preferably two or more, ethylenic maturated bond. These compounds are well known in the field of this industry, and they can be used with no particular restriction in the invention. These polymerizable compounds have chemical forms of e.g., a monomer or a prepolymer, i.e., a dimer, a trimer or an oligomer, and a mixture and a copolymer of them. As the examples of monomers and copolymers of them, unsated carboxylic acids (e.g., acrylic acid, methacrylic acid, itaconic acid, crotonic acid, isocrotonic acid, maleic acid, etc.), and esters and amides of these unsaturated carboxylic acids are exemplified, and preferably esters of unsaturated carboxylic acids and aliphatic polyhydric alcohol compounds, and amides of unsaturated carboxylic acids and aliphatic polyhydric amine compounds are used. Further, the addition reaction products of unsaturated carboxylic acid esters and amides having a nucleophilic substituent such as a hydroxyl group, an amino group or a mercapto group with monofunctional or polyfunctional isocyanates or epoxies, and the dehydration condensation reaction products of unsaturated carboxylic acid esters and amides with monofunctional or polyfunctional carboxylic acids are also preferably used. Furthermore, the addition reaction products of unsaturated carboxylic acid esters or amides having an electrophilic substituent such as an isocyanate group or an epoxy group with monofunctional or polyfunctional alcohols, amines or thiols, and the substitution reaction products of unsaturated carboxylic acid esters or amides having a separable substituent such as a halogen group or a tosyloxy group with monofunctional or polyfunctional alcohols, amines or thiols are also preferably used. As another example, it is also possible to use compounds obtained by substituting the unsaturated carboxylic acids with unsaturated phosphonic acid, styrene, vinyl ether, etc.

The specific examples of the monomers of esters of aliphatic polyhydric alcohol compounds and unsaturated carboxylic acids include, as acrylic esters, ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri (acryloyloxyethyl) isocyanurate, polyester acrylate oligomer, isocyanuric acid EO-modified triacrylate, etc.

As methacrylic esters, the examples include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)-phenyl]dimethylmethane, bis[p-(methacryloxyethoxy)phenyl]-dimethylmethane, etc.

As itaconic esters, the examples include ethylene glycol diitaconate, propylene glycol diitaconate, 1,3butanediol diitaconate, 1,4-butanediol diitaconate, tetramethylene glycol diitaconate, pentaerythritol diitaconate, sorbitol tetraitaconate, etc. As crotonic esters, the examples include ethylene glycol dicrotonate, tetramethylene glycol dicrotonate, pentaerythritol dicrotonate, sorbitol tetradicrotonate, etc. As isocrotonic esters, the examples include ethylene glycol diisocrotonate, pentaerythritol diisocrotonate, sorbitol tetraisocrotonate, etc. As maleic esters, the examples include ethylene glycol dimaleate, triethylene glycol dimaleate, pentaerythritol dimaleate, sorbitol tetramaleate, etc.

As the examples of other esters, e.g., the aliphatic alcohol esters disclosed in JP-B-51-47334 and JP-A-57-196231, the esters having an aromatic skeleton disclosed in JP-A-59-5240, JP-A-59-5241 and JP-A-2-226149, and the esters containing an amino group disclosed in JP-A-1-165613 are also preferably used in the invention. The above ester monomers can also be used as mixtures.

Further, the specific examples of the amide monomers of aliphatic polyhydric amine compounds and unsaturated carboxylic acids include methylenebis-acrylamide, methylenebis-methacrylamide, 1,6-hexamethylenebis-acrylamide, 1,6-hexamethylenebis-methacrylamide, diethylenetriaminetris-acrylamide, xylylenebis-acrylamide, xylylenebis-methacrylamide, etc. As other preferred amide monomers, the amide monomers having a cyclohexylene structure disclosed in JP-B-54-21726 can be exemplified.

Further, urethane-based addition polymerizable compounds manufactured by the addition reaction of isocyanate and hydroxyl groups are also preferably used. As the specific example of such a compound, as disclosed in JP-B-48-41708, a vinyl urethane compound containing two or more polymerizable vinyl groups in one molecule obtained by adding vinyl monomer having a hydroxyl group represented by the following formula (a) to a polyisocyanate compound having two or more isocyanate groups in one molecule is exemplified.

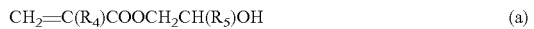

$$CH_2=C(R_4)COOCH_2CH(R_5)OH \quad (a)$$

wherein $R_4$ and $R_5$ each represents H or $CH_3$.

The urethane acrylates disclosed in JP-A-51-37193, JP-B-2-32293 and JP-B-2-16765, and the urethane compounds having an ethylene oxide skeleton disclosed in JP-B-58-49860, JP-B-56-17654, JP-B-62-39417 and JP-B-62-39418 are also preferably used in the invention. In addition, extremely high speed photopolymerizable compositions can be obtained by using addition polymerizable compounds having an amino structure or a sulfide structure in the molecule as disclosed in JP-A-63-277653, JP-A-43-260909 and JP-A-1-105238.

As other examples, polyfunctional acrylates and methacrylates, such as polyester acrylates, and epoxy acrylates obtained by reacting epoxy resins with (meth)acrylic acids as disclosed in JP-A-48-4183, JP-B-49-43191 and JP-B-52-30490 can be exemplified. The specific unsaturated compounds disclosed in JP-B-46-43946, JP-B-1-40337 and JP-B-1-40336, and the vinyl sulfonic acid compounds disclosed in JP-A-2-25493 can also be exemplified. Further, according to cases, the structures containing a perfluoroalkyl group disclosed in JP-A-61-22048 are preferably used. In addition, the compounds introduced as the photo-curable monomers and oligomers into *Bulletin of Nippon Setchaku Kyokai* Vol. 20, No. 7, pp. 300-308 (1984) can also be used.

The details in usage of these addition polymerizable compounds, e.g., what structure is to be used, whether the compounds are to be used alone or in combination, or what an amount is to be used, can be optionally set up according to the final design of the performances of the lithographic printing plate precursor. For example, these conditions are selected on the basis of the following aspects.

In the point of sensitivity, the structure containing many unsaturated groups per a molecule is preferred and bifunctional or higher functional groups are preferred in many cases. For increasing the strength of an image area, i.e., a hardened film, trifunctional or higher functional groups are preferred, and it is also effective to use different factional numbers and different polymerizable groups (e.g., acrylic ester, methacrylic ester, styrene compounds, vinyl ether compounds) in combination to control both speed and strength Further, the selection and usage of the addition polymerizable compounds are important actors for the compatibility with other components in an image-recording layer (e.g., a binder polymer, a polymerization initiator, a colorant) and dispersibility, for example, in some cases compatibility can be improved by using low purity compounds or two or more compounds in combination. Further, it is also possible to select a compound having a specific structure for the purpose of improving the adhesion property to a support and an overcoat layer described later.

Polymerizable compounds are used preferably in an amount of from 5 to 80 mass % to the nonvolatile components in an image-recording layer, and more preferably from 25 to 75 mass %. Polymerizable compounds may be used alone, or two or more compounds may be used in combination. In addition, the structure, blending and addition amount of addition polymerizable compounds can be properly selected in view of the degree of polymerization hindrance by oxygen, resolution, a fogging property, refractive index change and surface stickiness and, further, in some cases, a layer constitution and a coating method of undercoating and upper coating may be taken.

<Radical Polymerization Initiators>

A radical polymerization initiator for use in the invention is a compound capable of generating a radical by light or heat, or both energies, and initiating and accelerating polymerization of a compound having polymerizable unsaturated groups. As the polymerization initiators that can be used in the invention, well-known thermal polymerization initiators, compounds having a bond small in bond-dissociating energy, and photopolymerization initiators are exemplified. The radical polymerization initiators that can be preferably used in the invention are compounds capable of generating radicals by heat energy. The radical polymerization initiators for use in the invention are specifically described below. The radical polymerization initiators can be used alone or in combination of two or more.

As such radical polymerization initiators, e.g., organic halogen compounds, carbonyl compounds, organic peroxides, azo-based compounds, azide compounds, metallocene compounds, hexaarylbiimidazole compounds, organic boron compounds, disulfone compounds, oxime ester compounds, and onium salt compounds are exemplified.

As the organic halogen compounds, specifically, the compounds described in Wakabayashi et al., *Bull. Chem. Soc. Japan*, 42, 2924 (1969), U.S. Pat. No. 3,905,815, JP-B-46-4605, JP-A-48-36281, JP-A-53-133428, JP-A-55-32070, JP-A-60-239736, JP-A-61-169835, JP-A-61-169837, JP-A-62-58241, JP-A-62-212401, JP-A-63-70243, JP-A-63-298339, and M. P. Hutt, *Journal of Heterocyclic Chemistry*, 1 (No. 3) (1970) are exemplified. Of these compounds, oxazole compounds and s-triazine compounds substituted with a trihalomethyl group are preferably used.

More preferably, s-triazine derivatives in which at least one mono-, di- or tri-halogen-substituted methyl group is bonded to the s-triazine ring, specifically, e.g., 2,4,6-tris(monochloromethyl)-s-triazine, 2,4,6-tris(dichloro-methyl)-s-triazine, 2,4,6-tris(trichloromethyl)-s-triazine, 2-methyl-4,6-bis(trichloromethyl)-s-triazine, 2-n-propyl-4,6-bis(trichloromethyl)-s-triazine, 2-(α,α,β-trichloro-ethyl)-4,6-bis(trichloromethyl)-s-triazine, 2-phenyl-4,6-bis(trichloromethyl)-s-triazine, 2-(p-methoxyphenyl)-4,6-bis(trichloromethyl)-s- triazine, 2-(3,4-epoxyphenyl)-4,6-bis(trichloromethyl)-s-triazine, 2-(p-chlorophenyl)-4,6-bis(trichloromethyl)-s-triazine, 2-[1-(p-methoxyphenyl)-2,4-butadienyl]-4,6-bis(trichloromethyl)-s-triazine, 2-styryl-4,6-bis(trichloromethyl)-s-triazine, 2-(p-methoxy-styryl)-4,6-bis(trichloromethyl)-s-triazine, 2-(p-i-propyl-oxystyryl)-4,6-bis(trichloromethyl)-s-triazine, 2-(p-tolyl)-4,6-bis(trichloromethyl)-s-triazine, 2-(4-methoxy-naphthyl)-4,6-bis(trichloromethyl)-s-triazine, 2-phenyl-thio-4,6-bis(trichloromethyl)-s-triazine, 2-benzylthio-4,6-bis(trichloromethyl)-s-triazine, 2,4,6-tris(dibromomethyl)-s-triazine, 2,4,6-tris(tribromomethyl)-s-triazine, 2-methyl-4,6-bis(tribromomethyl)-s-triazine, and 2-methoxy-4,6-bis(tribromomethyl)-s-triazine are exemplified.

As the carbonyl compounds, benzophenone derivatives, e.g., benzophenone, Michler's ketone, 2-methylbenzophenone, 3-methylbenzophenone, 4-methylbenzophenone, 2-chlorobenzo-phenone, 4-bromobenzophenone, and 2-carboxybenzophenone, acetophenone derivatives, e.g., 2,2-dimethoxy-2-phenyl-acetophenone, 2,2-diethoxyacetophenone, 1-hydroxycyclohexyl phenyl ketone, α-hydroxy-2-methylphenylpropanone, 1-hydroxy-1-methylethyl-(p-isopropylphenyl) ketone, 1-hydroxy-1-(p-dodecylphenyl) ketone, 2-methyl-[4'-(methylthio)phenyl]-2-morpholino-1-propanone, and 1,1,1-trichloromethyl-(p-butyl-phenyl) ketone, thioxanthone derivatives, e.g., thioxanthone, 2-ethylthioxanthone, 2-isopropylthioxanthone, 2-chloro-thioxanthone, 2,4-dimethylthioxanthone, 2,4-dimethylthio-xanthone, and 2,4-diisopropylthioxanthone, and benzoic ester derivatives, e.g., ethyl p-dimethylaminobenzoate and ethyl p-diethylamiobenzoate are exemplified.

As the azo-based compounds, the azo compounds disclosed in JP-A-8-108621 can be used.

As the organic peroxides, e.g., trimethylcyclohexane peroxide, acetylacetone peroxide, 1,1-bis(tert-butylperoxy)-3,3,5-trimethylcyclohexane, 1,1-bis(tert-butylperoxy)cyclo-hexane, 2,2-bis(tert-butylperoxy)butane, tert-butyl hydroperoxide, cumene hydroperoxide, diisopropylbenzene hydro-peroxide, 2,5-dimethylhexane-2,5-dihydroperoxide, 1,1,3,3-tetramethylbutyl hydroperoxide, tert-butylcumyl peroxide, dicumyl peroxide, 2,5-dimethyl-2,5-di(tert-butylperoxy)-hexane, 2,5-oxanoyl peroxide, succinic acid peroxide, benzoyl peroxide, 2,4-dichlorobenzoyl peroxide, diisopropylperoxy dicarbonate, di-2-ethylhexylperoxy dicarbonate, di-2-ethoxy-ethylperoxy dicarbonate, dimethoxyisopropylperoxy carbonate, di(3-methyl-3-methoxybutyl)peroxy dicarbonate, tert-butyl-peroxy acetate, tert-butylperoxy pivalate, tert-butylperoxy neodecanoate, tert-butylperoxy octanoate, tert-butylperoxy laurate, tersyl carbonate, 3,3',4,4'-tetra(t-butylperoxy-carbonyl)benzophenone, 3,3',4,4'-tetra(t-hexylperoxy-carbonyl)benzophenone, 3,3',4,4'-tetra(p-isopropylcumyl-peroxycarbonyl)benzophenone, carbonyldi(t-butylperoxy-dihydrogendiphthalate), and carbonyldi(t-hexylperoxy-dihydrogendiphthalate) are exemplified.

As the metallocene compounds, various titanocene compounds disclosed in JP-A-59-152396, JP-A-61-151197, JP-A-63-41484, JP-A-2-249, JP-A-2-4705 and JP-A-5-83588, e.g., dicyclopentadienyl-Ti-bis-phenyl, dicyclopentadienyl-Ti-bis-2,6-difluorophen-1-yl, dicyclopentadienyl-Ti-bis-2,4-difluorophen-1-yl, dicyclopentadienyl-Ti-bis-2,4,6-trifluorophen-1-yl, dicyclopentadienyl-Ti-bis-2,3,5,6-tetrafluorophen-1-yl, dicyclopentadienyl-Ti-bis-2,3,4,5,6-pentafluorophen-1-yl, dimethylcyclopentadienyl-Ti-bis-2,6-difluorophen-1-yl, dimethylcyclopentadienyl-Ti-bis-2,4,6-trifluorophen-1-yl, dimethylcyclopentadienyl-Ti-bis-2,3,5,6-tetrafluorophen-1-yl, dimethylcyclopentadienyl-Ti-bis-2,3,4,5,6-pentafluorophen-1-yl, and the iron-arene complexes disclosed in JP-A-1-304453 and JP-A-1-152109 are exemplified.

As the hexaarylbiimidazole compounds, various compounds disclosed in JP-B-6-29285, U.S. Pat. Nos. 3,479,185, 4,311,783 and 4,622,286, specifically, e.g., 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichloro-phenyl)-4,4',5,5'-tetraphenylbiimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenyl-biimidazole, 2,2'-bis(o-nitrophenyl)-4,4',5,5'-tetraphenyl-biimidazole, 2,2'-bis(o-methylphenyl)-4,4',5,5'-tetraphenylbiimidazole, and 2,2'-bis(o-trifluorophenyl)-4,4',5,5'-tetraphenylbiimidazole are exemplified.

As the organic boron compounds, e.g., the organic borates disclosed in JP-A-62-143044, JP-A-62-150242, JP-A-9-188685, JP-A-9-188686, JP-A-9-188710, JP-A-2000-131837, JP-A-2002-107916, Japanese Patent No. 2764769, JP-A-2002-116539, and Kunz, Martin, "Rad Tech '98 Proceeding Apr. 19-22, 1998, Chicago", the organic boron sulfonium complexes or the organic boron oxosulfonium complexes disclosed in JP-A-6-157623, JP-A-6-175564 and JP-A-6-175561, the organic boron iodonium complexes disclosed in JP-A-6-175554 and JP-A-6-175553, the organic boron phosphonium complexes disclosed in JP-A-9-188710, and the organic boron transition metal coordination complexes disclosed in JP-A-6-348011, JP-A-7-128785, JP-A-7-140589, JP-A-7-306527 and JP-A-7-292014 are exemplified.

As the disulfone compounds, the compounds disclosed in JP-A-61-166544 and JP-A-2003-328465 are exemplified.

As the oxime ester compounds, the compounds described in J. C. S. Perkin II, 1653-1660 (1979), J. C. S. Perkin II, 156-162 (1979), Journal of Photopolymer Science and Technology, 202-232 (1995), JP-A-2000-66385, the compounds disclosed in JP-A-2000-80068, specifically the compounds represented by the following formulae are exemplified.

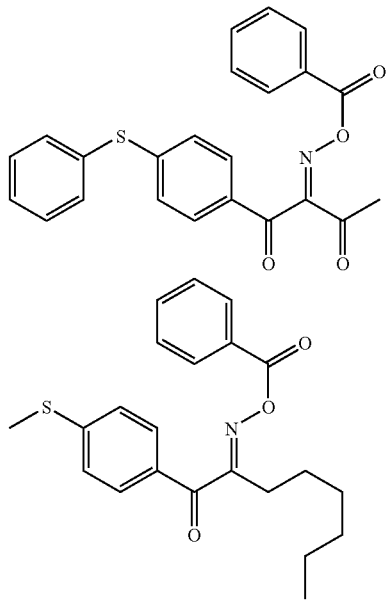

-continued
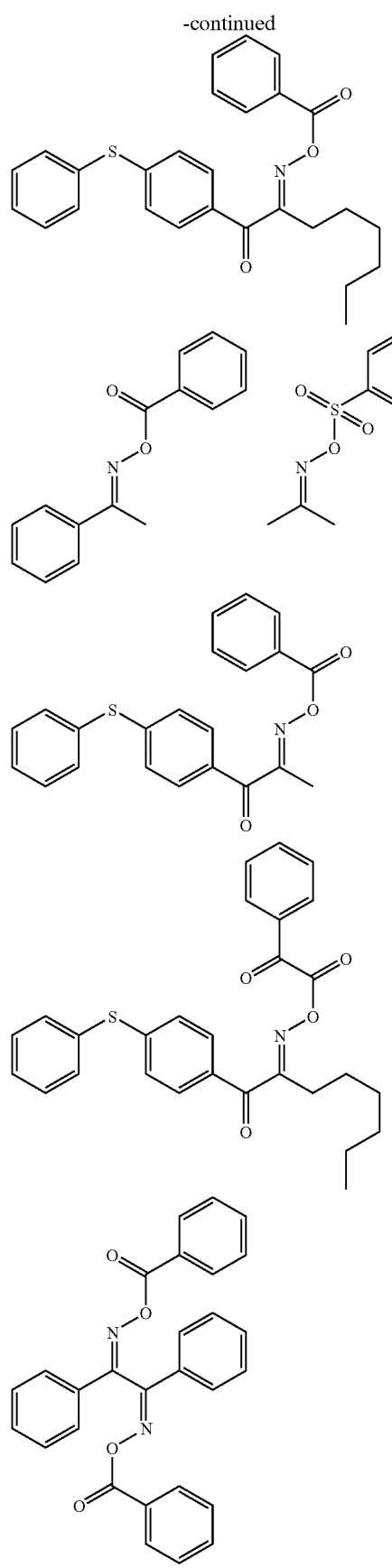
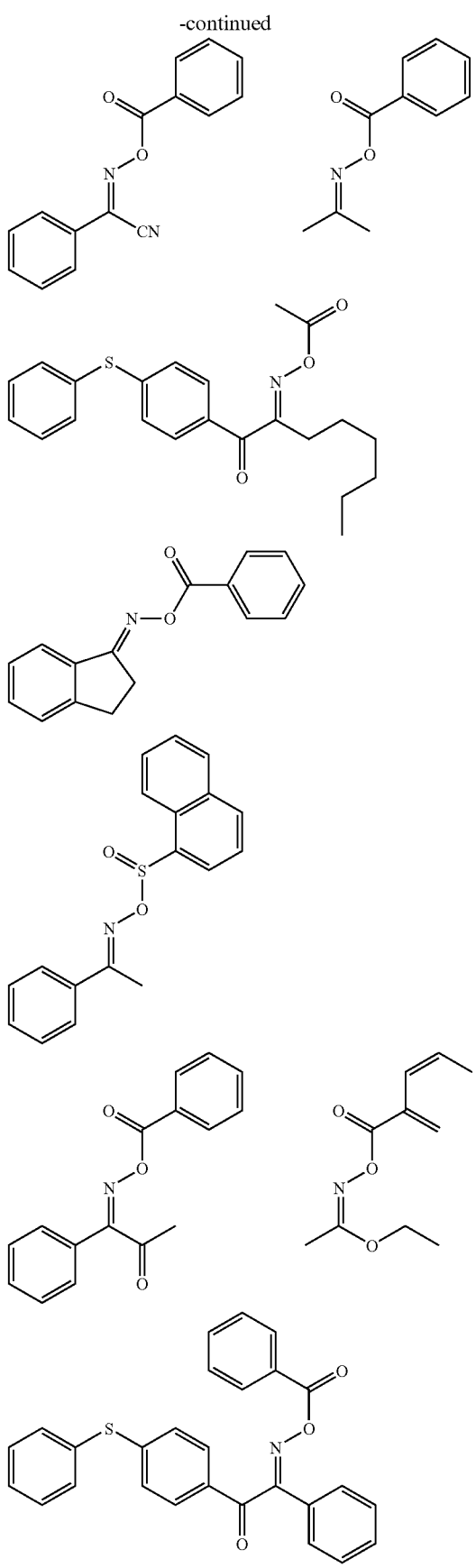

-continued

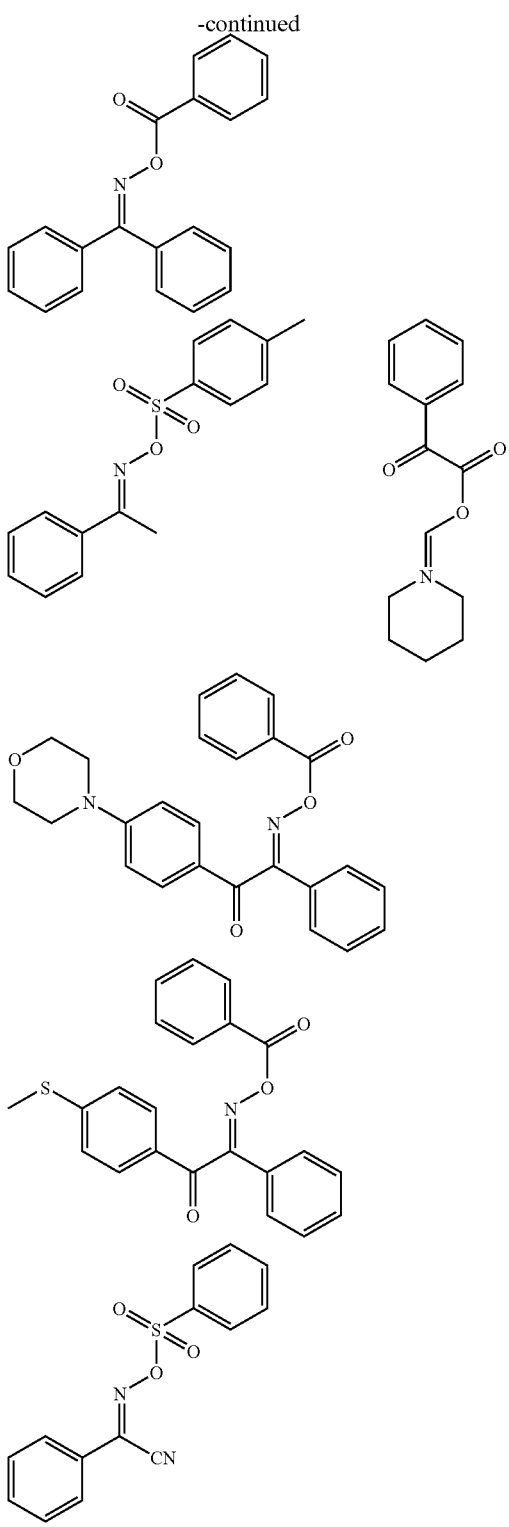

As the onium salt compounds, onium salts, e.g., the diazonium salts described in S. I. Schlesinger, *Photogr. Sci. Eng.*, 18, 387 (1974), and T. S. Bal et al., *Polymer* 21, 423 (1980), the ammonium salts disclosed in U.S. Pat. No. 4,069,055 and JP-A-4-365049, the phosphonium salts disclosed in U.S. Pat. Nos. 4,069,055 and 4,069,056, the iodonium salt disclosed in EP 104,143, U.S. Pat. Nos. 339,049, 410,201, JP-A-2- 150848 and JP-A-2-296514, the sulfonium salts disclosed in EP 370,693, EP 390,214, EP 233,567, EP 297,443, EP 297, 442, U.S. Pat. Nos. 4,933,377, 161,811, 410,201, 339,049 4,760,013, 4,734,444, 2,833,827, German Patent Nos. 2,904, 626, 3,604,580 and 3,604,581, the selenonium salts described in J. V. Crivello et al., *Macromolecules*, 10 (6), 1307 (1977), and J. V. Crivello et al., *J. Polymer Sci.*, Polymer Chem. Ed., 17, 1047 (1979), and the arsonium salts described in C. S. Wen et al., *Teh. Proc. Conf. Rad. Curing ASIA*, p. 478, Tokyo, October (1988) are exemplified.

As preferred compounds particularly from the aspects of reactivity and stability, the oxime ester compounds and the onium salts (diazonium salts, iodonium salts and sulfonium salts) are exemplified.

The onium salts preferably used in the invention are onium salts represented by the following formulae (RI-I) to (RI-III).

 (RI-I)

 (RI-II)

 (RI-III)

In formula (RI-I), $Ar_{11}$ represents an aryl group having 20 or less carbon atoms, which may have from 1 to 6 substituents, and as the preferred substituents, an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxyl group having from 1 to 12 carbon atoms, an aryloxy group having from 1 to 12 carbon atoms, a halogen atom, an alkylamino group having from 1 to 12 carbon atoms, a dialkylamino group having from 1 to 12 carbon atoms, an alkylamido group or arylamido group having from 1 to 12 carbon atoms, a carbonyl group, a carboxyl group, a cyano group, a sulfonyl group, a thioalkyl group having from 1 to 12 carbon atoms, and a thioaryl group having from 1 to 12 carbon atoms are exemplified. $Z_{11}^-$ represents a monovalent anion, and specifically a halogen ion, a perchlorate ion, a hexafluorophosphate ion, a tetrafluoroborate ion, a sulfonate ion, a sulfinate ion, a thiosulfonate ion and a sulfate ion are exemplified. In particular, in view of stability, a perchlorate ion, a hexafluorophosphate ion, a tetrafluoroborate ion, a sulfonate ion and a sulfinate ion are preferred.

In formula (RI-II), $Ar_{21}$ and $Ar_{22}$ each represents an aryl group having 20 or less carbon atoms, which may have from 1 to 6 substituents, and as the preferred substituents, an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxyl group having from 1 to 12 carbon atoms, an aryloxy group having from 1 to 12 carbon atoms, a halogen atom, an alkylamino group having from 1 to 12 carbon atoms, a dialkylamino group having from 1 to 12 carbon atoms, an alkylamido group or arylamido group having from 1 to 12 carbon atoms, a carbonyl group, a carboxyl group, a cyano group, a sulfonyl group, a thioalkyl group having from 1 to 12 carbon atoms, and a thioaryl group having from 1 to 12 carbon atoms are exemplified. $Z_{21}^-$ represents a monovalent anion, and specifically a halogen ion, a perchlorate ion, a hexafluoro-phosphate ion, a tetrafluoroborate ion, a sulfinate ion, a sulfinate ion, a thiosulfonate ion and a sulfate ion are exemplified. In view of stability and reactivity, a perchlorate ion, a hexafluorophosphate ion, a tetrafluoroborate ion, a sulfonate ion, a sulfinate ion and a carboxylate ion are preferred.

In formula (RI-III), $R_{31}$, $R_{32}$ and $R_{33}$ each represents an aryl, alkyl, alkenyl or alkynyl group having 20 or less carbon atoms, which may have from 1 to 6 substituents. Above all, in view of stability and reactivity, an aryl group is preferred. As the substituents, an alkyl group having from 1 to 12 carbon atoms, an alkenyl group having from 1 to 12 carbon atoms, an alkynyl group having from 1 to 12 carbon atoms, an aryl group having from 1 to 12 carbon atoms, an alkoxyl group having from 1 to 12 carbon atoms, an aryloxy group having from 1 to 12 carbon atoms, a halogen atom, an alkylamino group having from 1 to 12 carbon atoms, a dialkylamino group having from 1 to 12 carbon atoms, an alkylamido group or arylamido group having from 1 to 12 carbon atoms, a carbonyl group, a carboxyl group, a cyano group, a sulfonyl group, a thioalkyl group having from 1 to 12 carbon atoms, and a thioaryl group having from 1 to 12 carbon atoms are exemplified. $Z_{31}^-$ represents a monovalent anion, and specifically a halogen ion, a perchlorate ion, a hexafluoro-phosphate ion, a tetrafluoroborate ion, a sulfonate ion, a sulfinate ion, a thiosulfonate ion, and a sulfate ion are exemplified. In particular, in view of stability and reactivity, a perchlorate ion, a hexafluorophosphate ion, a tetrafluoroborate ion, a sulfonate ion, a sulfinate ion and a carboxylate ion are preferred. As more preferred carboxylate ions, the carboxylate ions disclosed in JP-A-2001-343742 are exemplified, and the carboxylate ions disclosed in JP-A-2002-148790 are particularly preferred.

The specific examples of the compounds represented by formulae (RI-I), (RI-II) and (RI-III) are shown below, but the invention is not limited to these compounds.

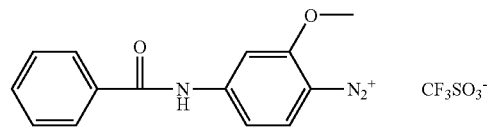

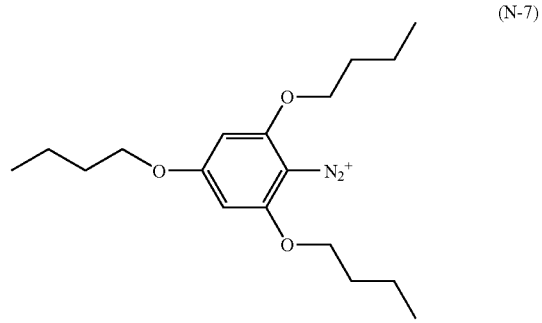

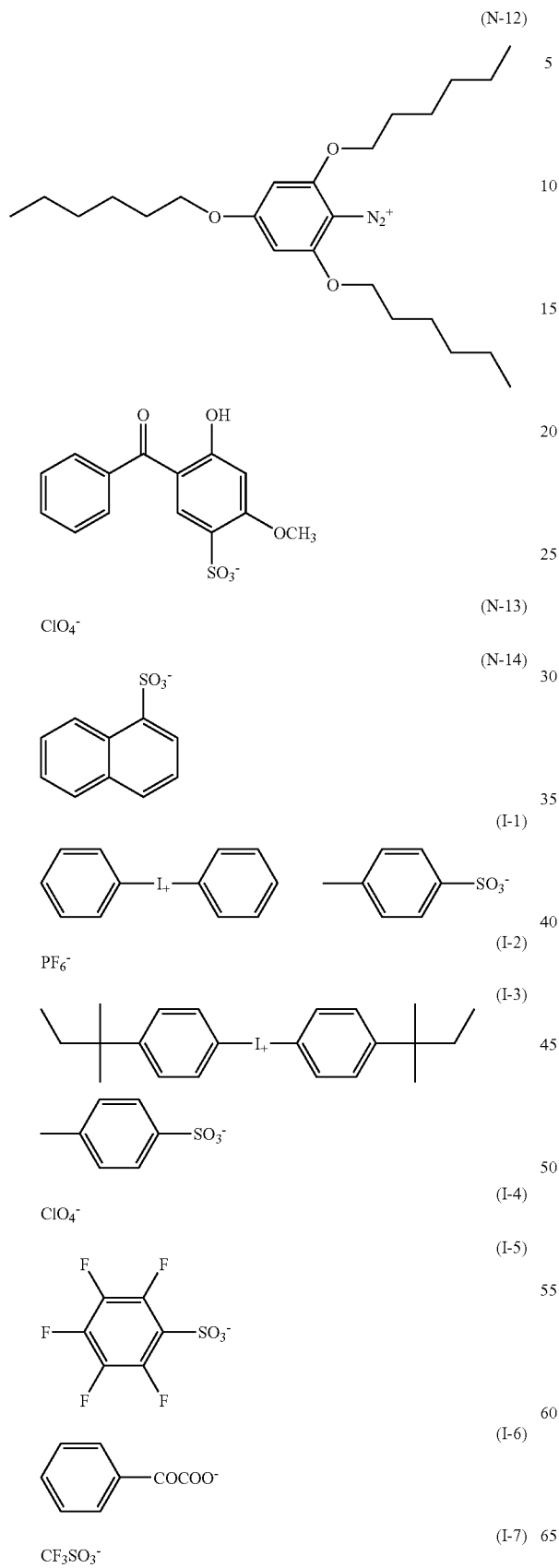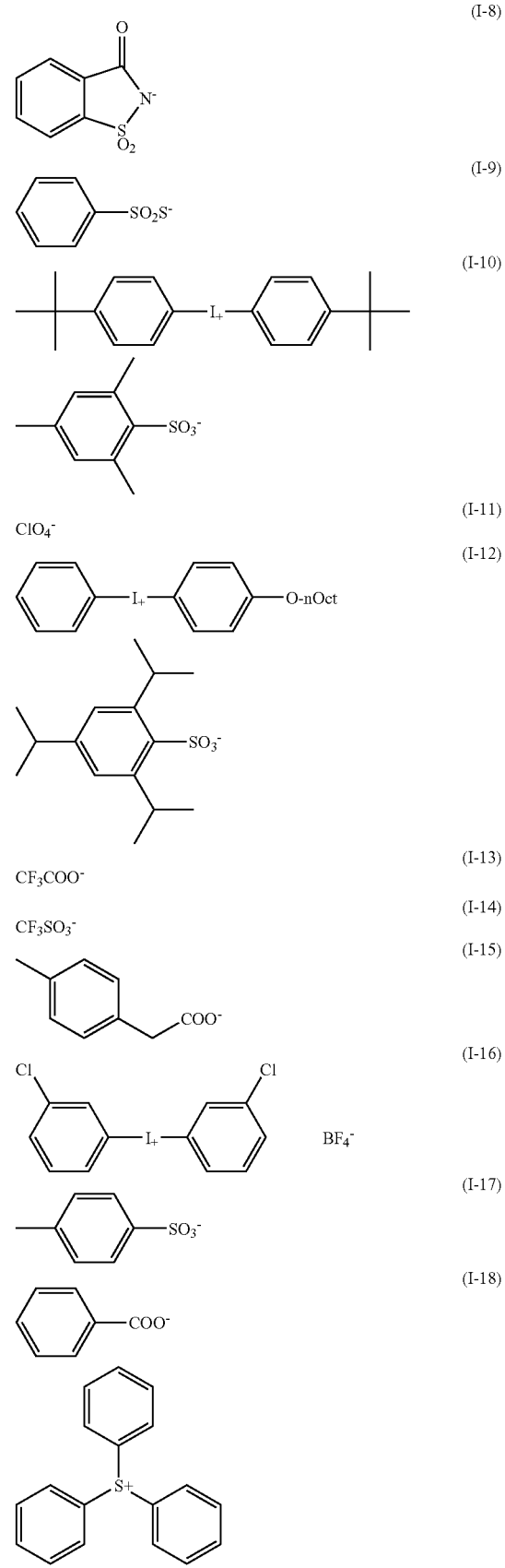

-continued (S-1) 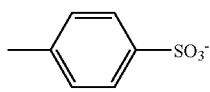

(S-2) PF$_6^-$ (S-3) ClO$_4^-$ (S-4) 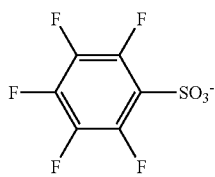

(S-5) 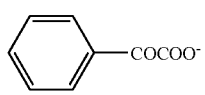

(S-6) CF$_3$SO$_3^-$ (S-7) 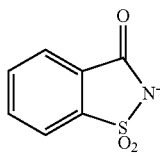

(S-8) 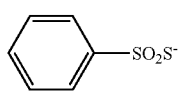

(S-9) 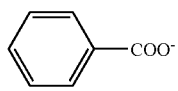

(S-10) 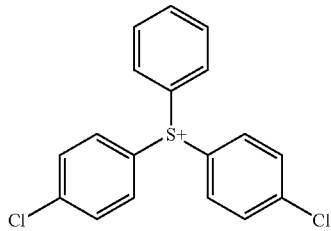

(S-11) 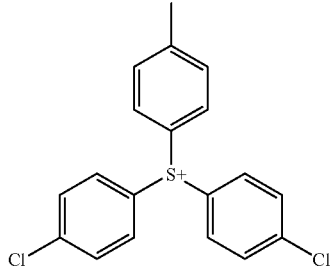

(S-12) 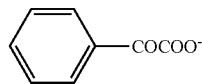

(S-13) 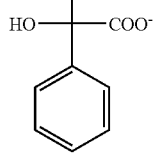

(S-14) BF$_4^-$ (S-15) 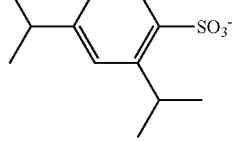

Radical polymerization initiators can be used preferably in an amount of from 0.1 to 50 mass % to the total solids content constituting the image-recording layer, more preferably from 0.5 to 30 mass %, and still more preferably from 1 to 20 mass %. By using polymerization initiators in this range, good sensitivity and soiling resistance of a non-image area in printing can be obtained. Radical polymerization initiators may be used alone, or two or more kinds of initiators may be used in combination. These radical polymerization initiators may be added with other components to the same layer, or another layer may be provided for radical polymerization initiators <Other Image-recording Layer Components>

If necessary, additives such as binder polymers, surfactants, polymerization inhibitors, higher fatty acid derivatives, plasticizers, inorganic fine particles and low molecular weight hydrophilic compounds may further be added to the radical polymerization system image-recording layer of the invention. These additives are described below.

<Binder Polymer>

Binder polymers can be used in the image-recording layer in the invention. Well known binder polymers can be used in the invention with no restriction, and linear organic polymers having a film-forming property are preferably used. The examples of such binder polymers include acrylic resins, polyvinyl acetal resins, polyurethane resins, polyurea resins, polyimide resins, polyamide resins, epoxy resins, methacrylic resins, polystyrene resins, novolak type phenolic resins, polyester resin, synthetic rubber and natural rubber.

It is preferred that binder polymers have a crosslinking property for the purpose of improving the layer strength of an image area. For giving a crosslinkable property to binder polymers, it is effective to introduce a crosslinkable functional group such as an ethylenic unsaturated bond into the main chain or side chain of the binder polymers. The crosslinkable functional group may be introduced by copolymeration As the examples of the polymers having an ethylenic unsaturated bond in the main chain of the molecule, poly-1,4-butadiene and poly-1,4-isoprene are exemplified.

As the examples of the polymers having an ethylenic unsaturated bond in the side chain of the molecule, polymers of esters or amides of acrylic acid or methacrylic acid, wherein the residue of the ester or amide (R of —COOR or —CONHR) has an ethylenic unsaturated bond are exemplified.

The examples of the residues having an ethylenic unsaturated bond (the above-described R) include, —$(CH_2)_n$CR$^1$=CR$^2$R$^3$, —$(CH_2O)_n$CH$_2$CR$^1$=CR$^2$R$^3$, —$(CH_2CH_2O)_n$CH$_2$CR$^1$=CR$^2$R$^3$, —$(CH_2)_n$NH—CO—O—CH$_2$CR$^1$=CR$^2$R$^3$, —$(CH_2)_n$—O—CO—CR$^1$=CR$^2$R$^3$ and —$(CH_2CH_2O)_2$—X (wherein R$^1$, R$^2$ and R$^3$ each represents a hydrogen atom, a halogen atom, an allyl group having from 1 to 20 carbon atoms, an aryl group, an alkoxyl group or an aryloxy group, and R$^1$ and R$^2$ or R$^3$ may be bonded to each other to form a ring, n represents an integer of from 1 to 10, and X represents a dicyclopentadienyl residue).

The specific examples of the ester residues include —CH$_2$CH=CH$_2$ (disclosed in JP-B-7-21633), —CH$_2$CH$_2$O—CH$_2$CH=CH$_2$, —CH$_2$C(CH$_3$)=CH$_2$, —CH$_2$CH=CH—C$_6$H$_5$, —CH$_2$CH$_2$OCOCH=CH—C$_6$H$_5$, —CH$_2$CH$_2$—NHCOO—CH$_2$CH=CH$_2$ and —CH$_2$CH$_2$O—X (wherein X represents a dicyclopentadienyl residue).

The examples of the amido residues include —CH$_2$CH=CH$_2$, —CH$_2$CH$_2$—Y (wherein Y represents a cyclohexene residue), and —CH$_2$CH$_2$—OCO—CH=CH$_2$.

When free radicals (polymerization initiation radicals or the grown radicals of a polymerizable compound in the polymerization process) are added to the crosslinkable functional groups of a binder polymer having a crosslinking property, addition polymerization occurs directly between the polymers or via the polymerization chains of the polymerizable compound, as a result, crosslinking is formed between the molecules of the polymers, and the binder polymer is hardened. Alternatively, the atoms in the polymer (e.g., the hydrogen atoms on the carbon atoms contiguous to crosslinkable functional groups) are extracted by free radicals and polymer radicals are grown, and the polymer radicals are bonded to each other, whereby crosslinking is formed between the polymer molecules, so that the binder polymer is hardened.

The content of crosslinkable groups in a binder polymer (the content of radical polymerizable unsaturated double bonds by an iodometric titration method) is preferably from 0.1 to 10.0 mmol per gram of the binder polymer, more preferably from 1.0 to 7.0 mmol, and most preferably from 2.0 to 5.5 mmol. Good sensitivity and good storage stability can be obtained with this range of the content of crosslinkable groups.

From the viewpoint of the improvement of an on-press developing property, it is preferred that binder polymers have high solubility and dispersibility in ink and/or a fountain solution.

For improving the solubility and dispersibility in ink, binder polymers are preferably lipophilic, and for improving the solubility and dispersibility in a fountain solution, binder polymers are preferably hydrophilic. Accordingly, in the invention, it is also effective to use a lipophilic binder polymer and a hydrophilic binder polymer in combination.

As hydrophilic binder polymers, binder polymers having a hydrophilic group, e.g., a hydroxyl group, a carboxyl group, a carboxylate group, a hydroxyethyl group, a polyoxyethyl group, a hydroxypropyl group, a polyoxypropyl group, an amino group, an aminoethyl group, an aminopropyl group, an ammonium group, an amido group, a carboxymethyl group, a sulfonic acid group and a phosphoric acid group are preferably exemplified.

The specific examples of hydrophilic binder polymers include gum arabic, casein, gelatin, starch derivative, carboxymethyl cellulose and the sodium salt thereof cellulose acetate, sodium alginate, vinyl acetate-maleic acid copolymers, styrene-maleic acid copolymers, polyacrylic acids and the salts thereof, polymethacrylic acids and the salts thereof, homopolymers and copolymers of hydroxyethyl methacrylate, homopolymers and copolymers of hydroxyethyl acrylate, homopolymers and copolymers of hydroxypropyl methacrylate, homopolymers and copolymers of hydroxypropyl acrylate, homopolymers and copolymers of hydroxybutyl methacrylate, homopolymers and copolymers of hydroxybutyl acrylate, polyethylene glycols, hydroxypropylene polymers, polyvinyl alcohols, hydrolyzed polyvinyl acetate having a hydrolysis degree of 60 mol % or more, preferably 80 mol % or more, polyvinyl formal, polyvinyl butyral, polyvinyl pyrrolidone, homopolymers and copolymers of acrylamide, homopolymers and copolymers of methacrylamide, homopolymers and copolymers of N-methylolacrylamide, polyvinyl pyrrolidone, alcohol-soluble nylon, and polyether of 2,2-bis(4-hydroxy-phenyl)propane and epichlorohydrin.

The binder polymers preferably have a mass average molecular weight of preferably 5,000 or higher, more preferably from 10,000 to 300,000, and a number average molecular weight of preferably 1,000 or higher, more preferably from 2,000 to 250,000. The polydisperse degree (mass average molecular weight/number average molecular weight) is preferably from 1.1 to 10.

The binder polymers may be any of random polymers, block polymers and graft polymers, but random polymers are preferred. The binder polymers may be used alone or as a mixture of two or more.

The binder polymers can be synthesized by conventionally well known methods. As the solvents for use in the synthesis, e.g., tetrahydrofuran, ethylene dichloride, cyclohexanone, methyl ethyl ketone, acetone, methanol, ethanol, ethylene glycol monomethyl ether, ethylene glycol monoethyl ether, 2-methoxyethyl at, diethylene glycol dimethyl ether, 1-methoxy-2-propanol, 1-methoxy-2-propyl acetate, N,N-dimethylformamide, N,N-dimethylacetamide, toluene, ethyl acetate, methyl lactate, ethyl lactate, dimethyl sulfoxide, and water are exemplified. These solvents may be used alone or two or more solvents may be used as a mixture.

As the radical polymerization initiators used in the synthesis of the binder polymers, well known compounds, e.g., azo initiators and peroxide initiators can be used.

The binder polymers are used in an amount of preferably from 10 to 90 mass % to the total solids content of the image-recording layer, more preferably from 20 to 80 mass %, and still more preferably from 30 to 70 mass %. When the binder polymers are used in this range, preferred strength of an image area and good image-forming property can be obtained.

It is preferred to use a polymerizable compound and the binder polymer in mass ratio of from 1/9 to 7/3.

<Surfactant>

In the invention, it is preferred to use a surfactant in an image-recording layer to accelerate the on-press development property at the time of initiating printing and to improve the conditions of coating surface. As the surfeit for these purposes, nonionic surfactants, anionic surfactants, cationic surfactants, ampholytic surfactants and fluorine surfactants awe used. Surfactants may be used alone or two or more surfactants may be used in combination.

The nonionic surfactants for use in the invention are not particularly restricted and conventionally well known surfactants can be used, e.g., polyoxyethylene alkyl ethers, polyoxyethylene alkyl phenyl ethers, polyoxyethylene polystyryl phenyl ethers, polyoxyethylene polyoxypropylene alkyl ethers, glycerol fatty acid partial esters, sorbitan fatty acid partial esters, pentaerythritol fatty acid partial esters, propylene glycol fatty acid monoesters, sucrose fatty acid partial esters, polyoxyethylene sorbitan fatty acid partial esters, polyoxyethylene sorbitol fatty acid partial esters, polyethylene glycol fatty acid esters, polyglycerol fatty acid partial esters, polyoxyethylenated castor oils, polyoxyethylene glycerol fatty acid partial esters, fatty acid diethanolamides, N,N-bis-2-hydroxyalkylamines, polyoxyethylene alkylamine, triethanolamine fatty acid esters, trialkylamine oxide, polyethylene glycol, and copolymers of polyethylene glycol and polypropylene glycol are exemplified.

The anionic surfactants for use in the invention are not particularly restricted and conventionally well known surfactants can be used, e.g. fatty acid salts, abietates, hydroxyalkanesulfonates, alkanesulfonates, dialkylsulfo-succinic esters, straight chain alkylbenzenesulfonates, branched chain alkylbenzenesulfonates, alkylnaphthalene-sulfonates, alkylphenoxy polyoxyethylene propyl sulfonates, polyoxyethylene alkyl sulfophenyl ethers, sodium N-methyl-N-oleyltaurine, disodium N-alkylsulfosuccinic acid monoamide, petroleum sulfonates, sulfated beef tallow, sulfuric esters of fatty acid alkyl ester, alkylsulfuric esters, polyoxyethylene alkyl ether sulfuric esters, fatty acid monoglyceride sulfuric esters, polyoxyethylene alkyl phenyl ether sulfuric esters, polyoxyethylene styryl phenyl ether sulfuric esters, alkylphosphoric esters, polyoxyethylene alkyl ether phosphoric esters, polyoxyethylene alkyl phenyl ether phosphoric esters, partial saponification products of styrene/maleic anhydride copolymers, partial saponification products of olefin/maleic anhydride copolymers, and naphthalene sulfonate formaldehyde condensation products are exemplified.

The cationic surfactants for use in the invention are not particularly restricted and conventionally well known surfactants can be used, e.g., alkylamine salts, quaternary ammonium salts, polyoxyethyene alkylamine salts, and polyethylene polyamine derivatives are exemplified.

The ampholytic surfactants for use in the invention are not particularly restricted and conventionally well known surfactants can be used, e.g., carboxybetaines, amino-carboxylic acids, sulfobetaines, aminosulfuric esters and imidazolines are exemplified.

In the above surfactants, "polyoxyethylene" can be taken as "polyoxyalkylene" such as polyoxymethylene, polyoxypropylene, and polyoxybutylene, and these surfactants can also be used in the invention.

As more preferred surfactants, fluorine surfactants containing a perfluoroalkyl group in the molecule are exemplified. As such s s, anionic surfactants, e.g., perfluoroalkylcarboxylate, perfluoroalkylsulfonate, and perfluoroalkylphosphate; ampholytic surf s, e.g., perfluoroalkylbetaine; cationic surfactants, e.g., perfluoroalkyltrimethylammonium salt; and nonionic surfactants, e.g., perfluoroalkylamine oxide, perfluoroalkyl ethylene oxide addition products, oligomers coining a perfluoroalkyl group and a hydrophilic group, oligomers containing a perfluoroalkyl group and a lipophilic group, oligomers containing a perfluoroalkyl group, a hydrophilic group, and a lipophilic group, and urethane containing a perfluoroalkyl group and a lipophilic group are exemplified. Further, the fluorine sur disclosed in JP-A-62-170950, JP-A-62-226143 and JP-A-60-168144 are also preferably used.

Surfactants can be used alone, or two or more surfactants can be used in combination.

Surfactants are preferably used in an amount of from 0.001 to 10 mass % to the total solids content of the image recording layer, more preferably from 0.01 to 7 mass %.

<Polymerization Inhibitor>

For preventing unnecessary thermal polymerization of a radical polymerizable compound during manufacture or preservation of an image-recording layer, it is preferred that a small amount of thermal polymerization inhibitor be added to an image-recording layer in the invention As the thermal polymerization inhibitors, e.g., hydroquinone, p-methoxyphenol, di-t-butyl-p-cresol, pyrogallol, t-butylcatechol, benzoquinone, 4,4'-thiobis(3-methyl-6-t-butylphenol), 2,2'-methylenebis(4-methyl-6-t-butylphenol), and N-nitroso-N-phenylhydroxylamine aluminum salt are exemplified.

The amount of the thermal polymerization inhibitor to be added to an image-recording layer is preferably from about 0.01 to about 5 mass % to all the solids content of the image recording layer.

<Higher Fatty Acid Derivatives and the Like>

For preventing the polymerization hindrance due to oxygen, higher fatty acid derivatives, e.g., behenic acid and behenic acid amide, may be added to an image-recording layer in the invention and locally exist on the surface of the image-recording layer in the dry process after coating. The addition amount of the higher fatty acid derivatives is preferably from about 0.1 to about 10 mass % to the total solids content of the image-recording layer.

<Plasticizer>

An image-recording layer in the present invention may contain a plasticizer to improve an on-press developing property.

The examples of the plasticizers include phthalic esters, e-g., dimethyl phthalate, diethyl phthalate, dibutyl phthalate, diisobutyl phthalate, dioctyl phthalate, octylcapryl phthalate, dicyclohexyl phthalate, ditridecyl phthalate, butylbenzyl phthalate, diisodecyl phthalate, and diallyl phthalate; glycol esters, e.g., dimethyl glycol phthalate, ethyl phthalyl ethyl glycolate, methyl phthalyl ethyl glycolate, butyl phthalyl butyl glycolate, and triethylene glycol dicaprylate; phosphoric esters, e.g., tricresyl phosphate and triphenyl phosphate; aliphatic dibasic esters, e.g., diisobutyl adipate, dioctyl adipate, dimethyl sebacate, dibutyl sebacate, dioctyl azelate, and dibutyl maleate; and polyglycidyl methacrylate, triethyl citrate, glycerol triacetyl ester and butyl laurate.

The amount of the plasticizer is preferably about 30 mass % or less to all the solids content of the image recording layer.

<Inorganic Fine Particles>

For the improvement of the hardened layer strength of an image area and the on-press developing property of a non-image area, an image-recording layer may contain inorganic fine particles.

As the inorganic fine particles, e.g., silica, alumina, magnesium oxide, titanium oxide, magnesium carbonate, calcium alginate and mixtures of these fine particles are preferably used. Even when inorganic fine particles are not light/heat convertible, they can be used for layer strengthening and the reinforcement of interfacial adhesion by surface roughening.

The average particle size of the inorganic fine particles is preferably from 5 nm to 10 μm, more preferably from 0.5 to 3 μm. When the average particle size is in this range, the inorganic fine particles are stably dispersed in an image-recording layer, and the layer strength of the image-recording layer can be sufficiently maintained, so that a non-image area difficult to be soiled and excellent in hydrophilicity can be formed.

These inorganic fine particles are easily available as commercial products of colloidal silica dispersion and the lie.

The addition amount of the inorganic fine particles is preferably 20 mass % or less to all the solids content of the image recording layer, more preferably 10 mass % or less.

<Low Molecular Weight Hydrophilic Compound>

For the improvement of an on-press developing property, an image-recording layer in the invention may contain hydrophilic low molecular weight compounds. As the hydrophilic low molecular weight compounds, water-soluble organic compounds, such as glycols, e.g., ethylene glycol, diethylene glycol, triethylene glycol, propylene glycol, dipropylene glycol, tripropylene glycol, and ether or ester derivatives of these glycols, polyhydroxies, e.g., glycerol and pentaerythritol, organic amines, e.g., triethanolamine, diethanolamine and monoethanolamine, and salts of these organic amines, organic sulfonic acids, e.g., toluenesulfonic acid and benzenesulfonic acid, and salts of these organic sulfonic acids, organic phosphonic acids, e.g., phenyl-phosphonic acid, and salts of phenylphosphonic acid, and organic carboxylic acids, e.g., tartaric acid, oxalic acid, citric acid, malic acid, lactic acid, gluconic acid and amino acid, and salts of these organic carboxylic acids are exemplified.

<Formation of Radical Polymerization Type Image-recording Layer>

As the method of adding the above constitutional components of image-recording layer to an image-recording layer, some embodiments can be used in the invention. One means is to dissolve the constitutional components in an appropriate solvent and coating as disclosed in JP-A-2002-287334, and another means is to use a microgel. As the microgel, a microcapsule is exemplified, and the microcapsule encapsulates the constitutional components and is added to an image-recording layer (a microcapsule-type image-recording layer) as disclosed in JP-A-2001-277740 and JP-A-2001-277742. In addition, in a microcapsule-type image-recording layer, the constitutional components may also be contained outside of the microcapsules.

As described above, it is preferred in the invention that a compound causing color change by oxidation or reduction and an infrared absorber (a reaction system for printing out) to be combined with the compound are contained in the same microcapsule in the light of obtaining a printing out image having good visibility. Further, it is more preferred that reaction systems for forming a print image, such as a radical polymerizable compound and a radical polymerization initiator, are added to a microcapsule different from the microcapsule containing the compound for printing out and the infrared absorber to be combined, or added to the outside of the microcapsule to be separated from the printing out system to avoid the hindrance of reactions each other.

Constitutional components of an image-recording layer can be microencapsulated by well-known methods. For example, as the manufacturing method of microcapsules, a method making use of coacervation as disclosed in U.S. Pat. Nos. 2,800,457 and 2,800,458, an interracial polymerization method as disclosed in U.S. Pat. No. 3,287,154, JP-B-38-19574 and JP-B-42-446, a method by the precipitation of a polymer as disclosed in U.S. Pat. Nos. 3,418,250 and 3,660,304, a method of using isocyanate polyol wall materials as disclosed in U.S. Pat. No. 3,796,669, a method of using isocyanate wall materials as disclosed in U.S. Pat. No. 3,914,511, a method of using urea-formaldehyde series or urea-formaldehyde-resorcinol series wall materials as disclosed in U.S. Pat. Nos. 4,001,140, 4,087,376 and 4,089,802, a method of using melamine-formaldehyde resins or hydroxy cellulose wall materials as disclosed in U.S. Pat. No. 4,025,445, a monomer polymerization in situ method as disclosed in JP-B-36-9163 and JP-B-51-9079, a spray drying method as disclosed in British Patent 930,422 and U.S. Pat. No. 3,111,407, and an electrolytic dispersion cooling method as disclosed in British Patents 952,807 and 967,074 can be exemplified, but the invention is not limited to these methods.

The microcapsule walls preferably used in the invention have a three dimensional crosslinking structure and a property of swelling by a solvent, and the microcapsule having the microcapsule wall is an embodiment of the microgel. From this point of view, polyurea, polyurethane, polyester, polycarbonate, polyamide, and the mixtures of these compounds are preferably used as the microcapsule wall materials, and polyurea and polyurethane are particularly preferred. Compounds having crosslinkable functional groups such as ethylenic unsaturated bonds that can be introduced into the above binder polymers may be introduced into microcapsule walls.

The average particle size of the microcapsules is preferably from 0.01 to 3,0 μm, more preferably from 0.05 to 2.0 μm, and particularly preferably from 0.10 to 1.0 μm. Good resolution and aging stability can be obtained in this range of the particle size.

An image-recording layer in the invention is formed by coating a coating solution prepared by dispersing or dissolving the above necessary components in a solvent. As the solvents used here, ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethyl-formamide, tetramethylurea, N-methylpyrrolidone, dimethyl sulfoxide, sulforan, γ-butyrolactone, toluene, and water are exemplified, but the solvents are not limited thereto. These solvents are used alone or as mixture. The concentration of the solids content of the coating solution is preferably from 1 to 50 mass %.

It is also possible to form an image-recording layer in the invention by preparing a plurality of coating solutions by dispersing or dissolving the same or different components in the same or different solvents, and repeating the coating and drying a plurality of times.

The coating amount of an image-recording layer (solids content) obtained on a support after coating and drying is generally preferably from 0.3 to 3.0 g/m$^2$, although the coating amount differs depending upon the usage of the image-recording layer. Good sensitivity and good layer properties of a image-recording layer can be obtained in this range of the coating amount As the coating method, various coating methods can be used, e.g., bar coating, rotary coating, spray coating, curtain coating, dip coating, air knife coating, blade coating, and roll coating can be used.

(B) Image-forming Component of Hydrophobitizing Precursor:

<Hydrophobitizing Precursor>

Hydrophobitizing precursors in the invention are fine particles capable of converting a hydrophilic image-recording layer to hydrophobic upon heating. Such fine particles are preferably at least one kind of fine particles selected from thermoplastic polymer fine particles and thermo-reactive polymer fine particles. Further, the fine particles may be microcapsules encapsulating a compound having a thermo-reactive group.

As the thermoplastic polymer fine particles used in the invention, the thermoplastic polymer fine particles described in Research Disclosure No. 33303, January (1992), JP-A-9-123387, JP-A-9-131850, JP-A-9-171249 JP-A-9-171250, and EP 931647 can be preferably exemplified. The specific examples of the polymers constituting these polymer fine particles include homopolymers or copolymers of monomers such as ethylene, styrene, vinyl chloride, methyl acrylate, ethyl acrylate, methyl methacrylate, ethyl methacrylate, vinylidene chloride, acrylonitrile, and vinyl carbazole, and mixtures thereof. Of these polymers, polystyrene and polymethyl methacrylate are more preferred.

The average particle size of the thermoplastic polymer fine particles for use in the invention is preferably from 0.01 to 2.0 μm. As the synthesizing methods of these thermoplastic polymer fine particles, a method of dissolving the above compounds in a water-insoluble organic solvent, mixing and emulsifying the solution with an aqueous solution containing a dispersant, and applying heat to the emulsion to thereby solidify the emulsion to a fine particle state with volatizing the organic solvent (a dissolution dispersion method) can be used, in addition to an emulsion polymerization method and a suspension polymerization method.

As the thermo-reactive polymer fine particles used in the invention, thermosetting polymer fine particles and polymer fine particles having a thermo-reactive group are exemplified As the thermosetting polymer fine particles, resins having a phenolic skeleton, urea resins (e.g., resins obtained by the resinification of urea or urea derivatives, e.g., methoxymethylated urea, with aldehydes, e.g., formaldehyde), melamine resins (e.g., resins obtained by the resinification of melamine or melamine derivatives with aldehydes, e.g., formaldehyde), alkyd resins, unsaturated polyester resins, polyurethane resins, and epoxy resins can be exemplified. Of these resins, resins having a phenolic skeleton, melamine resins, urea resins and epoxy resins are particularly preferred.

As preferred resins having a phenolic skeleton, e.g., phenolic resins obtained by resinifying phenol or cresol with aldehydes, e.g., formaldehyde, hydroxystyrene resins, and polymers and copolymers of methacrylamide or acrylamide or methacrylate or acrylate having a phenolic skeleton such as N-(p-hydroxyphenyl)methacrylamide and p-hydroxyphenyl methacrylate can be exemplified.

The average particle size of the thermosetting polymer fine particles for use in the invention is preferably from 0.01 to 2.0 μm. These thermosetting polymer fine particles can be easily obtained by a dissolution dispersion method, but a thermosetting polymer may be made fine particles when the thermosetting polymer is synthesized. The invention is not limited to these methods.

As the thermo-reactive group of the polymer fine particles having a thermo-reactive group used in the invention, functional groups showing any reaction can be used so long as chemical bonds are formed. Ethylenic unsaturated groups showing a radical polymerization reaction (e.g., an acryloyl group, a methacryloyl group, a vinyl group, an allyl group, etc.), cationic polymerizable groups (e.g., a vinyl group, a vinyloxy group, etc.), isocyanate groups showing an addition reaction or blocks thereof, epoxy groups, vinyloxy groups and functional groups having active hydrogen atoms of the other side compounds of the reaction (e.g., an amino group, a hydroxyl group, a carboxyl group, etc.), carboxyl groups showing a condensation reaction and hydroxyl groups and amino groups of the other side compounds of the reaction, and acid anhydrides showing a ring opening addition reaction and amino groups and hydroxyl groups of the other side compounds of the reaction can be preferably exemplified.

These functional groups may be introduced into polymer fine particles in the time of polymerization or they may be added after polymerization by a polymer reaction.

When functional groups are introduced in the Cue of polymerization, it is preferred that the monomers having these functional groups are emulsion polymerized or suspension polymerized. The specific examples of the monomers having the functional groups include allyl methacrylate, allyl acrylate, vinyl methacrylate, vinyl acrylate, 2-(vinyloxy)ethyl methacrylate, p-vinyloxystyrene, p-[2-(vinyloxy)ethyl]-styrene, glycidyl methacrylate, glycidyl acrylate, 2-isocyanate ethyl methacrylate or block isocyanate thereof by alcohol, 2-isocyanate ethyl acrylate or block isocyanate thereof by alcohol, 2-aminoethyl methacrylate, 2-aminoethyl acrylate, 2-hydroxyethyl methacrylate, 2-hydroxyethyl acrylate, acrylic acid, methacrylic acid, maleic anhydride, bifunctional acrylate, and bifunctional methacrylate, but the invention is not limited to these compounds.

In the invention, copolymers of these monomers and monomers copolymerizable with these monomers not having thermo-reactive groups can also be used. As the examples of copolymerizable monomers not having thermo-reactive groups, styrene, alkyl acrylate, alkyl methacrylate, acrylonitrile and vinyl acetate can be exemplified, for instance, but monomers not having thermo-reactive groups are not limited to these monomers.

As the polymer reaction used in the case where the thermo-reactive groups are introduced after polymerization, the polymer reactions disclosed in WO 96/34316 can be exemplified.

Of the above polymer fine particles having thermo-reactive groups, polymers that are coalesced with each other by heat are preferred, and those having hydrophilic surfaces and dispersible in water are particularly preferred. It is preferred that the contact angle of a film (a water droplet in air) prepared by coating only polymer fine particles and drying by a temperature lower than the solidification temperature is lower than the contact angle of a film (a water droplet in air) prepared by drying by a temperature higher than the solidification temperature. For making the surfaces of polymer fine particles hydrophilic, it is effective to let a hydrophilic polymer or oligomer, e.g., polyvinyl alcohol or polyethylene glycol, or a low molecular weight compound be adsorbed onto the surfaces of the polymer fine particles. However, the methods of surface hydrophilization treatment are not restricted thereto.

The solidification temperature of these polymer fine particles having thermo-reactive groups is preferably 70° C. or higher, but considering the aging stability, 100° C. or higher is more preferred. The average particle size of the polymer fine particles is preferably from 0.01 to 2.0 μm, more preferably from 0.05 to 2.0 μm, and particularly preferably from 0.1 to 1.0 μm. Good resolution and aging stability can be obtained in this range of average particle size.

As the thermo-reactive groups in the microcapsules encapsulating a compound having a thermo-reactive group for use in the invention, the same thermo-reactive groups as used in the polymer fine particles having thermo-reactive groups are preferably exemplified. Compounds having a thermo-reactive group are described below.

As the compound having a radical polymerizable unsaturated group, the same compounds as shown in the radical polymerizable microcapsules are preferably used.

As the compound having a vinyloxy group that can be preferably used in the invention, the compounds disclosed in JP-A-2002-29162 are exemplified. As the specific examples, tetramethylene glycol divinyl ether, trimethylolpropane trivinyl ether, tetraethylene glycol divinyl ether, pentaerythritol divinyl ether, pentaerythritol trivinyl ether, pentaerythritol tetravinyl ether, 1,4-bis[2-(vinyloxy)-ethyloxy]benzene, 1,2-bis[2-(vinyloxy)ethyloxy]benzene, 1,3-bis[2-(vinyloxy) ethyloxy]benzene, 1,3,5-tris[2-(vinyloxy)ethyloxy]benzene, 4,4'-bis[2-(vinyloxy)ethyloxy]-biphenyl, 4,4'-bis[2-(vinyloxy)ethyloxy]diphenyl ether, 4,4'-bis[2-(vinyloxy)ethyloxy]diphenylmethane, 1,4-bis[2-(vinyloxy)ethyloxy]naphthalene, 2,5-bis[2-(vinyloxy)-ethyloxy]furan, 2,5-bis[2-(vinyloxy)ethyloxy]thiophene, 2,5-bis[2-(vinyloxy) ethyloxy]imidazole, 2,2-bis{4-[2-(vinyloxy)ethyloxy] phenyl}propane (bis[vinyloxyethyl]ether of bisphenol A), 2,2-bis[4-(vinyloxymethyloxy)phenyl]propane, and 2,2-bis [4-(vinyloxy)phenyl]propane are exemplified, but the invention is not limited to these compounds.

As the compound having an epoxy group suitable used in the invention, compounds having 2 or more epoxy groups are preferred, and glycidyl ether compounds obtained by the reaction of polyhydric alcohol or polyhydric phenol with epichlorohydrin and prepolymers thereof, polymers and copolymers of glycidyl acrylate or glycidyl methacrylate can be exemplified.

The specific examples thereof include propylene glycol diglycidyl ether, tripropylene glycol diglycidyl ether, polypropylene glycol diglycidyl ether, neopentyl glycol diglycidyl ether, trimethylolpropane triglycidyl ether, diglycidyl ether of hydrogenated bisphenol A, hydroquinone diglycidyl ether, resorcinol diglycidyl ether, diglycidyl ether of bisphenol A or epichlorohydrin polyaddition products, diglycidyl ether of bisphenol F or epichlorohydrin polyaddition products, diglycidyl ether of halogenated bisphenol A or epichlorohydrin polyaddition products, diglycidyl ether of biphenyl-type bisphenol A or epichlorohydrin polyaddition products, glycidyl etherified products of novolak resins, copolymers of methyl methacrylate/glycidyl methacrylate, and copolymers of ethyl methacrylate/glycidyl methacrylate.

Commercially available products of these compounds include, e.g., Epicote 1001 (molecular weight: about 900, epoxy equivalence: 450-500, manufactured by Japan Epoxy Resin Co., Ltd.), Epicote 1002 (molecular weight: about 1,600, epoxy equivalence: 600-700), Epicote 1004 (molecular weight: about 1,060, epoxy equivalence: 875-975), Epicote 1007 (molecular weight: about 2,900, epoxy equivalence: 2,000), Epicote 1009 (molecular weight: about 3,750, epoxy equivalence: 3,000), Epicote 1010 (molecular weight: about 5,500, epoxy equivalence: 4,000), Epicote 1100L (epoxy equivalence: 4,000), Epicote YX31575 (epoxy equivalence: 1,200), Sumiepoxy ESCN-195XHN, ESCN-195XL and ESCN-195XF (manufactured by Sumitomo Chemical Co., Ltd.), etc.

As the isocyanate compounds preferably used in the invention, tolylene diisocyanate, diphenylmethane diisocyanate, polymethylene polyphenyl polyisocyanate, xylylene diisocyanate, naphthalene diisocyanate, cyclohexane phenylene diisocyanate, isophorone diisocyanate, hexamethylene diisocyanate, cyclohexyl diisocyanate, and blocked products of these compounds with alcohol or amine can be exemplified.

As preferred amine compounds, ethylenediamine, diethylenetriamine, triethylenetetramine, hexamethylene-diamine, propylenediamine and polyethyleneimine are exemplified.

As the compounds having a hydroxyl group preferably usable in the invention, compounds having methylol groups at terminals, polyhydric alcohols such as pentaerythritol, and bisphenol-polyphenols are exemplified.

As the compounds having a carboxyl group preferably usable in the invention, aromatic polycarboxylic acids, e.g., pyromellitic acid, trimellitic acid, and phthalic acid, and aliphatic polycarboxylic acids, e.g., adipic acid are exemplified. As the preferred acid anhydrides preferably used in the invention, pyromellitic anhydride and benzophenone-tetracarboxylic anhydride are exemplified.

The compounds having a thermo-reactive group can be microencapsulated by the well-known methods described above in the radical polymerization <Other Image Recording Layer Components>

For the purpose of improving an on-press developing property and the layer strength of an image-recording layer itself an image-recording layer in the invention may contain a hydrophilic resin. As the hydrophilic resins, resins having a hydrophilic group, e.g., a hydroxyl group, an amino group, a carboxyl group, a phosphoric acid group, a sulfonic acid group, and an amido group are preferred. Further, since hydrophilic resins are crosslinked by the reaction with the thermo-reactive group of a hydrophobitizing precursor to thereby increase image strength and resistance to printing machine, it is preferred that the hydrophilic resins have a group reactive with thermo-reactive groups. For example, when hydrophobitizing precursors have a vinyloxy group or an epoxy group, hydrophilic resins having a hydroxyl group, a carboxyl group, a phosphoric acid group or a sulfonic acid group are preferred. Hydrophilic resins having a hydroxyl group or a carboxyl group are particularly preferred.

The specific examples of hydrophilic resins include gum arabic, casein, gelatin, starch derivative, soya gum, hydroxypropyl cellulose, methyl cellulose, carboxymethyl cellulose and sodium salts of it, cellulose acetate, sodium alginate, vinyl acetate-maleic acid copolymers, styrene-maleic acid copolymers, polyacrylic acids and salts of them, polymethacrylic acids and salts of them, homopolymers and copolymers of hydroxyethyl methacrylate, homopolymers and copolymers of hydroxyethyl acrylate, homopolymers and copolymers of hydroxypropyl methacrylate, homopolymers and copolymers of hydroxypropyl acrylate, homopolymers and copolymers of hydroxybutyl methacrylate, homopolymers and copolymers of hydroxybutyl acrylate, polyethylene glycols, hydroxypropylene polymers, polyvinyl alcohols, hydrolyzed polyvinyl acetate having a hydrolysis degree of at least 60 mol %, preferably at least 80 mol %, polyvinyl formal, polyvinyl pyrrolidone, homopolymers and copolymers of acrylamide, homopolymers and copolymers of methacrylamide, homopolymers and copolymers of N-methylolacrylamide, homopolymers and copolymers of 2-acrylamide-2-methyl-1-propanesulfonic acid, and homopolymers and copolymers of 2-methacryloyloxyethyl-sulfonic acid.

The addition amount of the hydrophilic resins to an image recording layer is preferably 20 mass % or less, more preferably 10 mass % or less.

The hydrophilic resins may be crosslinked in advance in such a degree that an unexposed portion can be subjected to on-press development. The examples of the crosslinking agents include aldehydes, e.g., glyoxal, melamine-formaldehyde resin, and urea-formaldehyde resin, methylol compounds, e.g., N-methylolurea, N-methylolmelamine, and methylolated polyamide resin, active vinyl compounds, e.g., divinylsulfone and bis(β-hydroxyethylsulfonic acid), epoxy compounds, e.g., epichlorohydrin, polyethylene glycol diglycidyl ether, polyamide, polyamine, epichlorohydrin addition product, and polyamide-epichlorohydrin resin, ester compounds, e.g., monochloroacetic ester and thioglycolic ester, polycarboxylic acids, e.g., polyacrylic acid and methyl vinyl ether/maleic acid copolymer, inorganic crosslinking agents, e.g., boric acid, titanyl sulfate, Cu, Al, Sn, V, Cr salts, and modified polyamide-polyimide resins. In addition, crosslinking catalysts such as ammonium chloride, silane coupling agents, and titanate coupling agents can be used in combination.

An image-recording layer in the invention can contain reaction accelerators for initiating or accelerating the reaction of the thermo-reactive groups. As such reaction accelerators, photo-acid generators or radical generators in the color changing system and radical polymerization initiators in the polymerization system can be exemplified as preferred accelerators.

The reaction accelerators can be used in combination of two or more. The reaction accelerators may be directly added to an image-recording layer coating solution, or may be added to the polymer fine particles. The content of the reaction accelerators in an image-recording layer is preferably from 0.01 to 20 mass % of the total solids content of the image-recording layer, more preferably from 0.1 to 10 mass %. In this range of reaction accelerator content, on-press developing properties are not impaired and good reaction initiation and accelerating effect can be ensured.

In the image-recording layer utilizing hydrophobitizing precursor series, polyfunctional monomers can be added to the matrix of the image-recording layer for further increasing the press life. As the polyfunctional monomers, the polymerizable compounds exemplified above can be used. Trimethylolpropane triacrylate and pentaerythritol triacrylate are preferred above all.

Further, the hydrophobitizing precursor series image-recording layer can contain additives such as the surfactants, polymerization inhibitors, higher fatty acid derivatives, plasticizers, inorganic fine particles and low molecular weight hydrophilic compounds described in the item of <Other image-recording layer components> in the polymerization series image-recording layer, according to necessity.

<Formation of Hydrophobitizing Precursor Series Image Recording Layer>

Similarly to the case of the radical polymerization series image-recording layer, the hydrophobitizing precursor series image-recording layer in the invention is formed by preparing a coating solution by dispersing or dissolving the above necessary components in a solvent, and coating the coating solution on a support and drying.

The coating weight (solids content) of the image recording layer on a support obtained after coating and drying is generally preferably from 0.5 to 5.0 g/m$^2$, although it differs according to uses.

A lithographic printing plate precursor capable of on-press development can be manufactured by using the hydrophobitizing precursor series image-recording layer.

On the other hand, by giving sufficient resistance to printing machine to the hydrophobitizing precursor series image recording layer (a hydrophilic layer having a crosslinking structure) even when the image-recording layer is unexposed, the lithographic printing plate precursor in the invention can be applied to a non-processing (non-development) type lithographic printing plate precursor.

It is preferred for a hydrophilic layer having such a crosslinking structure to contain at least one kind of a hydrophilic resin having a crosslinking structure and an inorganic hydrophilic binder resin formed by sol/gel conversion. Of these resins, the hydrophilic resin is described first. By the addition of the hydrophilic resin, the affinity of the hydrophilic components in emulsion ink is increased and, at the same time, the film strength of the image-recording layer itself is also improved As the hydrophilic resins, those having a hydrophilic group, e.g., hydroxyl, carboxyl, hydroxyethyl, hydroxypropyl, amino, aminoethyl, aminopropyl and carboxymethyl, are preferred The specific examples of the hydrophilic resins include Sum arabic, casein, gelatin, starch derivative, carboxymethyl cellulose and the sodium salt thereof, cellulose acetate, sodium alginate, vinyl acetate-maleic acid copolymers, styrene-maleic acid copolymers, polyacrylic acids and the salts thereof, polymethacrylic acids and the salts thereof, homopolymers and copolymers of hydroxyethyl methacrylate, homopolymers and copolymers of hydroxyethyl acrylate, homopolymers and copolymers of hydroxypropyl methacrylate, homopolymers and copolymers of hydroxypropyl acrylate, homopolymers and copolymers of hydroxybutyl methacrylate, homopolymers and copolymers of hydroxybutyl acrylate, polyethylene glycols, hydroxypropylene polymers, polyvinyl alcohols, hydrolyzed polyvinyl acetate having a hydrolysis degree of at least 60 mol %, preferably at least 80 mol %, polyvinyl fornal, polyvinyl butyral, polyvinyl pyrrolidone, homopolymers and copolymers of acrylamide, homopolymers and copolymers of methacrylamide, and homopolymers and copolymers of N-methylolacrylamide.

When the hydrophilic resin is used in an image-recording layer in the invention, it is effective to use the hydrophilic resin by crosslinking. As crosslinking agents for forming a crosslinking structure, the compounds exemplified above as the crosslinking agents are used.

As preferred non-processing (non-development) type image-recording layer, an image-recording layer containing an inorganic hydrophilic binder resin formed by sol/gel conversion can also be exemplified. Preferred sol/gel convertible binder resins are polymers wherein the bonding groups of polyvalent elements form a network structure, i.e., a three-dimensional crosslinking structure, via oxygen atoms and, at the same time, polyvalent metals also have hydroxyl groups and alkoxyl groups not bonded and they are mixed and form resinous structure. The systems are in a sot state at a stage abundant in alkoxyl groups and hydroxyl groups, and the network resinous structure comes to heighten with the advancement of dehydration condensation. The polyvalent bonding elements of the compounds having sol/gel convertible hydroxyl groups and alkoxyl groups are aluminum, silicon, titanium and zirconium, and all of which can be used in the invention. More preferred sol/gel convertible systems are those using silicon, and particularly preferred system is a sol/gel convertible system containing a silane compound having at least one silanol group. A sol/gel convertible system using silicon is described below. Sol/gel conversions using aluminum, titanium and zirconium can also be carried out by the substitution of the silicon in the following description with respective elements.

Sol/gel convertible binder resins are preferably resins having a siloxane bond and a silanol group, and a coating solution of sol system containing a compound having at least one silanol group is used in an image-recording layer in the invention. Condensation and gelation of the silanol group progress during coating and drying processes, and the structure of a siloxane skeleton is formed.

An image-recording layer containing a sol/gel convertible binder resin and the above hydrophilic resins and crosslinking agents can be used in combination for the purpose of the improvement of physical properties, e.g., layer strength and the flexibility of the layer, and the betterment of coating property.

A siloxane resin for forming a gel structure is represented by the following formula (III), and a silane compound having at least one silanol group is represented by the following formula (IV). A material added to an image recording layer need not be a silane compound represented by formula (IV) alone and, in general, the material may comprise an oligomer of a silane compound partially condensed, or may be mixture of a silane compound represented by formula (IV) and the oligomer.

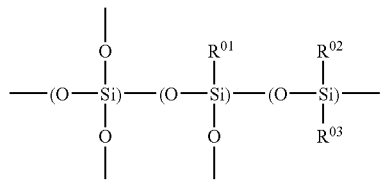

A siloxane resin represented by formula (III) is formed by sol/gel conversion from the dispersion containing at least one silane compound represented by formula (IV). In formula (III), at least one of $R^{01}$, $R^{02}$ and $R^{03}$ represents a hydroxyl group, and the remaining represent an organic residue selected from $R^0$ and Y in formula (IV).

$$(R^0)_n Si(Y)_{4-n} \tag{IV}$$

wherein $R^0$ represents a hydroxyl group, a hydrocarbon group or a heterocyclic group; Y represents a hydrogen atom, a halogen atom, $-OR^1$, $-OCOR^2$ or $-N(R^3)(R^3)(R^4)$; $R^1$ and $R^2$ each represents a hydrocarbon group; $R^3$ and $R^4$, which may be the same or different, each represents a hydrocarbon group or a hydrogen atom; and n represents 0, 1, 2 or 3.

$R^0$ represents, as the hydrocarbon group or the heterocyclic group, e.g., a straight chain or branched alkyl group having from 1 to 12 carbon atoms which may be substituted (e.g., a methyl group, an ethyl group, a propyl group, a butyl group, a pentyl group, a hexyl group, a heptyl group, an octyl group, a nonyl group, a decyl group, a dodecyl group, etc.; as the substituents of these groups, a halogen atom (a chlorine atom, a fluorine atom, a bromine atom), a hydroxyl group, a thiol group, a carboxyl group, a sulfo group, a cyano group, an epoxy group, an —OR' group (R' represents a methyl group, an ethyl group, a propyl group, a butyl group, a heptyl group, a hexyl group, an octyl group, a decyl group, a propenyl group, a butenyl group, a hexenyl group, an octenyl group, a 2-hydroxyethyl group, a 3-chloropropyl group, a 2-cyanoethyl group, an N,N-dimethylaminoethyl group, a 2-bromoethyl group, a 2-(2-methoxyethyl)oxyethyl group, a 2-methoxycarbonylethyl group, a 3-carboxyethyl group, a 3-carboxypropyl group, a benzyl group), an —OCOR" group (R" has the same meaning as R' above), a —COOR" group, a —COR" group, an —N(R'")(R'") group (R'" represents a hydrogen atom or the same meaning as R', and two R'" may be the same or different), an —NHCONHR" group, an —NH-COOR" group, an —Si(R")$_3$ group, and a —CONHR" group can be exemplified, and a plurality of substituents may be substituted on the alkyl group), a straight chain or branched alkenyl group having from 2 to 12 carbon atoms which may be substituted (e.g., a vinyl group, a propenyl group, a butenyl group, a pentenyl group, a hexenyl group, an octenyl group, a decenyl group, a dodecenyl group, etc.; as the substituents of these groups, the same groups described above as the substituents of the alkyl group can be exemplified), an aralkyl group having from 7 to 14 carbon atoms which may be substituted (e.g., a benzyl group, a phenethyl group, a 3-phenylpropyl group, a naphthylmethyl group, a 2-naphthylethyl group; as the substituents of these groups, the same groups described above as the substituents of the alkyl group can be exemplified, and a plurality of substituents may be substituted on the aralkyl group), an alicyclic group having from 5 to 10 carbon atoms which may be substituted (e.g., a cyclopentyl group, a cyclohexyl group, a 2-cyclohexylethyl group, a norbornyl group, an adamantyl group, etc.; as the substituents of these groups, the same groups described above as the substituents of the alkyl group can be exemplified, and a plurality of substituents may be substituted), an aryl group having from 6 to 12 carbon atoms which may be substituted (e.g., a phenyl group, a naphthyl group, as the substituents of these groups, the same groups described above as the substituents of the alkyl group can be exemplified, and a plurality of substituents may be substituted), or a heterocyclic group containing at least one atom selected from a nitrogen atom, an oxygen atom and a sulfur atom which may be condensed (e.g., a pyran ring, a furan ring, a thiophene ring, a morpholine ring, a pyrrole ring, a thiazole ring, an oxazole ring, a pyridine ring, a piperidine ring, a pyrrolidone ring, a benzothiazole ring, a benzoxazole ring, a quinoline ring, a tetrahydrofuran ring, etc.; each of which may have a substituent, as the substituents of these groups, the same groups described above as the substituents of the alkyl group can be exemplified, and a plurality of substituents may be substituted).

The substituents of the $-OR^1$ group, $-OCOR^2$ group or $-N(R^3)(R^4)$ group represented by Y in formula (IV) are as follows. In the $-OR^1$ group, $R^1$ represents an aliphatic group having from 1 to 10 carbon atoms which may be substituted (e.g., a methyl group, an ethyl group, a propyl group, a butyl group, a heptyl group, a hex,! group, a pentyl group, an octyl group, a nonyl group, a decyl group, a propenyl group, a butenyl group, a heptenyl group, a hexenyl group, an octenyl group, a decenyl group, a 2-hydroxyethyl group, a 2-hydroxypropyl group, a 2-methoxyethyl group, a 2-(2-methoxyethyl)oxyethyl group, a 2-(N,N-dimethylamino)ethyl group, a 2-methoxypropyl group, a 2-cyanoethyl group, a 3-methyloxypropyl group, a 2-chloroethyl group, a cyclohexyl group, a cyclopentyl group, a cyclooctyl group, a chlorocyclohexyl group, a methoxycyclohexyl group, a benzyl group, a phenethyl group, a dimethoxybenzyl group, a methylbenzyl group, a bromobenzyl group, etc.).

In the $-OCOR^2$ group, $R^2$ represents an aliphatic group of the same meaning as R1 has, or an aromatic group having from 6 to 12 carbon atoms which may be substituted (as the aromatic group, those described above in the aryl group represented by R can be exemplified). In the $-N(R^3)(R^4)$ group, $R^3$ and $R^4$, which may be the same or different, each represents a hydrogen atom or an aliphatic group having from 1 to 10 carbon atoms which may be substituted (e.g., the same groups described in $R^1$ of the $-OR^1$ group can be exemplified). More preferably, the total number of the carbon atoms of $R^3$ and $R^4$ is not more than 16. As the specific examples of the silane compound represented by formula (IV), the following compounds can be exemplified, but the present invention is not limited to these compounds.

Tetrachlorosilane, tetramethoxysilane, tetraethoxysilane, tetraisopropoxysilane, tetra-n-propylsilane, methyltrichlorosilane, methyltrimethoxysilane, methyltriethoxysilane, ethyltrichlorosilane, ethyltrimethoxysilane, ethyltriethoxysilane, n-propyltrichlorosilane, n-propyltrimethoxysilane, n-hexyltrimethoxysilane, n-decyltrimethoxysilane, phenyltrichlorosilane, phenyltrimethoxysilane, dimethoxyditriethoxysilane, dimethyldichlorosilane, dimethyldimethoxysilane, diphenyldimethoxysilane, phenylmethyldimethoxysilane, triethoxyhydrosilane, trimethoxyhydrosilane, vinyltrichlorosilane, vinyltrimethoxysilane, trifluoropropyltrimethoxysilane, γ-glycidoxypropylmethyldimethoxysilane, γ-glycidoxypropylmethyldiethoxysilane, γ-glycidoxypropyltriethoxysilane, γ-methacryloxypropyltrimethoxysilane, γ-aminopropylmethyldimethoxysilane, γ-aminopropyltriethoxysilane, γ-mercaptopropylmethyldimethoxysilane, γ-mercaptopropyltrimethoxysilane, γ-mercaptopropyltriethoxysilane, and β(3,4-epoxycyclohexyl)ethyltrimethoxysilane.

Together with a silane compound represented by formula (IV), metallic compounds capable of conjoining with resins to form a film at the time of sol/gel conversion, e.g., Ti, Zn, Sn, Zr, Al, etc., can be used in the image-recording layer in combination. The examples of the metallic compounds for use for this purpose include, e.g., $Ti(OR'')_4$, $TiCl_4$, $Zn(OR'')_2$, $Zn(CH_3COCHCOCH_3)_2$, $Sn(OR'')_4$, $Sn(CH_3COCHCOCH_3)_4$, $Sn(OCOR'')_4$, $SnCl_4$, $Zr(OR'')_4$, $Zr(CH_3COCHCOCH_3)_4$, $(NH_4)_2ZrO(CO_3)_2$, $Al(OR'')_3$, $Al(CH_3COCHCOCH_3)$, etc. (wherein R" represents a methyl group, an ethyl group, a propyl group, a butyl group, a pentyl group, a hexyl group).

For accelerating hydrolysis and polycondensation reaction of the silane compound represented by formula (IV) and the above metallic compound to be used in combination, it is preferred to use an acidic catalyst or a basic catalyst together. As the catalyst, an acidic or basic compound may be used as it is, or may be dissolved in water or a solvent such as alcohol (hereinafter referred to as the acidic catalyst or the basic catalyst). The concentration of the catalyst is not particularly restricted but when the concentration is high, hydrolysis and polycondensation reaction are liable to become fast. However, when the basic catalyst in high concentration is used, a precipitate is formed in some cases, so that the concentration of the basic catalyst is preferably 1N (in terms of the concentration in an aqueous solution) or less.

The specific examples of the acidic catalysts include hydroghalogenic acid such as hydrochloric acid, carboxylic acids such as nitric acid, sulfuric acid, sulfurous acid, hydrogen sulfide, perchloric acid, hydrogen peroxide, carbonic acid, formic acid and acetic acid, and and sulfonic acid such as benzenesulfonic acid. The specific examples of the basic catalysts include ammoniacal bases such as aqueous ammonia, and amines such as ethylamine and aniline, but the catalysts are not limited to these compounds.

As described above, an image-recording layer produced by the sol/gel method is particularly preferred as the constitution of the image-recording layer according to the present invention. The details of the sol/gel method are described in Sumio Sakuhana, *Sol/Gel Ho no Kagaku* (*Chemistry of Sol/Gel Method*), Agune Shofu-Sha (1988) and Seki Hirashima, *Saishin Sol/Gel Ho ni yoru Kino-Sei Hakumaku Sakusei Gijutsu* (*Producing Techniques of Functional Thin Films by the Latest Sol/Gel Methods*), Sogo Gijutsu Center (1992).

The addition amount of the hydrophilic resins to an image recording layer having a crosslinking structure is preferably from 5 to 70 mass % of the solids content of the image-recording layer, more preferably from 5 to 50 mass %.

Support:

Supports for use in the image-recording layer in the invention are not particularly limited and any materials can be used so long as they are dimensionally stable and plate-like materials. As the support for an on-press development type lithographic printing plate precursor, supports having a hydrophilic surface are preferred. For example, paper, paper laminated with plastics (e.g., polyethylene, polypropylene, polystyrene, etc.), metal plates (e.g., aluminum, zinc, copper, etc.), plastic films (e.g., cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, etc.), and paper and plastic films laminated or deposited with the above metals can be exemplified as the materials of the support. Preferred supports are a polyester film and an aluminum plate. Above all aluminum sheets, which are dimensionally stable and comparatively inexpensive, are preferred.

Aluminum plates are a pure aluminum plate, alloy plates containing aluminum as a main component and a trace amount of different elements, and aluminum or aluminum alloy thin films laminated with plastics. The examples of different elements contained in aluminum alloys include silicon, iron, manganese, copper, magnesium, chromium, zinc, bismuth, nickel, titanium, etc. The different element content in aluminum alloys is preferably 1 mass % or less. In the invention, a pure aluminum plate is preferred but 100% pure aluminum is difficult to produce from the refinig technique, accordingly, an extremely small amount of different elements may be contained. Thus, the compositions of aluminum plates used in the invention are not specified, and aluminum plates of conventionally well known and commonly used materials can be optionally used.

A support for use in the invention has a thickness of preferably from 0.1 to 0.6 mm, more preferably from 0.15 to 0.4 mm, and still more preferably from 0.2 to 0.3 mm.

Prior to the use of an aluminum plate, it is preferred for the aluminum plate to be subjected to surface treatment, e.g., surface roughening treatment and hydrophilic film forming treatment. By surface treatment, the improvement of hydrophilicity and the security of the adhesion of an image-recording layer and a support become easy. Prior to the surface roughening treatment of an aluminum plate, if necessary, degreasing treatment with a surfactant, an organic solvent or an alkaline aqueous solution is carried out to remove the rolling oil on the surface of an aluminum plate.

Surface Roughening Treatment:

Surface roughening treatment of the surface of an aluminum plate is performed by various methods, e.g., mechanical surface roughening treatment, electrochemical surface roughening treatment (surface roughening treatment of electrochemically dissolving the surface), and chemical surface roughening treatment (surface roughening treatment of chemically selectively dissolving the surface) are exemplified.

As the method of mechanical surface roughening treatment, well-known methods, e.g., a ball rubbing method, a brash abrading method, a blast abrading method, or a buffering method, can be used.

As the method of electrochemical surface roughening treatment, a method of roughening in an electrolyte containing an acid such as a hydrochloric acid or a nitric acid by alternating current or direct current can be used. Further, a method of using mixed acids can be used as disclosed in JP-A-54-63902.

Formation of Hydrophilic Layer:

The aluminum plate having been subjected to the surface roughening treatment, and other treatments according to necessity, undergoes the treatment for forming a hydrophilic layer having low thermal conductivity. The thermal conductivity of the hydrophilic layer in the thickness direction is 0.05 W/mK or more, preferably from 0.08 to 0.5 W/mK, more preferably 0.3 W/mK or less, and still more preferably 0.2 W/mK or less. When the thermal conductivity of the hydrophilic layer in the layer thickness direction is from 0.05 0.5 W/mK, the diffusion of the heat generated in the image-recording layer by laser exposure to the support can be prevented. As a result, when the lithographic printing plate precursor is used as an on-press development type or non-processing type lithographic printing plate precursor, the heat generated by laser exposure can be effectively used, so that high sensitivity, sufficient print image formation and printing out image formation become possible.

The thermal conductivity of a hydrophilic film in the thickness direction prescribed in the invention is described below. Various measuring methods of thermal conductivity of a thin film have so fir been reported. Ono et al. have reported the thermal conductivity of a thin film in the plane direction by using a thermograph in 1986. Further, a trial to apply an alternating current heating method to the measurement of thermal physical properties of a thin film is reported. The origin of the alternating current heating method can be retroactive to the report in 1863. Various measuring methods are proposed in recent years by the development of a heating method by laser and by the combination with Fourier transform. Apparatus using a laser angstrom method are really now on the market. All of these methods are to find the thermal conductivity of a thin film in the plane direction (in-plane).

However, thermal diffusion in the depth direction is a rather important factor in considering the thermal conduction of a thin film.

It is said that the thermal conductivity of a thin film is not isotropic as reported variously. In particular, in the case of the present invention, the direct measurement of the thermal conductivity of a thin film in the thickness direction is very important. From this point of view, as a trial to measure the thermal physical properties of a thin film in the thickness direction, the method using a thermocomparator is reported in Lambropoulos et al., *J. Appl. Phys.* 66 (9) (1 Nov., 1989) and Henager et al., *Applied Optics*, Vol. 32, No. 1 (1 Jan., 1993). Further, in recent years, a method of measuring thermal diffusivity of a polymer thin film by the temperature wave thermal analysis applying Fourier analysis is reported in Hashimoto et al, *Netsu Sokutei* (*Thermal Measurement*), 27 (3) (2000).

The thermal conductivity of a hydrophilic film in the thickness direction prescribed in the invention is measured by the above method of using a thermocomparator. The measuring method of the above method is specifically described below, but the fundamental principles of the method are described in detail in the article of Lambropoulos et al. and the article of Henager et al. In the invention, measurement was performed with a thermocomparator shown in FIG. 3 in JP-A-2003-103951 and according to the method disclosed in the same patent.

The relationships between each temperature and the heat conductivities of the film are as the following equation (1).

Equation (1)

$$\frac{(T_r - T_b)}{(T_r - T_t)} = \left(\frac{4K_1 r_1}{K_{tf} A_2}\right) t + \left(1 + \left(\frac{4K_1 r_1}{K_2 A_2}\right) t_2 + \left(\frac{K_1 r_1}{K_4 r_1}\right)\right) \quad (1)$$

The signs in the equation are as follows.
$T_t$: Temperature at the tip of chip
$T_b$: Temperature of heat sink
$T_r$: Temperature of reservoir
$K_{tf}$: Thermal conductivity of film
$K_1$: Thermal conductivity of reservoir
$K_2$: Thermal conductivity of chip (in the case of oxygen free copper: 400 W/mK)
$K_4$: Thermal conductivity of metal substrate (in the case of not having a thin film)
r1: Radius of curvature of the tip of chip
$A_2$: Contact area of reservoir and chip
$A_3$: Contact area of chip and film
t: Thickness of film
$t_2$: Contact thickness (about 0)

By measuring each temperature ($T_t$, $T_b$, and $T_r$) and plotting with changing the film thickness (t), the gradient of equation (1) and the thermal conductivity of the film ($K_{tf}$) can be found. That is, as is apparent from of equation (1), the gradient is a value determined by the thermal conductivity of the reservoir ($K_1$), the radius of curvature of the tip of the chip (r1), the thermal conductivity of the film ($K_{tf}$), and the contact area of the chip and the film ($A_3$), and $K_1$, r1 and $A_3$ are already known values, so that $K_{tf}$ can be obtained from the gradient.

The inventors searched for the thermal conductivity of the hydrophilic film (an anodic oxide film $Al_2O_3$) formed on the aluminum substrate according to the above measuring method. The temperature was measured with changing the film thickness, and the thermal conductivity of $Al_2O_3$ found from the gradient of the resulted graph was 0.69 W/mK. This value well coincides with the results in the article of Lambropoulos et al., and this result also shows that the thermal physical value of a thin film is different from the thermal physical value of the bulk (the thermal conductivity of $Al_2O_3$ of bulk is 28 W/mK).

When the above measuring method is used in the measurement of the thermal conductivity in the thickness direction of a hydrophilic film of a lithographic printing plate precursor in the invention, a result free of dispersion can be preferably obtained even with a roughened surface for lithographic printing by making the tip of a chip minute and maintaining the pressing load constant It is preferred to find the value of thermal conductivity as the average value of measurement at a plurality of points on a sample, e.g., at fine points.

From the aspects of scratch resistance and press life, the thickness of a hydrophilic film is preferably 0.1 μm or more, more preferably 0.3 μm or more, and particularly preferably 0.6 μm or more, and considering from the manufacturing costs that a great energy is required for forming a thick film, the thickness is preferably 5 μm or less, more preferably 3 μm or less, and particularly preferably 2 μm or less.

It is preferred that the hydrophilic film in the invention has a density of from 1,000 to 3,200 kg/m³ from the thermal insulating effect, film strength and soiling resistance in printing.

The density can be computed according to the following equation from the mass measured by a Mason method (a weighing method of anodic oxide film by dissolution with a chromic acid/phosphoric acid mixed solution) and the film thickness obtained by observing the cross section of a film with an SEM.

Density (kg/cm³)=(mass of a hydrophilic film per a unit area/film thickness)

The forming methods of a hydrophilic film are not especially restricted, and an anodizing method, a vacuum evaporation method, a CVD method, a sol/gel method, a sputtering method, an ion plating method, and a diffusing method can be arbitrarily used. Further, it is also possible to use a method of coating a solution obtained by mixing hollow particles in a hydrophilic resin or a sol/gel solution.

A process of producing an oxide by anodization, that is, using an anodizing process, is most preferred. Anodizing process can be carried out by the methods conventionally used in the industry. Specifically, by the application of DC or AC to an aluminum plate in an aqueous solution or nonaqueous solution comprising sulfuric acid, phosphoric acid, chromic acid, oxalic acid, sulfamic acid or benzenesulfonic acid alone or in combination of two or more, an anodic oxide film that is a hydrophilic film can be formed on the surface of the aluminum plate. The conditions of anodizing process change variously by the electrolytes used and cannot be determined unconditionally, but generally the concentration of an electrolyte of from 1 to 80 mass %, a liquid temperature of from 5 to 70° C., electric current density of from 0.5 to 60 A/m$^2$, voltage of from 1 to 200 V, and electrolysis time of from 1 to 1,000 seconds are preferred. Of the anodizing processes, an anodizing process in a sulfuric acid electrolyte by high electric current density as disclosed in British Patent 1,412,768, and an anodizing process with a phosphoric acid as the electrolytic bath as disclosed in U.S. Pat. No. 3,511,661 are preferred. It is also possible to perform a multi-stage anodizing process comprising anodization in a sulfuric acid electrolyte and further anodization in a phosphoric acid.

In the points of scratch resistance and press life, the anodic oxide film in the invention is preferably 0.1 g/m$^2$ or more, more preferably 0.3 g/m$^2$ or more, still more preferably 2 g/m$^2$ or more, and particularly preferably 3.2 g/m$^2$ or more. Considering that a great energy is required for forming a thick film, the anodic oxide film is preferably 100 g/m$^2$ or less, more preferably 40 g/m$^2$ or less, and particularly preferably 20 g/m$^2$ or less.

Minute concavities called micro pores evenly distributed are formed on the surface of an anodic oxide film. The density of micro pores on the surface of an anodic oxide film can be controlled by arbitrarily selecting the processing conditions. The thermal conductivity in the thickness direction of an anodic oxide film can be made from 0.05 to 0.5 W/mK by increasing the density of micro pores. In addition, the diameter of micro pores can be adjusted by arbitrarily selecting the processing conditions. The thermal conductivity in the thickness direction of an anodic oxide film can be made from 0.05 to 0.5 W/mK by making the diameter of micro pores larger.

It is preferred in the invention to perform a pore widening process of enlarging the pore diameter of micro pores after anodizing process for the purpose of lowering the thermal conductivity. The pore widening process is a process of dissolving an anodic oxide film to thereby enlarge the pore diameter of micro pores by immersing an aluminum substrate on which an anodic oxide film is formed in an acid aqueous solution or an alkali aqueous solution. The pore widening process is performed in the range of the dissolving amount of an anodic oxide film of preferably from 0.01 to 20 g/m$^2$, more preferably from 0.1 to 5 g/m$^2$, and particularly preferably from 0.2 to 4 g/m$^2$.

When an acid solution is used in a pore widening process, it is preferred to use an aqueous solution of inorganic acid such as sulfuric acid, phosphoric acid, nitric acid or hydrochloric acid, or an aqueous solution of the mixture of these acids. The concentration of an acid aqueous solution is preferably from 10 to 1,000 g/liter, more preferably from 20 to 500 g/liter. The temperature of an acid aqueous solution is preferably from 10 to 90° C., more preferably from 30 to 70° C. The time of immersion in an acid aqueous solution is preferably from 1 to 300 seconds, more preferably from 2 to 100 seconds. On the other hand, when an alkali aqueous solution is used in a pore widening process, it is preferred to use an aqueous solution containing at least one alkali selected from the group consisting of sodium hydroxide, potassium hydroxide and lithium hydroxide. The pH of an alkali aqueous solution is preferably from 10 to 13, more preferably from 11.5 to 13.0. The temperature of an alkali aqueous solution is preferably from 10 to 90° C., more preferably from 30 to 50° C. The time of immersion in an alkali aqueous solution is preferably from 1 to 500 seconds, more preferably from 2 to 100 seconds. However, too large an enlargement of the micro pore diameter on the outermost surface results in the deterioration of soiling resistance in printing, so that the micro pore diameter on the outermost surface is preferably 40 nm or less, more preferably 20 nm or less, and most preferably 10 nm or less. Accordingly, a more preferred anodic oxide film capable of compatibility of a heat insulating property and soiling resistance is an anodic oxide film having a surface micro pore diameter of from 0 to 40 nm and an inside micro pore diameter of from 20 to 300 nm. For example, it is known that when the kind of the electrolyte is the same, the pore diameter of the pore that occurs by the electrolysis is proportional to the electrolytic voltage at the time of electrolysis. By macing use of the nature, a method of forming pores having a widened bottom part can be used by gradually increasing electrolytic voltage. It is also known that a pore diameter changes by changing the kind of electrolyte, and a pore diameter becomes larger in the order of a sulfuric acid, an oxalic acid, and a phosphoric acid. Accordingly, a method of anodization of using a sulfuric acid in the electrolyte of the first stage and a phosphoric acid in the second stage can be used. In addition, a support for a lithographic printing plate obtained by an anodizing process and a pore widening process may be subjected to a sealing process described later.

In addition to the above anodic oxide film a hydrophilic film may be an inorganic film formed by a sputtering method, a CVD method, etc. As the compounds constituting an inorganic film, e.g., oxide, nitride, silicide, boride and carbide are exemplified. An inorganic film may be composed of a simple substance of a compound alone or may be composed of a mix e of compounds. As the compounds constituting an inorganic film, aluminum oxide, silicon oxide, titanium oxide, zirconium oxide, hafnium oxide, vanadium oxide, niobium oxide, tantalum oxide, molybdenum oxide, tungsten oxide, chromium oxide; aluminum nitride, silicon nitride, titanium nitride, zirconium nitride, hafnium nitride, vanadium nitride, niobium nitride, tantalum nitride, molybdenum nitride, tungsten nitride, chromium nitride, silicon nitride, boron nitride, titanium silicide, zirconium silicide, hafnium silicide, vanadium silicide, niobium silicide, tantalum silicide, molybdenum silicide, tungsten silicide, chromium silicide; titanium boride, zirconium boride, hafnium boride, vanadium boride, niobium boride, tantalum boride, molybdenum boride, tungsten boride, chromium boride; aluminum carbide, silicon carbide, titanium carbide, zirconium carbide, hafnium carbide, vanadium carbide, niobium carbide, tantalum carbide, molybdenum carbide, tungsten carbide, chromium carbide are specifically exemplified.

Sealing Process:

As described above, in the invention, a support for a lithographic printing plate provided with a hydrophilic film may be subjected to a sealing process. As the sealing process used in the invention, sealing processes of an anodic oxide film by steam sealing under pressure and boiling water sealing as disclosed in JP-A-4-176690 and JP-A-11-301135 are exemplified. Well-known sealing processes can also be used in the invention, e.g., a silicate process, a bichromate aqueous solution process, a nitrite process, an ammonium acetate process, an electrodeposition sealing process, a triethanolamine process, a barium carbonate process, and a sealing process by boiling water containing a trace amount of phosphate, can be used. A forming system of a pore varies according to the manner of sealing process, for example, a pore is formed from the bottom when sealing is performed by an electrodeposition sealing process and a pore is formed from the top when steam sealing is performed. In addition, an immersing process in a solution, a spraying process, a coating process, a vacuum evaporation process, sputtering, ion plating, flame spray coating and metal plating are exemplified as sealing processes, but the process of sealing is not particularly limited in the invention. As a particularly preferred process, a sealing process using particles having an average particle size of from 8 to 800 nm as disclosed in JP-A-2002-214764 is exemplified.

The average particle size of the particles used in the sealing process using particles is from 8 to 800 nm, preferably from 10 to 500 nm, and more preferably from 10 to 150 nm. When sealing is performed with this range of particles, there is no possibility of the particles entering into the micro pores on a hydrophilic film and the effect of increasing sensitivity can be sufficiently obtained, further, the adhesion with an image-recording layer becomes sufficient and excellent press life can be ensured, The thickness of a particle layer is preferably from 8 to 800 nm, more preferably from 10 to 500 nm.

The thermal conductivity of the particles used in the invention is preferably 60 W/mK or less, more preferably 40 W/mK or less, and particularly preferably from 0.3 to 10W/mK When the thermal conductivity is 60 W/mK or less, the diffusion of heat to an aluminum substrate can be sufficiently controlled and the effect of increasing sensitivity can be sufficiently obtained.

As the method of forming a particle layer, e.g., an immersing process in a solution, a spraying process, a coating process, an electrolytic process, a vacuum evaporation process, sputtering, ion plating, flame spray coating and metal plating are exemplified, but the method is not particularly restricted.

An electrolytic process is performed with DC or AC. As the waveforms of AC used in the electrolytic process, a sine wave, a rectangular wave, a triangular wave and a trapezoidal wave are exemplified. From the viewpoint of the manufacturing costs of an electric power unit, the frequencies of AC are preferably from 30 to 200 Hz, more preferably from 40 to 120 Hz. When a trapezoidal wave is used as the waveform of AC, the time required for the electric current to reach the peak from 0 (tp) is preferably from 0.1 to 2 msec, more preferably from 0.3 to 1.5 msec.

As hydrophilic particles, it is preferred to use $Al_2O_3$, $TiO_2$, $SiO_2$ respectively alone or in combination of two or more. An electrolyte can be obtained by suspending the above hydrophilic particles in water and the like so that the content of the particles becomes from 0.01 to 20 mass % of the total conte.t The pH of an electrolyte can be adjusted by adding, e.g., a suifuic acid, to be charged positively or negatively. Electrolytic process is performed, e.g., by using DC with an aluminum plate as the cathode and with the above electrolyte on the conditions of the voltage of from 10 to 200 V for 1 to 600 seconds. According to this method, micro pores can be easily sealed while leaving voids in the micro pores on the anodic oxide film.

As sealing processes, the methods of providing any of the following layers by coating arc exemplified, e.g., a layer comprising a compound having at least one amino group, and at least one group selected from the group consisting of a carboxyl group and a group of the salt thereof, a sulfo group and a group of the salt thereof as disclosed in JP-A-60-149491, a layer comprising a compound having at least one amino group and at least one hydroxyl group, and a compound selected from the salts thereof as disclosed in JP-A-60-232998, a layer containing a phosphate as disclosed in JP-A-62-19494, and a layer comprising a polymer compound having at least one monomer unit having a sulfo group as the repeating unit in the molecule as disclosed in JP-A-59-101651.

The methods of providing a layer of a compound selected from the following compounds are also exemplified, e.g., carboxymethyl cellulose; dextrin; gum arabic; phosphonic acids having an amino group such as 2-aminoethylphosphonic acid; organic phosphonic acids such as phenylphosphonic acid, naphthyl-phosphonic acid, alkylphosphonic acid, glycero-phosphonic acid, methylenediphosphonic acid, ethylenediphosphonic acid, each of which may have a substituent, organic phosphoric esters such as phenylphosphoric ester, naphthylphosphoric ester, alkylphosphoric ester, glycerophosphoric ester, each of which may have a substituent; organic phosphinic acids such as phenylphosphinic acid, naphthyl-phosphinic acid, alkylphosphinic acid, glycerophosphinic acid, each of which may have a substituent; amino acids such as glycine, β-alanine; and amine hydrochloride having a hydroxyl group such as triethanolamine hydrochloride.

Coating of a silane coupling agent having an unsaturated group can also be used in sealing process. The examples of silane coupling agents include N-3-(acryloxy-2-hydroxypropyl)-3-aminopropyltriethoxysilane, (3-acryloxypropyl)-dimethylmethoxysilane, (3-acryloxypropyl)methyldimethoxy-silane, (3-acryloxypropyl)trimethoxysilane, 3-(N-allyl-amino)propyltrimethoxysilane, allyldimethoxysilane, allyltriethoxysilane, allyltrimethoxysilane, 3-butenyltriethoxysilane, 2-(chloromethyl)allyltrimethoxysilane, methacrylamidopropyltriethoxysilane, N-(3-methacryloxy-2-hydroxypropyl)-3-aminopropyltriethoxysilane, (methacryloxy-methyl)dimethylethoxysilane, methacryloxymethyltriethoxy-silane, methacryloxymethyltrimethoxysilane, methacryloxypropyldimethylethoxysilane, methacryloxypropyldimethyl-methoxysilane, methacryloxypropylmethyldiethoxysilane, methacryloxypropylmethyldimethoxysilane, methacryloxypropylmethyltriethoxysilane, metharyloxypropylmethyl-trimethoxysilane, methacryloxypropyltris(methoxyethoxy)-silane, methoxydimethylvinylsilane, 1-methoxy-3(trimethyl-siloxy)butadiene, styrylethyltrimethoxysilane, 3-(N-styrylmethyl-2-aminoethylamino)propyltrimethoxysilane hydrochloride, vinyldimethylethoxysilane, vinyldiphenyl-ethoxysilane, vinylmethyldiethoxysilane, vinylmethyl-dimethoxysilane, O-(vinyloxyethyl)-N-(triethoxysilyl-propyl)urethane, vinyltriethoxysilane, vinyltrimethoxy-silane, vinyltri-t-butoxysilane, vinyltriisopropoxysilane, vinyltriphenoxysilane, vinyltris(2-methoxyethoxy)silane, diallylaminopropylmethoxysilane. Of these silane coupling agents, silane coupling agents having a methacryloyl group or an acryloyl group fist in the reactivity of an unsaturated group are preferred.

Besides the above, a sol/gel coating process as disclosed in JP-A-5-50779, a coating process of phosphonic acids as disclosed in JP-A-5-246171, a process of coating materials for back coating as disclosed in JP-A-6-234284, JP-A-6-191173 and JP-A-6-230563, a process of phosphonic acids as disclosed in JP-A-6-262872, a coating process as disclosed in JP-A-6-297875, an anodizing process as disclosed in JP-A-10-109480, and an immersion process method as disclosed in JP-A-2000-81704 and JP-A-2000-89466 are exemplified, and any method can be used.

After forming a hydrophilic film, if necessary, the surface of the aluminum plate is subjected to hydrophilizing process. As the hydrophilizing process, alkali metal silicate methods as disclosed in U.S. Pat. Nos. 2,714,066, 3,181,461, 3,280,734 and 3,902,734 are known. These methods comprise immersion processing of a support in an aqueous solution of sodium silicate or electrolytic processing. In addition, a method of processing an aluminum plate with potassium fluorozirconate as disclosed in JP-B-36-22063, and methods of processing with polyvinylphosphonic acid as disclosed in U.S. Pat. Nos. 3,276,868, 4,153,461 and 4,689,272 are exemplified.

When a polyester film insufficient in a hydrophilic property of surface is used as a support in the invention, it is preferred to coat a hydrophilic layer to make the surface hydrophilic. As the hydrophilic layers, a hydrophilic layer provided by coating a coating solution containing the colloid of oxide or hydroxide of at least one element selected from beryllium, magnesium, aluminum, silicon, titanium, boron, germanium, tin, zirconium, iron, vanadium, antimony and transition metals as disclosed in JP-A-2001-199175, a hydrophilic layer having an organic hydrophilic matrix obtained by the crosslinking or pseudo-crosslinking of an organic hydrophilic polymer as disclosed in JP-A-2002-79772, a hydrophilic layer having an inorganic hydrophilic matrix obtained by sol/gel conversion comprising hydrolysis and condensation reaction of polyalkoxysilane, titanate, zirconate or aluminate, and a hydrophilic layer comprising an inorganic thin film having a surface containing a metallic oxide are preferred. Of these hydrophilic layers, a hydrophilic layer provided by coating a coating solution containing the colloid of oxide or hydroxide of silicon is preferred.

When a polyester film is used as a support in the invention, it is preferred to provide an antistatic layer on the hydrophilic layer side of the support, or on the opposite side to the hydrophilic layer, or on both sides. When an antistatic layer is provided between a support and a hydrophilic layer, the antistatic layer also contributes to the adhesion of the hydrophilic layer and the support. The polymer layers containing the dispersion of metallic oxide fine particles and a matting agent as disclosed in JP-A-2002-79772 can be used as the antistatic layers.

It is preferred that a support for use in the invention has a central line average surface roughness of from 0.10 to 1.2 μm. In this range of average surface roughness, good adhesion of the support and an image-recording layer, good press life and good soiling resistance can be obtained.

The color density of a support is preferably from 0.15 to 0.65 in terms of a reflection density value. A good image forming property due to antihalation in the time of image exposure and a good plate-detecting property after development can be obtained when the color density of a support is in this range.

Back Coat Layer:

After surface treatment of a support or after forming an undercoat layer, if necessary, a backcoat can be provided on the back surface of the support.

As the backcoat, e.g., coating layers comprising organic polymer compounds as disclosed in JP-A-5-45885, and coating layers comprising metallic oxides obtained by hydrolysis and polycondensation of organic or inorganic metallic compounds as disclosed in JP-A-6-35174 are preferably used. Alkoxy compounds of silicon, e.g., $Si(OCH_3)_4$, $Si(OC_2H_5)_4$, $Si(OC_3H_7)_4$, $Si(OC_4H_9)_4$, are preferably used for the inexpensiveness and easy availability of the materials.

Undercoat Layer:

In the lithographic printing plate precursor in the invention, if necessary; an undercoat layer can be provided between an image-recording layer and a support. Since the undercoat layer functions as a heat insulating layer, the heat generated by infrared laser exposure does not diffuse to the support and is efficiently utilized, so that the improvement of sensitivity can be contriver Further, the image-recording layer comes to be easily peeled off the support at an unexposed portion, so that on-press developability is improved.

As the undercoat layer, specifically the silane coupling agent having an addition polymerizable ethylenic double bond reactive group disclosed in JP-A-10-282679, and the phosphorus compounds having an ethylenic double bond reactive group disclosed in JP-A-2-304441 are preferred. Further, compounds having both a polymerizable group such as a methacrylic group or an allyl group and support-adsorptive group such as a sulfonic acid group, a phosphoric acid group or a phosphoric ester group are also preferred. Compounds obtained by adding a hydrophilicity-imparting group, e.g., an ethyleneoxy group, to these compounds can also be preferably used.

The coating amount of an undercoat layer (solids content) is preferably from 0.1 to 100 mg/m$^2$, more preferably from 1 to 30 mg/m$^2$.

Protective Layer:

For preventing the generation of scratches on an image recording layer, for shielding oxygen, and for preventing ablation at the time of exposure with high intensity laser, if necessary, a protective layer may be provided on an image recording layer of the lithographic printing plate precursor of the invention.

Exposure is generally performed in the air in the invention, and the protective layer prevents the mixture into the image recording layer of low molecular weight compounds such as oxygen and basic substance in the air that hinder the image forming reaction occurring in the image-recording layer by exposure, by which the hindrance of the image-forming reaction by exposure in the air can be prevented. Accordingly, the characteristics required of the protective layer are to be low in permeability of low molecular weight compounds such as oxygen, good in transmission of light used for exposure, excellent in adhesion with an image-recording layer, and capable of being removed easily by on-press development after exposure. Protective layers having such characteristics have so far been variously examined and they are disclosed in detail, e.g., in U.S. Pat. No. 3,458,311 and JP-B-55-49729.

As the materials that are used for the protective layer, for example, water-soluble polymer compounds relatively excellent in crystallizability are exemplified. Specifically, water-soluble polymers, e.g., polyvinyl alcohol, polyvinyl pyrrolidone, acid celluloses, gelatin, gum arabic, and polyacrylic acid are exemplified.

Above all, when polyvinyl alcohol (PVA) is used as the main component, the best results can be given to the fundamental characteristics such as an oxygen-shielding property and the removal by development Polyvinyl alcohols may be partially substituted with ester, ether or acetal, or may partially contain other copolymer component so long as they contain an unsubstituted vinyl alcohol unit for imparting an oxygen-shielding property and solubility in water that are necessary to the protective layer.

As the specific examples of polyvinyl alcohols, those having a hydrolyzed rate of from 71 to 100 mol % and the degree of polymerization of from 300 to 2,400 are preferably exemplified. Specifically, PVA-105, PVA-110, PVA-117, PVA- 117H, PVA-120, PVA-124, PVA-124H, PVA-CS, PVA-CST, PVA-HC, PVA-203, PVA-204, PVA-205, PVA-210, PVA-217, PVA-220, PVA-224, PVA-217EE, PVA-217E, PVA-220B, PVA-224E, PVA-405, PVA-420, PVA-613, and L-8 (manufactured by Kuraray Co., Ltd.) are exemplified.

The components of the protective layer (the selection of PVA, the use of additives, etc.), and the coating amounts are suitably selected by considering fogging characteristic, adhesion and scratch resistance besides the oxygen shielding property and the removal by development. To general, the higher the hydrolyzing rate of PVA (that is, the higher the unsubstituted vinyl alcohol unit content in the protective layer), and the higher the layer thickness, the higher is the oxygen-shielding property, thus advantageous in the point of sensitivity For the prevention of the generation of unnecessary polymerization reaction during manufacture and storage, or the generation of unnecessary fog and thickening of image lines in image exposure, it is preferred that an oxygen-permeating property is not too high. Therefore, oxygen permeability A at 25° C. under 1 atm is preferably, $0.2 \square A \square 20$ (cm$^3$/m$^2$·day).

As other components of the protective layer, glycerol, dipropylene glycol and the like can be added in an amount of several mass % to the water-soluble polymer compounds to provide flexibility, and further, anionic surfactants, e.g., sodium alkylsulfate and sodium alkylsulfonate; ampholytic surfactants, e.g., alkylaminocarboxylate and alkylaminodicarboxylate; and nonionic surfactants, e.g., polyoxyethylene alkyl phenyl ether, can be added to the (co)polymers each in an amount of several mass %. The layer thickness of the protective layer is preferably from 0.1 to 5 μm, and particularly preferably from 0.2 to 2 μm.

The adhesion of the protective layer with an image part and scratch resistance are also very important in treating a lithographic printing plate precursor. That is, when a protective layer that is hydrophilic by containing a water-soluble polymer compound is laminated on a lipophilic image-recording layer, layer peeling of the protective layer due to insufficient adhesion is liable to occur, and sometimes a defect such as film hardening failure attributing to polymerization hindrance by oxygen is caused at the peeled part.

Various countermeasures have been proposed for improving the adhesion of an image-recording layer and a protective layer. For example, it is disclosed in JP-A-49-70702 and British Patent Application No. 1,303,578 that sufficient adhesion can be obtained by mixing from 20 to 60 mass % of an acryl-based emulsion or a water-insoluble vinyl pyrrolidone/vinyl acetate copolymer with a hydrophilic polymer mainly comprising polyvinyl alcohol and laminating the resulting product on an image-recording layer. Any of these well-known techniques can be used in the present invention. The coating methods of a protective layer are disclosed in detail, e.g., in U.S. Pat. No. 3,458,311 and JP-B-55-49729.

Further, other functions can be imparted to a protective layer. For example, by the addition of colorants excellent in transmission of infrared rays that are used in exposure and capable of efficiently absorbing lights of other wavelengths (e.g., water-soluble dyes), safelight aptitude can be improved without causing sensitivity reduction.

Plate-making Method and Lithographic Printing Method:

In the lithographic printing method using the lithographic printing plate precursor in the invention, the lithographic printing plate precursor is imagewise exposed with an infrared laser.

The infrared lasers for use in the present invention are not particularly restricted, but solid state lasers and semiconductor lasers radiating the infrared rays of the wavelength of from 760 to 1,200 nm are preferably used. The output of infrared lasers is preferably 100 mW or higher. It is preferred to use a multi-beam laser device for expediting exposure.

The exposure time per a pixel is preferably not longer than 20 μsec. The quantity of irradiation energy is preferably from 10 to 300 mJ/cm$^2$.

In the lithographic printing method in the invention, as described above, after a lithographic printing plate precursor is imagewise exposed with infrared laser beams, printing can be carried out by supplying oily ink and aqueous component without being subjected to development process.

Specifically, a method of subjecting a lithographic printing plate precursor to infrared laser exposure, and then mounting the exposed printing plate precursor on a printing press without undergoing development process and performing printing, and a method of mounting a lithographic printing plate precursor on a printing press, and then exposing the printing plate precursor with laser beams on the printing press, and performing printing without subjecting to development process are exemplified.

For example, in one embodiment of a negative on-press type lithographic printing plate precursor, when a lithographic printing plate precursor is imagewise exposed with laser beams and printing is performed by supplying oily ink and aqueous component without being subjected to development process such as wet development process, the image-recording layer hardened by exposure forms an oily ink-accepting area having a lipophilic surface at the exposed portion of the image-recording layer. On the other hand, at the unexposed portion, unhardened image-recording layer is dissolved or dispersed with the supplied aqueous component and/or oily ink and removed, whereby a hydrophilic surface is bared at that area.

As a result, the aqueous component adheres to the bared hydrophilic surface, the oily ink adheres to the image recording layer in the exposed portion, and printing is initiated. Here, the one that is supplied first to the printing plate may be an aqueous component or may be oily ink, but for preventing the aqueous component from becoming dirty by the image recording layer at the unexposed portion, it is preferred to supply oily ink in the first place. As the aqueous component and the oily ink, fountain solutions and oily inks used in ordinary lithographic printing are used.

Thus, the lithographic printing plate precursor is subjected to on-press development on an offset printing press and used in printing of a plenty of sheets.

EXAMPLE

The invention will be described more specifically with referring to examples but the invention is not limited thereto.

Synthesis Example 1

Synthesis of Compound 13 of the Invention 2,3,3-Trimethylindolenine (159.2 g) (1.0 mol) was dissolved by the addition of 300 ml of toluene. To the solution was added 136.2 g (1.0 mol) of 1,4-butanesultone, and the reaction system was allowed to react for 2 hours at inner temperature of 120° C. The precipitated solids were filtered out and washed with toluene, whereby the Precursor 13-A of Compound 13 of the invention was obtained as a white solid (244 g, yield: 83%).

The physical properties of the obtained white solid are as follows.

$^1$H-NMR (DMSO-d$_6$): δ8.06-8.02 (m, 1H), 7.87-7.82 (m, 1H), 7.63-7.60 (m, 2H), 4.48 (t, 2H), 2.86 (s, 3H), 2.54-2.50 (m, 2H), 2.02-1.92 (m, 2H), 1.80-1.70 (m, 2H), 1.53 (s, 6H)

The chemical reaction scheme in the synthesis example is shown below.

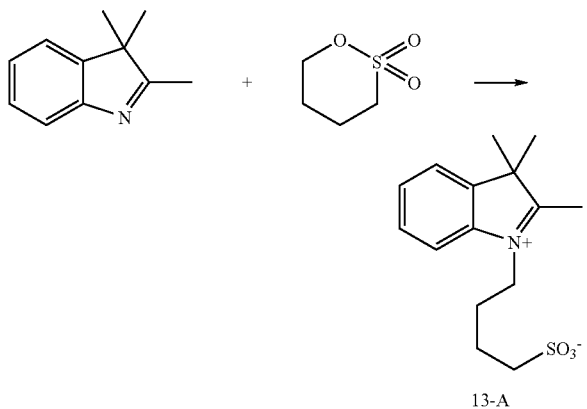

13-A

In the next place, 25.0 g (0.085 mol) of Precursor 13-A, salicylaldehyde (0.085 mol), and triethylamine (0.085 mol) were dissolved in 100 mo of ethanol, and the eon system was allowed to react for 2 hours at inner temperature of 110° C. Ethanol was removed from the reaction mixture with a vacuum pump under reduced pressure, and the obtained solid was washed with 40 ml of ethyl acetate three times, whereby Compound 13 was obtained.

The physical properties of the obtained compound are as follows.

$^1$H-NMR (Acetone-d$_6$): δ7.18-7.08 (m, 4H), 6.99 (d, 1H), 6.84-7.74 (m, 2H), 6.65-6.61 (m, 2H), 5.87 (d, 1H), 3.22-3.13 (m, 8H), 2.66-2.54 (m, 2H), 1.84-1.68 (m, 4H), 1.34-1.27 (m, 12H), 1.17 (s, 3H)

The chemical reaction scheme in the synthesis example is shown below,

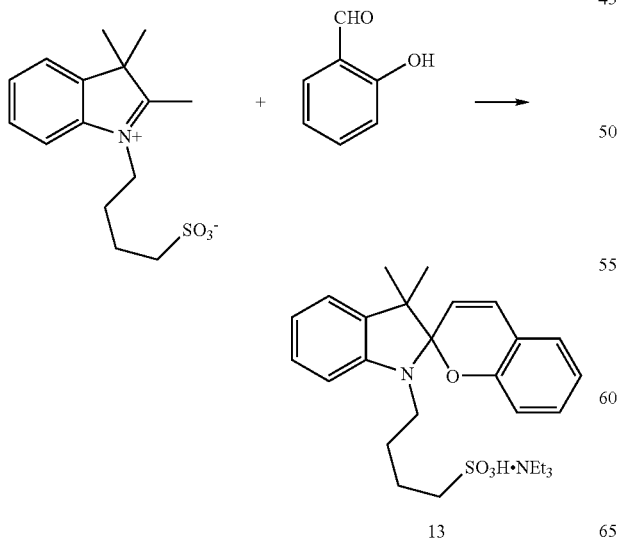

13

Synthesis Example 2

Synthesis of Compound 42 of the Invention

Triphenylsulfonyl bromide (0.4 g) (1.16 mmol) was dissolved by the addition of 28 ml of acetonitrile and 9 ml of water. Immediately after the addition of 0208 g (1.25 mmol) of silver acetate dissolved in 28 ml of acetonitrile and 9 ml of water thereto, white powder was precipitated. Thereafter, the reaction system was stirred at room temperature for 15 minutes, the precipitated solids were filtered out, 0.6 g (1.13 mmol) of SP-150 (manufactured by Hayashibara Biochemical Laboratories, Inc.) dissolved in 28 ml of acetonitrile and 9 ml of water was added to the filtrate, and the system was stirred at room temperature for 30 minutes. Subsequently, the mixture was concentrated under reduced pressure, and 20 ml of chloroform was added to the obtained mixture. The chloroform solution was washed with 30 ml of water tree times and then concentrated, whereby objective Compound 42 was obtained.

The physical properties of the obtained Compound 42 are as follows.

$^1$H-NMR (CDCl$_3$): δ8.00-7.93 (m, 2H), 7.82-7.63 (m, 15H), 7.17-7.03 (m, 2H), 6.88-6.80 (m, 2H), δ6.71-6.64 (m, 2H), δ5.92-5.87 (d, 1H), δ3.38-3.21 (m, 2H), δ2.97-2.80 (m, 2H), δ2.28-2.17 (m, 2H), 1.25 (s, 3H), 1.17 (s, 3H)

The chemical reaction scheme in the synthesis example is shown below.

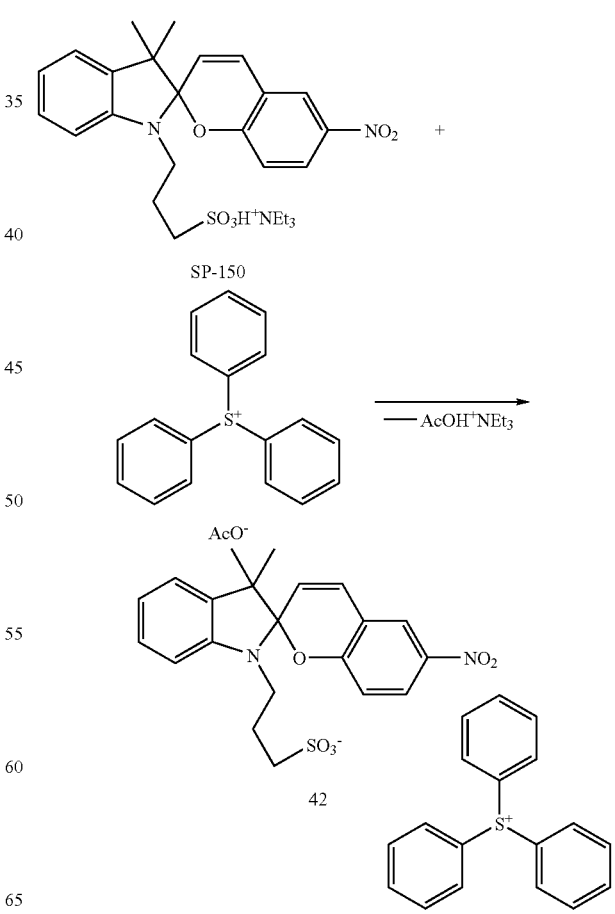

42

Synthesis Example 3

Synthesis of Compound 43 of the Invention

Precursor 13-A (5.9 g) (0.02 mmol) obtained in Synthesis Example 1, 3.47 g (0.02 mmol) of 1-nitroso-2-naphthol, and 1.64 g (0.02 mmol) of sodium acetate were dissolved in 300 ml of ethanol. After that, the solution was allowed to react for 2.5 hours at inner temperature of 100° C., and then concentrated under reduced pressure, whereby a mixture containing 43-A was obtained.

Subsequently, 1.2 g (2.12 mmol) of iodonium salt A shown below and 0.491 g (0.12 mmol) of $Ag_2O$ were dissolved in methanol, and the solution was allowed to react at room temperature for 2 hours. The precipitated solids were filtered, and 0.3 ml of acetic acid and 1.0a(2.12 mmol) of the above obtained 43-A were and allowed to react for 1 hour. After that, the reaction mixture was filtered and the obtained filtrate was concentrated, whereby objective Compound 43 was obtained.

The physical properties of hew obtained Compound 43 are as follows:

$^1$H-NMk (DMSO-d6): δ8.49-8.47 (d, 1H), 8.07 (m, 4H), 7.90-7.75 (m, 3H), 7.66-7.56 (m, 2H9, 7.43 (m, 5H), 7.16-7.09 (m, 4H), 6.80 (t, 1H9, 6.65 (d, 1H), 3.14 (bs, 2H), 2.33 (m, 2H), 1.60 (m, 4H), 1.21 (s, 18H), 0.85 (m, 2H9, 0.57 (t, 6H)

The chemical reaction scheme in the synthesis example is shown below.

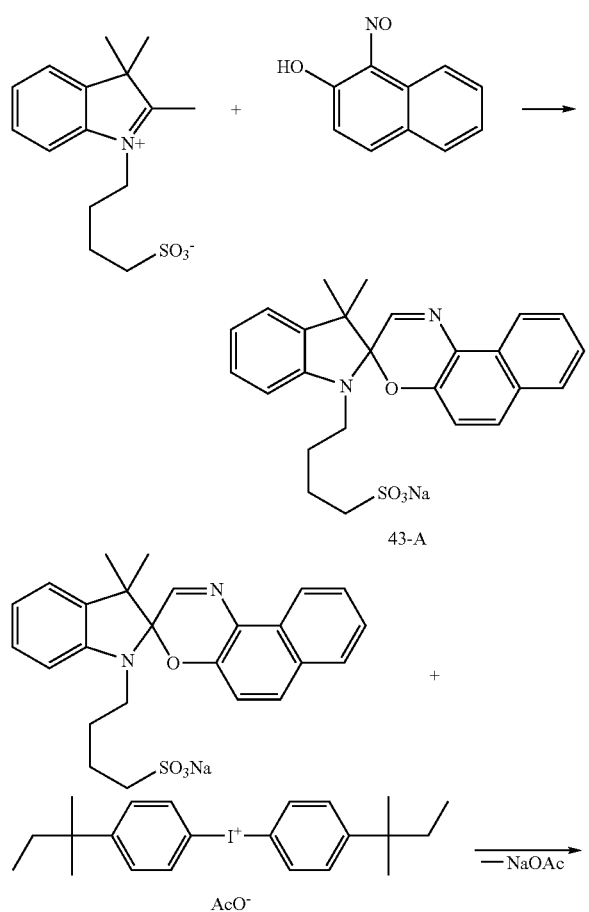

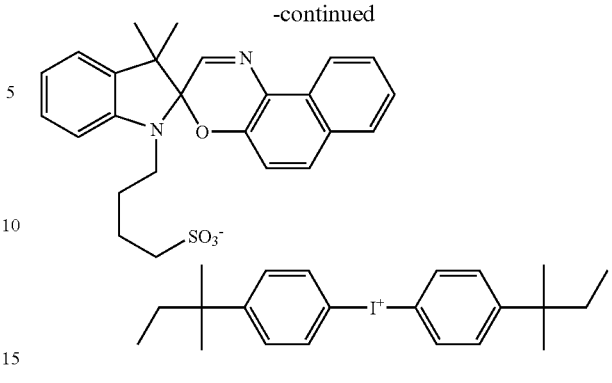

43

Example 1

Manufacture of Aluminum Support:

For removing the rolling oil of the surface, an aluminum plate having a thickness of 0.3 mm (material 1050) was subjected to degreasing treatment with a 10 mass % sodium alminate aqueous solution at 50° C. for 30 seconds, and after degreasing the aluminum surface was subjected to brush-graining with three nylon brushes planted with hairs having a hair diameter of 0.3 mm and a suspension of pumice stone and water of a median diameter of 25 μm (the specific gravity: 1.1 g/cm$^3$), and the surface of the plate was thoroughly washed with water. The plate was immersed in a 25% sodium hydroxide aqueous solution at 45° C. for 9 seconds for etching and then washed with water. After water washing, the plate was further immersed in a 20% nitric acid aqueous solution for 20 seconds, followed by washing with water. The etched amount of the surface by graining was about 3 g/m$^2$.

Electrochemical surface roughening treatment was performed continuously by alternating voltage of 60 Hz. The electrolyte at this time was an aqueous solution containing 1 mass % of a nitric acid (containing a 0.5 mass % of an aluminum ion) and the liquid temperature was 50° C. As the alternating current electric source waveform, trapezoidal rectangular waveform alternating current was used, the time TP required for the electric current value to reach the peak from 0 was 0.8 msec, the duty ratio was 1/1, and electrochemical surface roughening treatment was performed with a carbon electrode as the counter electrode. Ferrite was used as the auxiliary anode. The electric current density was 30 A/dm$^2$ at a peak value of electric current, and 5% of the electric current ftm the electric source was diverted to the auxiliary anode. The quantity of electricity was 175 C/dm$^2$ in the quantity of electricity in the case where the aluminum plate was the anode. The aluminum plate was then washed with water Subsequently, electrochemical surface roughening treatment of the aluminum plate was performed in the same manner as in the above nitric acid electrolysis with an electrolyte containing a 0.5 mass % hydrochloric acid aqueous solution (containing 0.5 mass % of an aluminum ion) at a liquid temperature of 50° C. on the condition of 50 C/dm$^2$ of the quantity of electricity in the case where the aluminum plate was the anode, and the plate was then subjected to spray washing. The plate was provided with 2.5 g/m$^2$ of a direct current anodic oxide film with a 15% sulfuric acid aqueous solution (containing 0.5 mass % of an aluminum ion) as the electrolyte and the electric cunrrt density of 15 A/dm², washed with water, dried, and further subjected to treatment with a 2.5 mass % sodium silicate aqueous solution at 30° C. for 10 seconds. The central line average surface roughness (Ra) of the plate measured with a needle having a diameter of 2 μm was 0.51 μm.

Formation of Undercoat Layer:

The undercoat layer coating solution (1) having the composition shown below was coated on the above support with bar coating, dried at 80° C. for 20 seconds in an oven, whereby an undercoat layer having a dry coating weight of 0.005 g/m² was formed.

Undercoat Layer Coating Solution (1):

| | |
|---|---|
| Water | 10 g |
| Methanol | 90 g |
| Polymer (1) shown below | 0.09 g |

Polymer (1)

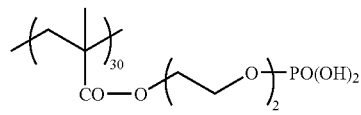

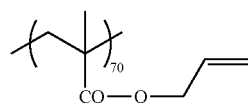

Formation of Image-recording Layer:

The image-recording layer coating solution (1) having the composition shown below was coated on the above undercoat layer with bar coating, dried at 70° C. for 60 seconds in an oven, whereby a image-recording layer having a dry coating weight of 1.0 g/m² was formed, whereby a lithographic printing plate precursor 1 was obtained.

Image-recording Layer Coating Solution (1):

| | |
|---|---|
| Water | 50 g |
| Propylene glycol monomethyl ether | 50 g |
| Microcapsule (1) (in terms of solids content) | 6 g |
| Microcapsule (2) (in terms of solids content) | 2.5 g |
| Polymerization initiator (1) shown below | 1 g |
| Isocyanuric acid EO-modified triacrylate (ARONIX M-315, manufactured by TOAGOSEI CO., LTD.) | 0.5 g |
| Fluorine surfactant (1) shown below | 0.1 g |

Polymerization initiator (1)

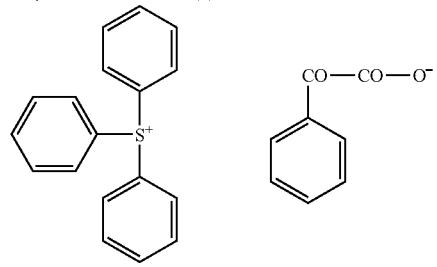

Fluorine surfactant (1)

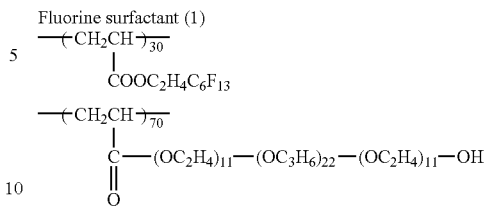

Synthesis of Microcapsule (1):

As the oil phase component, 8.7 g of the addition product of trimethylolpropane and xylene diisocyanate (Takenate D-110N, manufactured by Mitsui Takeda Chemicals Inc.), 1 g of 2-methacryloyloxyethyl isocyanate (Currens MOI, manufactured by Showa Denko K.K.), 5.5 g of isocyanuric acid EO-modified triacrylate (ARONIX M-315, manufactured by TOAGOSEI CO., LTD.), 0.5 g of infrared absorber (1) shown below, and 0.1 g of sodium dodecylbenzenesulfonate (Pionin A-41C, manufactured by Takemoto Oil & Fat) were dissolved in 17 g of ethyl acetate. As the aqueous phase component, 40 g of a 4 mass % aqueous solution of PVA-205 was prepared. The oil phase component and the aqueous phase component were mixed, and emulsified with a homogenizer at 12,000 rpm for 10 minutes. Distilled water (25 g) was added to the obtained emulsified product, and the mixture was stirred at room temperature for 30 minutes, and then stirred at 40° C. for 3 hours. The concentration of the solids content of the obtained microcapsule solution (1) was diluted to reach 20 mass % with distilled water. The average particle size was 0.3 μm.

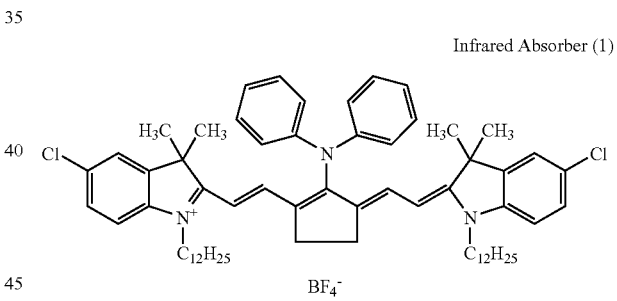

Infrared Absorber (1)

Synthesis of Microcapsule (2):

As the oil phase component, 10 g of the addition product of trimethylolpropane and xylene diisocyanate (Takenate D-110N, manufactured by Mitsui Takeda Chemicals Inc.), 5 g of 1,3,3-trimethylindolino-8'-carboxybenzopyrylospiran (manufactured by Tokyo Kasei Co., Ltd.), 0.5 g of infrared absorber (1) shown above, and 0.1 g of sodium dodecylbenzenesulfonate (Pionin A-41C, manufactured by Takemoto Oil & Fat) were dissolved in 17 g of ethyl acetate As the aqueous phase component, 40 g of a 4 mass % aqueous solution of PVA-205 was prepared. The oil phase component and the aqueous phase component were mixed, and emulsified with a homogenizer at 12,000 rpm for 10 minutes. Tetraethylenepentamine (0.38 g) and 25 g of distilled water were added to the obtained emulsified product, and the mixture was stirred at room temperature for 30 minutes, and then stirred at 65° C. for 3 hours. The concentration of the solids content of the obtained microcapsule solution (2) was diluted to reach 20 mass % with distilled water. The average particle size was 0.3 μm.

Example 2

A lithographic printing plate precursor 2 was manufactured by the same manner as in Example 1 except that the image-recording layer coating solution (2) having the composition shown below was coated on a support with bar coating, and dried at 100° C. for 60 seconds in an oven to form a image-recording layer having a dry coating weight of 1.0 g/m².

Image-recording Layer Coating Solution (2):

| | |
|---|---|
| Infrared absorber (1) shown above | 0.3 g |
| Polymerization initiator (1) shown above | 0.9 g |
| Binder polymer (1) shown below | 2.5 g |
| Polymerizable compound | 5.4 g |
| Isocyanuric acid EO-modified triacrylate | |
| (ARONIX M-315, manufactured by | |
| TOAGOSEI CO., LTD.) | |
| 1,3,3-Trimethylindolino-8'-carboxybenzo- | 0.8 g |
| pyrylospiran (manufactured by Tokyo Kasei | |
| Co., Ltd.) | |
| Fluorine surfactant (1) shown above | 0.1 g |
| Methanol | 4 g |
| Methyl ethyl ketone | 96 g |

Binder Polymer (1)

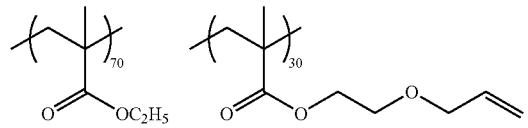

Example 3

A lithographic printing plate precursor 3 was manufactured by the same manner as in Example 1 except that the image-recording layer coating solution (3) having the composition shown below was coated on a support with bar coating, and dried at 80° C. for 60 seconds in an oven to form a image-recording layer having a dry coating weight of 1.0 g/m².

Image-recording Layer Coating Solution (3):

| | |
|---|---|
| Infrared absorber (2) shown below | 0.3 g |
| Polymerization initiator (1) shown above | 0.9 g |
| Binder polymer (1) shown above | 2.5 g |
| Polymerizable compound | 5.4 g |
| Pentaerythritol triacrylate | |
| (SR444, manufactured by Nippon Kayaku Co., Ltd.) | |
| Microcapsule (2) (in terms of solids content) | 2.5 g |
| Fluorine surfactant (1) shown above | 0.1 g |
| Methanol | 10 g |
| Water | 35 g |
| Propylene glycol monomethyl ether | 50 g |

Infrared Absorber (2)

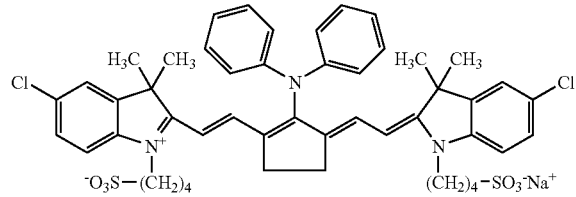

Example 4

A lithographic printing plate precursor 4 was manufactured by the same manner as in Example 1 except that the image-recording layer coating solution (4) having the composition shown below was coated on a support with bar coating, and dried at 100° C. for 60 seconds in an oven to form a image-recording layer having a dry coating weight of 1.0 g/m².

Image-recording Layer Coating Solution (4):

| | |
|---|---|
| Infrared absorber (2) shown above | 0.3 g |
| Polymerization initiator (1) shown above | 0.9 g |
| Binder polymer (1) shown above | 1.8 g |
| Polymerizable compound | 2.0 g |
| Pentaerythritol triacrylate | |
| (SR444, manufactured by Nippon Kayaku Co., Ltd.) | |
| Microcapsule (2) (in terms of solids content) | 2.5 g |
| Microcapsule (3) (in terms of solids content) | 2.5 g |
| Fluorine surfactant (1) shown above | 0.1 g |
| Methanol | 10 g |
| Water | 35 g |
| Propylene glycol monomethyl ether | 50 g |

Synthesis of Microcapsule (3):

As the oil phase component, 8.7 g of the addition product of trimethylolpropane and xylene diisocyanate (Takenate D-110N, manufactured by Mitsui Takeda Chemicals Inc.), 1 g of 2-methacryloyloxyethyl isocyanate (Currens MOI, manufactured by Showa Denko K.K.), 6 g of pentaerythritol triacrylate (SR444, manufactured by Nippon Kayaku Co., Ltd.), and 0.1 g of sodium dodecylbenzenesulfonate (Pionin A-41C, manufactured by Takemoto Oil & Fat) were dissolved in 17 g of ethyl acetate. As the aqueous phase component, 40 g of a 4 mass % aqueous solution of PVA-205 was prepared. The oil phase component and the aqueous phase component were mixed, and emulsified with a homogenizer at 12,000 rpm for 10 minutes. Distilled water (25 g) was added to the obtained emulsified product, and the mixture was stirred at room temperature for 30 minutes, and then stirred at 40° C. for 3 hours. The concentration of the solids content of the obtained microcapsule solution (3) was diluted to reach 20 mass % with distilled water. The average particle size was 0.3 μm.

Example 5

A lithographic printing plate precursor 5 was manufactured by the same manner as in Example 4 except that the protective layer coating solution (1) having the composition shown below was further coated on the image-recording layer in Example 4 with bar coating, and dried at 100° C. for 60 seconds in an oven to form a protective layer having a dry coating weight of 0.5 g/m².

Protective Layer Coating Solution (1):

| | |
|---|---|
| Polyvinyl alcohol | 1.0 g |
| (PVA-105, manufactured by Kuraray Co., Ltd., | |
| degree of saponification: 98.5%) | |
| Polyoxyethylene lauryl ether | 0.01 g |
| (EMALEX 710, manufactured by Nihon Emulsion Co.) | |
| Water | 19.0 g |

Comparative Example 1

A lithographic printing plate precursor C1 was manufactured by the same manner as in Example 1 except that microcapsule (2) used in image-recording layer coating solution (1) was completely replaced with microcapsule (4).

Synthesis of Microcapsule (4):

As the oil phase component, 10 g of the addition product of trimethylolpropane and xylene diisocyanate (Takenate D-110N, manufactured by Mitsui Takeda Chemicals Inc.), 0.5 g of infrared absorber (1), and 0.1 g of sodium dodecylbenzene-sulfonate (Pionin A-41C, manufactured by Takemoto Oil & Fat) were dissolved in 17 g of ethyl acetate. As the aqueous phase component 40 g of a 4 mass % aqueous solution of PVA-205 was prepared The oil phase component and the aqueous phase component were mixed, and emulsified with a homogenizer at 12,000 rpm for 10 minutes. Tetraethylenepentamine (0.38 g) and 25 g of distilled water were added to the obtained emulsified product, and the mixture was stirred at room temperature for 30 minute and then stirred at 65° C. for 3 hours. The concentration of the solids content of the obtained microcapsule solution (4) was diluted to reach 20 mass % with distilled water. The average particle size was 0.3 µm.

Comparative Example 2

A lithographic printing plate precursor C2 was manufactured by the same manner as in Example 2 except that image-recording layer coating solution (2) was replaced with image-recording layer cat solution (5) shown below.

Image-recording Layer Coating Solution (5):

| | |
|---|---|
| Infrared absorber (1) shown above | 0.3 g |
| Polymerization initiator (1) shown above | 0.9 g |
| Binder polymer (1) shown above | 2.5 g |
| Polymerizable compound | 5.4 g |
| Isocyanuric acid EO-modified triacrylate (ARONIX M-315, manufactured by TOAGOSEI CO., LTD.) | |
| Fluorine surfactant (1) shown above | 0.1 g |
| Methanol | 4 g |
| Methyl ethyl ketone | 96 g |

Comparative Example 3

A lithographic printing plate precursor C3 was manufactured by the same manner as in Example 3 except that microcapsule (2) used in image-recording layer coating solution (3) was completely replaced with microcapsule (4).

Comparative Example 4

A lithographic printing plate precursor C4 was manufactured by the same manner as in Example 4 except that microcapsule (2) used in image-recording layer coating solution (4) was completely replaced with microcapsule (4).

Comparative Example 5

A lithographic printing plate precursor C5 was manufactured by the same manner as in Comparative Example 4 except that the protective layer coating solution (1) having the composition shown below was further coated on the image-recording layer in Comparative Example 4 with bar coating, and dried at 100° C. for 60 seconds in an oven to form a protective layer having a dry coating weight of 0.5 g/m².

Evaluation of Lithographic Printing Plate Precursor:

1. Measurement of the Difference in Brightness of Colors ΔL in the Exposed Area and the Unexposed Area (Evaluation of Printing Out Image)

Each of the lithographic printing plate precursors obtained was subjected to exposure with Trendsetter 3244VX (manufactured by Creo Products Incorporated) loading a water-cooling type 40 W infrared semiconductor laser on the conditions of the quantity of exposure energy shown in Table 1 below, and resolution of 2,400 dpi. For the evaluation of printing out images, L* values in the exposed area and the unexposed area were measured with a color difference meter (Color difference meter CR-221, manufactured by Minorta), and the difference in the brightness of colors: ΔL was obtained from the absolute value of color difference.

The results obtained are shown in Table 1. The result was shown as index with the ΔL value of Example 1 as standard (100), as well as theΔL value. The greater the value in the index of ΔL, the higher is the visibility and preferred.

As is apparent from Table 1 that the lithographic printing plate precursors of the invention were good in the contrast of the exposed area and the unexposed area, and fine lines and letters could be confirmed.

2. Evaluation of On-press Developability and Printing

The exposed printing precursor was mounted on SOR-M cylinder (manufactured by Heidelberg Japan K.K.) without performing development. A fountain solution (EU-3 (an etching solution manufactured by Fuji Photo Film Co., Ltd.)/water/isopropyl alcohol=1/89/10 (by volume)) and TRANS-G (N) Sumi ink (manufactured by Dainippon Ink and Chemicals Inc.) were supplied as the fountain solution and ink, and 100 sheets of paper were printed at a printing speed of 6,000 sheets per hour.

The number of the sheets of printing paper required up to the time when the on-press development of the unexposed area of the image-recording layer finished and the ink did not transfer to printing paper was counted, and the number of sheets was taken as the on-press developability. Printed substance free from staining could be obtained within 100 sheets when the lithographic printing plate precursors of the invention were used.

Subsequently, 5,000 sheets of paper were printed. Good printed substances free from the reduction of ink density in the image area and soiling in the non-image area could be obtained.

TABLE 1

Result of Measurement of Difference in Brightness of Colors ΔL

| Example No. | Lithographic Printing Plate Precursor Used | Exposure Energy (mJ/cm²) | Index of ΔL | ΔL value |
|---|---|---|---|---|
| Example 1 | 1 | 100 | 100 | 5 |
| Example 2 | 2 | 100 | 110 | 5.5 |
| Example 3 | 3 | 100 | 115 | 5.75 |
| Example 4 | 4 | 100 | 105 | 5.25 |
| Example 5 | 5 | 100 | 125 | 6.25 |
| Comparative Example 1 | C1 | 100 | 5 | 0.25 |
| Comparative Example 2 | C2 | 100 | 10 | 0.5 |
| Comparative Example 3 | C3 | 100 | 10 | 0.5 |

TABLE 1-continued

Result of Measurement of Difference in Brightness of Colors ΔL

| Example No. | Lithographic Printing Plate Precursor Used | Exposure Energy (mJ/cm²) | Index of ΔL | ΔL value |
|---|---|---|---|---|
| Comparative Example 4 | C4 | 100 | 10 | 0.5 |
| Comparative Example 5 | C5 | 100 | 10 | 0.5 |

Example 6

Lithographic printing plate precursor 6 was prepared by the same manner as in Example 1 except that microcapsule (2) in photosensitive/light-sensitive layer coating solution (1) was replaced with microcapsule (5) shown below.

Synthesis of Microcapsule (5):

As the oil phase component, 10 g of the addition product of trimethylolpropane and xylene diisocyanate (Takenate D-110N, manufactured by Mitsui Takeda Chemicals Inc.), 5 g of spirooxazine (1) shown below (manufactured by Tokyo Kasei Co., Ltd.), 0.5 g of infrared absorber (1), and 0.1 g of sodium dodecylbenzenesulfonate (Pionin A-41C, manufactured by Takemoto Oil & Fat) were dissolved in 17 g of ethyl acetate. As the aqueous phase component, 40 g of a 4 mass % aqueous solution of PVA-205 was prepared. The oil phase component and the aqueous phase component were mixed, and emulsified with a homogenizer at 12,000 rpm for 10 minutes. Tetraethylene-pentamine (0.38 g) and 25 g of distilled water were added to the obtained emulsified product, and the mixture was stirred at room temperature for 30 minutes, and then stirred at 65° C. for 3 hours. The concentration of the solids content of the obtained microcapsule solution (5) was diluted to reach 20 mass % with distilled water. The average particle size was 0.3 μm.

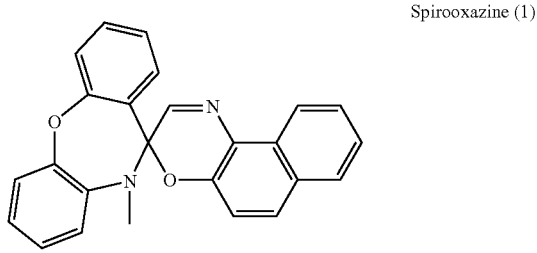

Spirooxazine (1)

Example 7

A lithographic printing plate precursor 7 was manufactured by the same manner as in Example 2 except that 1,3,3-trimethylindolino-8'-carboxybenzospiran used in photosensitive/light-sensitive layer coating solution (2) was replaced with the above spirooxazine (1).

Example 8

A lithographic printing plate precursor 8 was manufactured by the same manner as in Example 3 except that microcapsule (2) used in photosensitive/light-sensitive layer coating solution (3) was replaced with microcapsule (5).

Example 9

A lithographic printing plate precursor 9 was manufactured by the same manner as in Example 4 except that microcapsule (2) used in photosensitive/light-sensitive layer coating solution (4) was replaced with microcapsule (5).

Example 10

A lithographic printing plate precursor 10 was manufactured by the same manner as in Example 9 except that the protective layer coating solution (1) having the composition shown above was further coated on the photosensitive/light-sensitive layer in Example 9 with bar coating, and dried at 100° C. for 60 seconds in an oven to form a protective layer having a dry coating weight of 0.5 g/m².

With every lithographic printing plate precursor in Examples 6 to 10, the difference in brightness of colors ΔL was measured in the same manner as in Example 1. The results obtained are shown in Table 2 below.

TABLE 2

| Example No. | Index of ΔL | ΔL value |
|---|---|---|
| Example 6 | 120 | 6 |
| Example 7 | 130 | 6.5 |
| Example 8 | 135 | 6.75 |
| Example 9 | 115 | 5.75 |
| Example 10 | 150 | 7.5 |

Example 11

The image-recording layer coating solution (6) having the composition shown below was coated on the above undercoat layer with bar coating, dried at 70° C. for 60 seconds in an oven, whereby an image-recording layer having a dry coating weight of 1.0 g/m² was formed, whereby a lithographic printing plate precursor 11 was obtained.

Image-recording Layer Coating Solution (6):

| | |
|---|---|
| Water | 50 g |
| Propylene glycol monomethyl ether | 50 g |
| Microcapsule (6) (in terms of solids content) | 6 g |
| Microcapsule (7) (in terms of solids content) | 2.5 g |
| Polymerization initiator (1) shown above | 1 g |
| Isocyanuric acid EO-modified triacrylate (M-315, manufactured by TOAGOSEI CO., LTD.) | 0.5 g |
| Fluorine surfactant (1) shown above | 0.1 g |

Synthesis of Microcapsule (6):

As the oil phase component, 8.7 g of the addition product of trimethylolpropane and xylene diisocyanate (Takenate D-110N, manufactured by Mitsui Takeda Chemicals Inc.), 1 g of 2-methacryloyloxyethyl isocyanate (Karenz MOI, manufactured by Showa Denko K.K.), 5.5 g of isocyanuric acid EO-modified triacrylate (M-315, manufactured by TOAGOSEI CO., LTD.), and 0.1 g of sodium dodecylbenzenesulfonate (Pionin A-41C, manufactured by Takemoto Oil & Fat) were dissolved in 17 g of ethyl acetate. As the aqueous phase component, 40 g of a 4 mass % aqueous solution of PVA-205 was prepared. The oil phase component and the aqueous phase component were mixed, and emulsified with a homogenizer at 12,000 rpm for 10 minutes. Distilled water (25 g) was added to the obtained emulsified product, and the mixture was stirred at room temperature for 30 minutes, and then stirred at 40° C. for 3 hours. The concentration of the solids content of the obtained microcapsule solution (6) was diluted to reach 20 mass % with distilled water. The average particle size was 0.3 μm.

Synthesis of Microcapsule (7):

As the oil phase component, 10 g of the addition product of trimethylolpropane and xylene diisocyanate (Takenate D-110N, manufactured by Mitsui Takeda Chemicals Inc.), 5 g of Compound 13 (exemplified compound in the specification), 0.5 g of infrared absorber (1) shown above, and 0.1 g of sodium dodecylbenzenesulfonate (Pionin A-41C, manufactured by Takemoto Oil & Fat) were dissolved in 17 g of ethyl acetate. As the aqueous phase component, 40 g of a 4 mass % aqueous solution of PVA-205 was prepared. The oil phase component and the aqueous phase component were mixed, and emulsified with a homogenizer at 12,000 rpm for 10 minutes. Tetraethylene-pentamine (0.38 g) and 25 g of distilled water were added to the obtained emulsified product, and the mixture was stirred at room temperature for 30 minutes, and then stirred at 65° C. for 3 hours. The concentration of the solids content of the obtained microcapsule solution (7) was diluted to reach 20 mass % with distilled water. The average particle size was 0.3 μm.

Example 12

A lithographic printing plate precursor 12 was manufactured by the same manner as in Example 1 except that the image recording layer coating solution (7) having the composition shown below was coated on a support with bar coating, and dried at 100° C. for 60 seconds in an oven to form an image-recording layer having a dry coating weight of 1.0 g/m².

Image-recording Layer Coating Solution (7):

| | |
|---|---|
| Infrared absorber (1) shown above | 0.3 g |
| Polymerization initiator (1) shown above | 0.9 g |
| Binder polymer (1) shown above | 2.5 g |
| Polymerizable compound | 5.4 g |
| Isocyanuric acid EO-modified triacrylate | |
| (ARONIX M-315, manufactured by TOAGOSEI CO., LTD.) | |
| Compound 13 (compound of the invention) | 0.8 g |
| Fluorine surfactant (1) shown above | 0.1 g |
| Methanol | 4 g |
| Methyl ethyl ketone | 96 g |

Example 13

A lithographic printing plate precursor 13 was manufactured by the same manner as in Example 1 except that the image recording layer coating solution (8) having the composition shown below was coated on a support with bar coating, and dried at 80° C. for 60 seconds in an oven to form an image-recording layer having a dry coating weight of 1.0 g/m².

Image-recording Layer Coating Solution (8):

| | |
|---|---|
| Infrared absorber (2) shown above | 0.3 g |
| Polymerization initiator (1) shown above | 0.9 g |
| Binder polymer (1) shown above | 2.5 g |
| Polymerizable compound | 5.4 g |

-continued

| | |
|---|---|
| Pentaerythritol triacrylate | |
| (SR444, manufactured by Nippon Kayaku Co., Ltd.) | |
| Microcapsule (7) (in terms of solids content) | 2.5 g |
| Fluorine surfactant (1) shown above | 0.1 g |
| Methanol | 10 g |
| Water | 35 g |
| Propylene glycol monomethyl ether | 50 g |

Example 14

A lithographic printing plate precursor 14 was manufactured by the same manner as in Example 1 except that the image recording layer coating solution (9) having the composition shown below was coated on a support with bar coating and dried at 100° C. for 60 seconds in an oven to form an image-recording layer having a dry coating weight of 1.0 g/m².

Image-recording Layer Coating Solution (9):

| | |
|---|---|
| Infrared absorber (2) shown above | 0.3 g |
| Polymerization initiator (1) shown above | 0.9 g |
| Binder polymer (1) shown above | 1.8 g |
| Polymerizable compound | 2.0 g |
| Pentaerythritol triacrylate | |
| (SR444, manufactured by Nippon Kayaku Co., Ltd.) | |
| Microcapsule (7) (in terms of solids content) | 2.5 g |
| Microcapsule (3) shown above (in terms of solids content) | 2.5 g |
| Fluorine surfactant (1) shown above | 0.1 g |
| Methanol | 10 g |
| Water | 35 g |
| Propylene glycol monomethyl ether | 50 g |

Example 15

A lithographic printing plate precursor 15 was manufactured by the same manner as in Example 14 except that the protective layer coating solution (1) shown above was further coated on the image-recording layer in Example 14 with bar coating, and dried at 100° C. for 60 seconds in an oven to form a protective layer having a dry coating weight of 0.5 g/m².

Examples 16 to 20

Lithographic printing plate precursors 16 to 20 were prepared by the same manner as in Examples 11 to 15 respectively except that Compound 13 of the invention used in Examples 11 to 15 was replaced with Compound 42 of the invention.

Example 21 to 25

Lithographic printing plate precursors 21 to 25 were prepared by the same manner as in Examples 11 to 15 respectively except that Compound 13 of the invention used in Examples 11 to 15 was replaced with Compound 43 of the invention.

Comparative Example 6

A lithographic printing plate precursor C6 was manufactured by the same manner as in Example 11 except that microcapsule (7) used in image-recording layer coating solution (6) was completely replaced with microcapsule (4).

Evaluation of Lithographic Printing Plate Precursors 11 to 25 and C6:

The evaluation was performed in the same manner as in Examples 1 to 10, and the result is shown in Table 3. The quantity of exposure energy was 100 mJ/m².

TABLE 3

Result of Measurement of Difference in Brightness of Colors ΔL

| Lithographic Printing Plate Precursor Used | Index of ΔL | ΔL value |
|---|---|---|
| Example 11 | 11 | 152 | 7.6 |
| Example 12 | 12 | 136 | 6.8 |
| Example 13 | 13 | 118 | 5.9 |
| Example 14 | 14 | 142 | 7.1 |
| Example 15 | 15 | 144 | 7.2 |
| Example 16 | 16 | 172 | 8.6 |
| Example 17 | 17 | 182 | 9.1 |
| Example 18 | 18 | 150 | 7.5 |
| Example 19 | 19 | 164 | 8.2 |
| Example 20 | 20 | 166 | 8.3 |
| Example 21 | 21 | 130 | 6.5 |
| Example 22 | 22 | 132 | 6.6 |
| Example 23 | 23 | 112 | 5.6 |
| Example 24 | 24 | 138 | 6.9 |
| Example 25 | 25 | 138 | 6.9 |
| Comparative Example 6 | C6 | 6 | 0.3 |

It is apparent from the above results that the lithographic printing plate precursors according to the invention show great difference in brightness of colors by exposure, and produce printing out images having excellent visibility.

This application is based on Japanese patent applications JP 2004-115121, filed on Apr. 9, 2004 and JP 2004-275449, filed on Sep. 22, 2004, the entire content of which is hereby incorporated by reference, the same as if set forth at length.

What is claimed is:

1. A compound comprising: a partial structure represented by the following formula (I); and at least one group selected from the group consisting of a derivative of an acid group having a pKa of 11 or less and a group capable of generating an acid group having a pKa of 11 or less:

(I)

wherein X and Y each independently represents an atom selected from N, O and S; Q represents an atom selected from C, N, O and S.

2. The compound as claimed in claim 1, wherein the derivative of an acid group having a pKa of 11 or less is selected from the group consisting of an ester of an acid group having a pKa of 11 or less, an amide of an acid group having a pKa of 11 or less and an acetal of an acid group having a pKa of 11 or less.

3. The compound as claimed in claim 2, wherein the acid group having a pKa of 11 or less is selected from the group consisting of a phenolic hydroxyl group, a sulfonamido group, a substituted sulfonamide-based acid group, a carboxylic acid group, a sulfonic group and a phosphoric acid group.

4. The compound as claimed in claim 1, wherein the group capable of generating an acid group having a pKa of 11 or less is selected from the group consisting of a sulfonium group, an iodonium group, a diazonium group and an amnionium group.

5. The compound as claimed in claim 4, wherein the acid group having a pKa of 11 or less is selected from the group consisting of a phenolic hydroxyl group, a sulfonamido group, a substituted sulfonamide-based acid group, a carboxylic acid group, a sulfonic group and a phosphoric acid group.

6. The compound as claimed in claim 1, wherein the derivative of an acid group having a pKa of 11 or less is an ester of an acid group having a pKa of 11 or less.

7. The compound as claimed in claim 6, wherein the acid having a pKa of 11 or less is a sulfonic acid group.

8. The compound as claimed in claim 1, wherein the group capable of generating an acid group having a pKa of 11 or less is selected from the group consisting of a sulfonium group, an iodonium group and an ammonium group.

9. The compound as claimed in claim 8, wherein the acid having a pKa of 11 or less is a sulfonic acid group.

10. An image-recording material comprising (A) a compound comprising: a partial structure represented by the following formula (I); and at least one group selected from the group consisting of a derivative of an acid group having a pKa of 11 or less and a group capable of generating an acid group having a pKa of 11 or less:

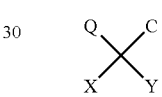

(I)

wherein X and Y each independently represents an atom selected from N, O and S; Q represents an atom selected from C, N, O and S.

11. The image-recording material as claimed in claim 10, which further comprises an infrared absorber.

12. A lithographic printing plate precursor comprising a support and an image-recording layer, wherein the image-recording layer comprises (A) a compound comprising: a partial structure represented by the following formula (I); and at least one group selected from the group consisting of a derivative of an acid group having a pKa of 11 or less and a group capable of generating an acid group having a pKa of 11 or less:

(I)

wherein X and Y each independently represents an atom selected from N, O and S; Q represents an atom selected from C, N, O and S.

13. The lithographic printing plate precursor as claimed in claim 12, wherein the image-recording layer further comprises an infrared absorber.

14. The lithographic printing plate precursor as claimed in claim 12, wherein the image-recording layer is capable of image recording by an infrared laser exposure, and the lithographic printing plate precursor is capable of performing a printing by being loaded on a printing machine without a development processing after image recording, or by image recording after being loaded on a printing machine.

15. The lithographic printing plate precursor as claimed in claim 12, wherein the image-recording layer further comprises (3) a radical polymerizable compound and a radical polymerization initiator.

16. The lithographic printing plate precursor as claimed in claim 12, wherein the image-recording layer contains a microgel.

17. The lithographic printing plate precursor as claimed in claim 16, wherein the microgel is a microcapsule.

18. The lithographic printing plate precursor as claimed in claim 12,
wherein the derivative of an acid group having a pKa of 11 or less is an ester, amide or acetal, and
wherein the group capable of generating an acid group having a pKa of 11 or less is an onium group, sulfonium group, iodonium group or a diazonium group.

19. A method of plate making a lithographic printing plate precursor, comprising:
loading the lithographic printing plate precursor as claimed in claim 12 on a printing machine and then imagewise exposing the lithographic printing plate precursor with an infrared laser, or imagewise exposing the lithographic printing plate precursor as claimed in claim 4 with an infrared laser and then loading the lithographic printing plate precursor on a printing machine; and
feeding a printing ink and a fountain solution to the lithographic printing plate precursor to remove the unexposed portion with the infrared laser of the image-recording layer.

20. A lithographic printing method comprising:
loading the lithographic printing plate precursor as claimed in claim 12 on a printing machine and then imagewise exposing the lithographic printing plate precursor with an infrared laser, or imagewise exposing the lithographic printing plate precursor as claimed in claim 4 with an infrared laser and then loading the lithographic printing plate precursor on a printing machine;
feeding a printing ink and a fountain solution to the lithographic printing plate precursor to remove the unexposed portion with the infrared laser of the image-recording layer; and
performing a printing.

* * * * *